(12) United States Patent
Laughlin et al.

(10) Patent No.: US 11,355,906 B2
(45) Date of Patent: Jun. 7, 2022

(54) ATTACHMENT FOR AN ELECTRICAL BOX

(71) Applicant: ERICO INTERNATIONAL CORPORATION, Solon, OH (US)

(72) Inventors: Scott Laughlin, Middlefield, OH (US); Nathan Joseph Petek, Chagrin Falls, OH (US); Raymond Michael Olle, Valley View, OH (US)

(73) Assignee: ERICO International Corporation, Solon, OH (US)

(*) Notice: Subject to any disclaimer, the term of this patent is extended or adjusted under 35 U.S.C. 154(b) by 0 days.

(21) Appl. No.: 16/450,069

(22) Filed: Jun. 24, 2019

(65) Prior Publication Data
US 2019/0393688 A1 Dec. 26, 2019

Related U.S. Application Data

(60) Provisional application No. 62/688,534, filed on Jun. 22, 2018, provisional application No. 62/790,927, filed on Jan. 10, 2019.

(51) Int. Cl.
*H02G 3/12* (2006.01)

(52) U.S. Cl.
CPC .................... *H02G 3/128* (2013.01)

(58) Field of Classification Search
CPC ............... H02G 3/128; H02G 3/12
USPC ........... 248/27.1, 27.3, 200.1, 205.1, 217.3, 248/219.4, 309.1, 228.7
See application file for complete search history.

(56) References Cited

U.S. PATENT DOCUMENTS

| | | | |
|---|---|---|---|
| 2,480,805 A | 8/1949 | Buckets | |
| 3,040,926 A | 6/1962 | Palmer | |
| 3,474,994 A | 10/1969 | Wesley | |
| 3,606,223 A * | 9/1971 | Havener | H02G 3/126 248/205.1 |
| 3,720,395 A | 3/1973 | Schuplin | |
| 3,730,466 A | 5/1973 | Swanquist | |
| 3,780,209 A * | 12/1973 | Schuplin | H02G 3/125 174/51 |
| 4,062,512 A | 12/1977 | Arnold | |
| 5,619,263 A * | 4/1997 | Laughlin | H02G 3/125 248/343 |
| 6,491,270 B1 | 12/2002 | Pfaller | |
| 6,761,341 B2 | 7/2004 | Pfaller | |
| 8,309,849 B2 | 11/2012 | Dinh | |
| 8,382,341 B2 * | 2/2013 | Peter | F21V 29/507 362/370 |
| 8,403,277 B2 * | 3/2013 | Nuernberger | H02G 3/08 248/200.1 |
| 8,702,047 B2 | 4/2014 | Nuernberger et al. | |
| 9,261,120 B2 | 2/2016 | Colangelo et al. | |
| 9,822,926 B2 | 11/2017 | Nikayin et al. | |

(Continued)

OTHER PUBLICATIONS

United States RE25593; Molded Plastic Outlet Boxes With Attached Metal Mounting Brackets; Lewis Palmer, Inventor; 5 pages.

*Primary Examiner* — Muhammad Ijaz
(74) *Attorney, Agent, or Firm* — Quarles & Brady LLP

(57) ABSTRACT

An attachment can secure an electrical box to a support structure without the use of fasteners. An attachment body can be configured to be secured to the support structure. One or more engagement arrangements can include first and second arms that are configured to engage first and second mounting openings of an electrical box without use of a separate fastener.

21 Claims, 41 Drawing Sheets

(56) References Cited

U.S. PATENT DOCUMENTS

| | | | |
|---|---|---|---|
| 9,929,549 B2 | 3/2018 | Witherbee et al. | |
| 9,935,439 B2 | 4/2018 | Witherbee et al. | |
| 10,135,232 B2 | 11/2018 | Nikayin et al. | |
| 2005/0127256 A1* | 6/2005 | Johnson | H02G 3/126 248/205.1 |
| 2014/0318824 A1* | 10/2014 | Korcz | H02G 1/00 174/50 |
| 2016/0126711 A1* | 5/2016 | Colangelo | F16B 2/22 220/3.3 |
| 2016/0334056 A1* | 11/2016 | Nikayin | H02G 3/126 |
| 2018/0062365 A1 | 3/2018 | Kellerman | |

* cited by examiner

ATTACHMENT FOR AN ELECTRICAL BOX

CROSS-REFERENCE TO RELATED APPLICATIONS

This application claims priority to U.S. Provisional Patent Application Nos. 62/688,534 and 62/790,927, filed Jun. 22, 2018 and Jan. 10, 2019, respectively, both of which are incorporated herein by reference.

BACKGROUND

Typically, electrical boxes are secured to support structures with fasteners, for example, threaded fasteners such as screws. In other typical configurations, intermediate attachments can be utilized to secure electrical boxes to support structures, which are themselves secured with fasteners (e.g., screws) to one or both of a support structure and a corresponding electrical box. In some cases, the use of intermediate attachments can allow the electrical box to be secured at different locations along the support structure.

SUMMARY

Some embodiments of the invention provide an attachment for securing an electrical box to a support structure. An attachment body can be configured to be secured over the support structure. A first engagement arrangement can be configured to secure the electrical box to the attachment body without a separate fastener. The first engagement arrangement can include a first arm configured to engage a first mounting opening of the electrical box, and a second arm configured to engage the first mounting opening simultaneously with the first arm.

Some embodiments of the invention provide an attachment for securing an electrical box to a support structure that includes a front side, a top side, a back side, and a bottom side. An attachment body can be configured to be secured over the support structure. The attachment body can include a back portion configured to extend along the back side of the support structure, a top portion configured to extend along the top side of the support structure, and a front portion configured to extend along the front side of the support structure, with a locking feature extending from the front portion of the support structure. The back portion of the support structure can include a locking cut-out with cut-out side walls and with a locking tab that extends into the locking cut-out between the cut-out side walls. The locking feature can be configured to be releasably engaged with the cut-out side walls and the locking tab to secure the attachment body to the support structure.

Some embodiments of the invention provide a method of securing an electrical box with first and second mounting openings to a support structure, using an attachment with a first engagement arrangement that includes a jogged tab and a second engagement arrangement that includes a first arm and a second arm. An attachment body of the attachment can include a front portion, a locking feature that extends from the front portion, and a back portion with a cut-out, and can be disposed over the support structure to be supported by the support structure. The back portion of the attachment body can be urged towards the front portion of the attachment body to engage the back portion of the attachment body with a back side of the support structure, and to engage the front portion of the attachment body with a front side of the support structure. The locking feature can be releasably secured in keyed engagement with side walls of the cut-out on the back portion of the attachment body and in keyed engagement with a tab that extends into the cut-out. The electrical box can be secured to the attachment, without using a screw, by inserting the jogged tab of the first engagement arrangement into a first mounting opening of the electrical box and by moving the first mounting opening along the jogged tab to align a second mounting opening of the electrical box to be simultaneously engaged by a first hooked arm and a second hooked arm of the second engagement arrangement.

Some embodiments of the invention provide an attachment for securing an electrical box to a support structure, the electrical box including a back side with a first mounting opening and a second mounting opening. An attachment body can be configured to be secured to the support structure. An engagement arrangement can be integrally formed with the attachment body and can include a first arm having a first section and a second section that are joined by a bend, and a second arm having a hook. The engagement arrangement can be configured to secure the electrical box to the attachment body, without use of a separate fastener, with: the attachment body disposed along the back side of the electrical box; the first and second sections of the first arm extending from the back side of the electrical box through the first mounting opening into the interior of the electrical box; the hook extending from the back side of the electrical box through the second mounting opening into the interior of the electrical box; and the bend biasing at least one of the first or second sections of the first arm to secure the first arm within the first mounting opening.

Some embodiments of the invention provide an attachment for securing an electrical box to a between-stud (e.g., telescoping) support structure that has a front side and a back side, the electrical box including a back side with a first mounting opening and a second mounting opening. An attachment body can be configured to be secured to surround the telescoping support structure, in contact with and disposed between the front side of the telescoping support structure and the back side of the electrical box. An engagement arrangement can include a first arm that includes a first protrusion and is configured to extend from the attachment body along the back side of the electrical box, and a second arm that includes a second protrusion and is configured to extend from the attachment body along the back side of the electrical box, opposite the attachment body from the first arm. The first and second protrusions can be configured to be inserted from the back side of the electrical box through the first and second mounting openings, respectively, to secure the electrical box to the attachment body without use of a separate fastener Some embodiments of the invention provide a method of using an attachment to secure an electrical box to a support structure without the use of fasteners. The electrical box can include first and second mounting openings, and the attachment can include an attachment body and an engagement arrangement that includes a first arm that extends from a first side of the attachment body and a second arm that extends from a second side of the attachment body opposite the first side of the attachment body.

The electrical box can be angled relative to the attachment body to extend the second arm of the attachment through the second mounting opening. The electrical box can be tilted towards the attachment body to: extend the first arm of the attachment through the first mounting opening; snap a protrusion of the first arm into engagement with the electrical box at the first mounting opening; and dispose the attachment body to extend along a back side of the electrical box. The attachment can be secured to the support structure before or after the attachment is secured to the electrical box.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
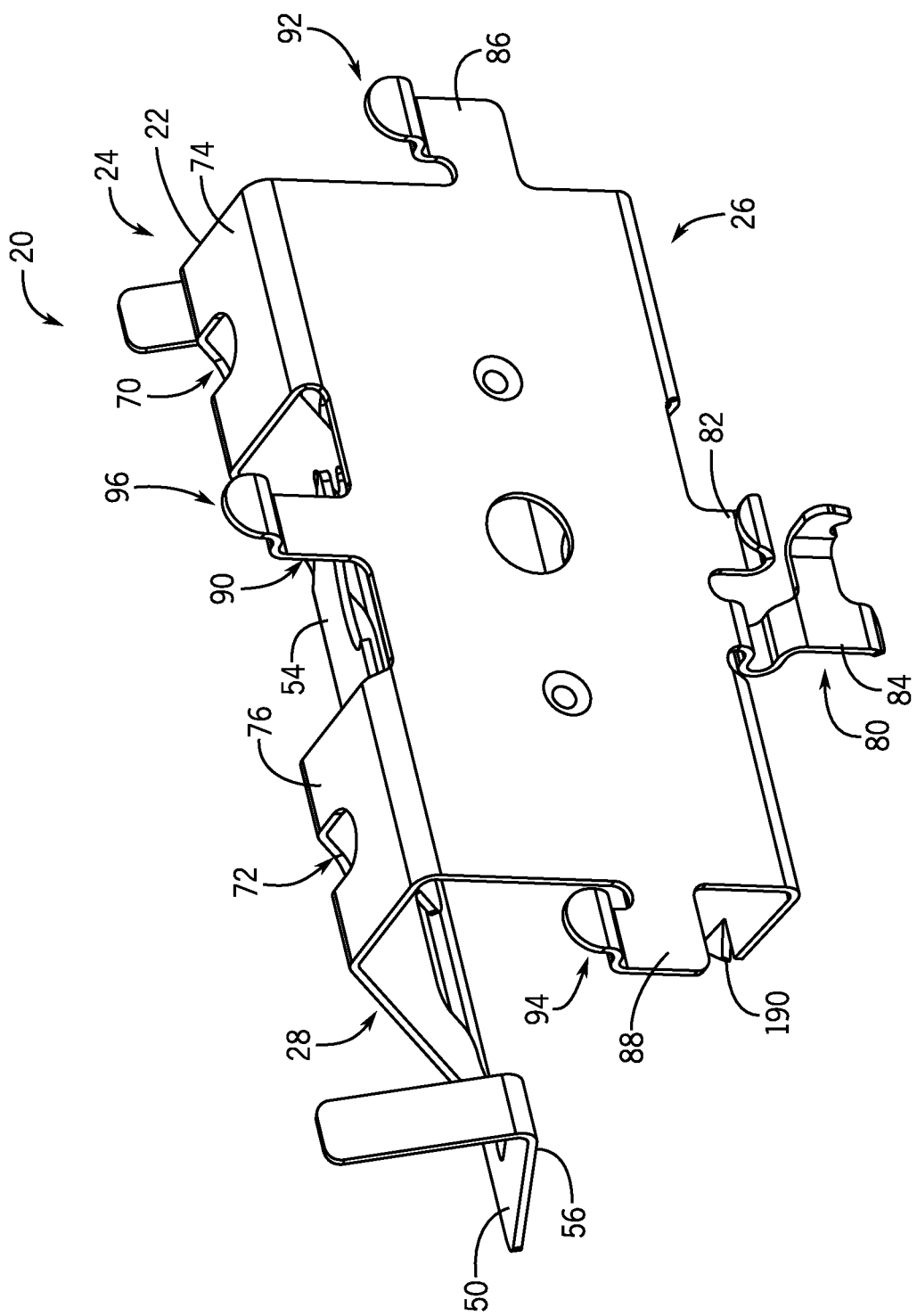
FIGS. 1 through 4 are isometric views of an attachment according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, it may be useful to secure electrical boxes or other equipment relative to support structures. In some arrangements, for example, a support structure such as a telescoping support bracket can be secured to extend between two studs of a building. The support structure can then be used to support an electrical box (or other object) at a particular location between the studs. In different embodiments, different types of support structures, including wall and ceiling structures can be used.

As also noted above, some conventional arrangements can allow electrical boxes to be secured to support structures using separate (e.g., threaded) fasteners. However, the use of fasteners can be inefficient, complicated, and cumbersome for installers. Further, some configurations may permit electrical boxes to be readily secured at only a discrete set of locations along a support structure. Accordingly, it may be useful to provide devices and corresponding methods to secure electrical boxes to support structures at any of a set of continuous locations along a support structure, without requiring the use of separate fasteners. Embodiments of the invention can address one or more of these or other issues.

In some embodiments, a device to secure an electrical box to an attachment without the use of fasteners can be configured as an intermediate attachment. Thus, according to some embodiments of the present disclosure, an intermediate attachment is provided that can be secured to a support structure without the use of fasteners, and can be secured to an electrical box without the use of fasteners. Accordingly, some attachments according to the present disclosure can secure electrical boxes to support structures without requiring any separate pieces, including separate fasteners.

Further, in some embodiments, an attachment according to the invention can be selectively configured for relatively easy adjustment along a support structure and for securely fixed engagement with the support structure at any of a continuous set of locations along the support structure. For example, attachments according to some embodiments can be moved easily along a support structure until placed in a closed (or closed and locked) configuration, under which the attachments strongly resist such movement.

In some embodiments, a device that can secure an electrical box without requiring fasteners (e.g., screws or other threaded fasteners) can simplify installation, as the installer may not need tools, fasteners, or other separate parts to install an electrical box to a support. Additionally, installation time can be significantly reduced as compared to conventional designs. For example, to install electrical boxes using some embodiments, an installer may not need to locate fasteners and subsequently install them, but can simply (e.g., manually, without tools) secure an attachment directly to an electrical box and to a corresponding support structure. As another example, attachments according to some embodiments of the present disclosure, can allow for efficient division of labor for large installations, which can decrease overall installation time. For example, with some embodiments, one worker can install attachments onto support structures, and another worker can subsequently install electrical boxes onto the attachments. Or one installer can install attachments onto electrical boxes and another installer can later install the electrical boxes and attachments onto support structures.

Some embodiments of the invention are expressly discussed below as being configured to secure particular types of electrical boxes to particular types of support structures. For example, some discussion below relates to attachments to secure four-outlet electrical boxes, that include a square array of mounting openings, to telescoping or other between-stud brackets. However, the embodiments expressly discussed and other embodiments of the invention can be used to secure a variety of types of electrical boxes (or other objects) and can be used in combination with a variety of types of support structures.

An attachment 20 according to one embodiment of the invention is illustrated in FIGS. 1 through 4. In general, the attachment 20 is configured to be releasably engaged with a support structure of any number of configurations and with an electrical box (or other object), in order to support the electrical box (or other object) relative to the support structure. Further, the attachment 20 can be selectively configured to be adjustable along certain types of support structures or to be releasably but securely engaged with the support structure and the electrical box, without the use of separate fasteners (e.g., without the use of screws).

In the embodiment illustrated, the attachment 20 is configured as an integral attachment body 22 that can be formed from a progressive die stamping operation out of a single piece of material. In some embodiments, sheet metal of any number of types and gauges can be used. In some embodiments, other manufacturing approaches are possible.

Generally, the attachment body 22 is configured to be placed over a support structure (not shown in FIGS. 1 through 4). As such, for example, the attachment body 22 includes a top portion 24, a front portion 26, and a back portion 28. The front and back portions 26, 28 are generally spaced apart from each other, with the attachment body 22 in an open configuration, in order to receive a support structure therebetween. Once the attachment body 22 receives a support structure, the top, front, and back portions 24, 26, 28 are configured to extend along top, front, and back sides of the support structure. For example, in an installed and locked configuration, as also discussed below, the top, front, and back portions 24, 26, 28 can be securely seated on top, front, and back sides of a between-stud support structure. In other arrangements, however, other configurations are possible.

Figure 14:
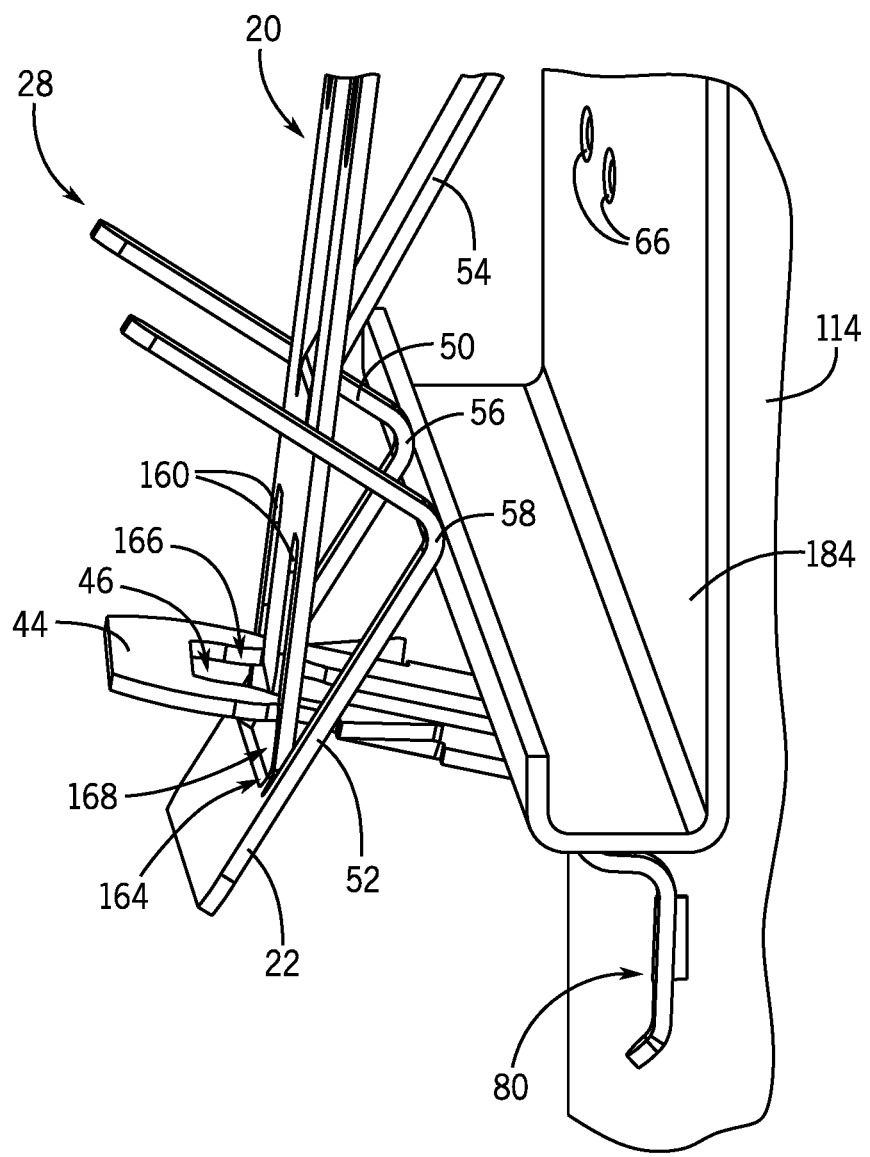
FIG. 14 is an isometric view of the attachment of FIGS. 1 through 4 in locked engagement with a support structure.

In the embodiment illustrated, the attachment body 22 is configured to be reversibly moved from an open configuration (as in FIGS. 1 through 4) to a closed configuration (see, e.g., FIG. 11) and then to a locked configuration (see, e.g., FIG. 14). Correspondingly, the back portion 28 and the front portion 26 of the attachment body 22 can include features that are configured to be releasably engaged with each other.

Figure 2:
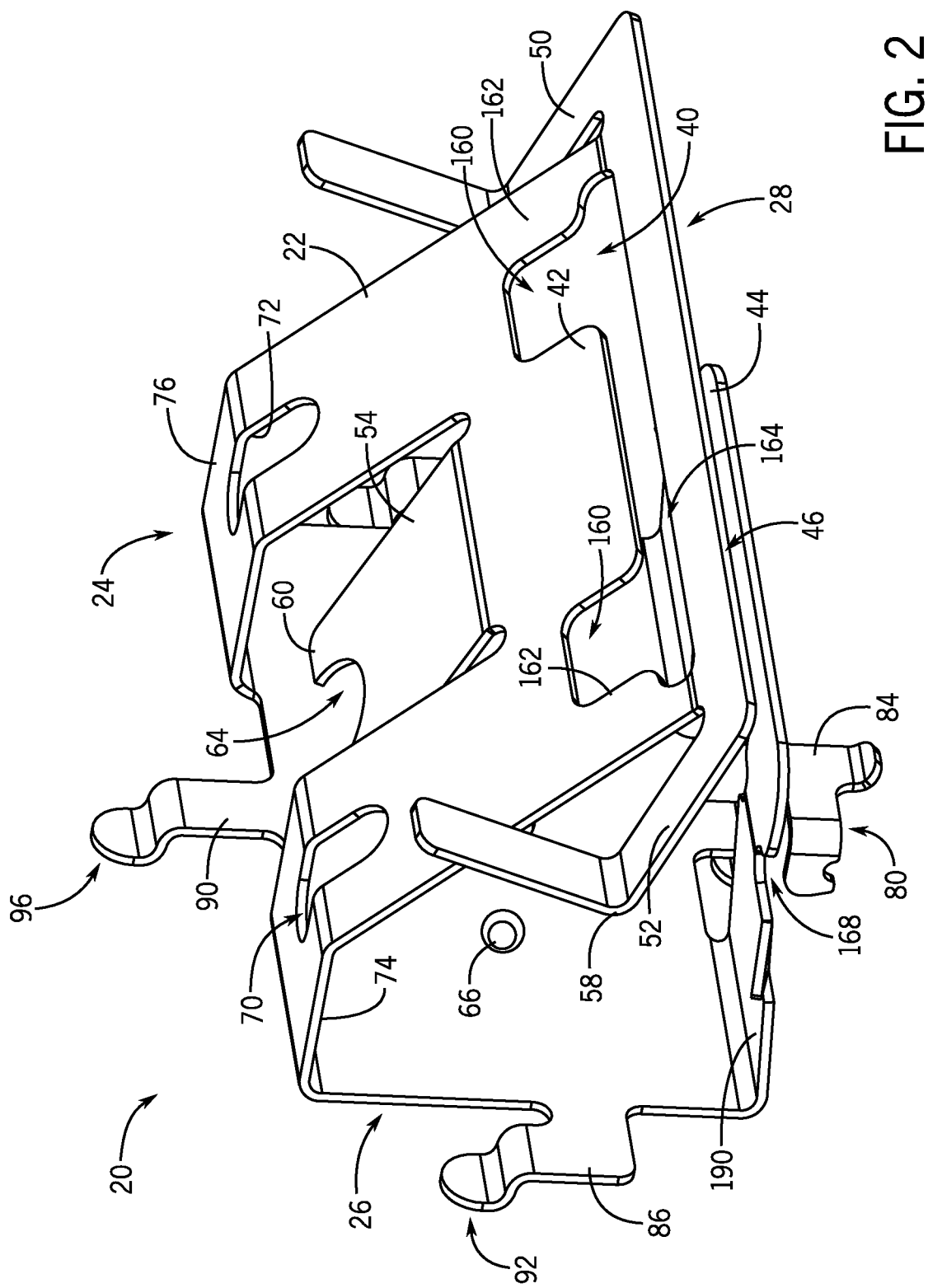
Figure 3:
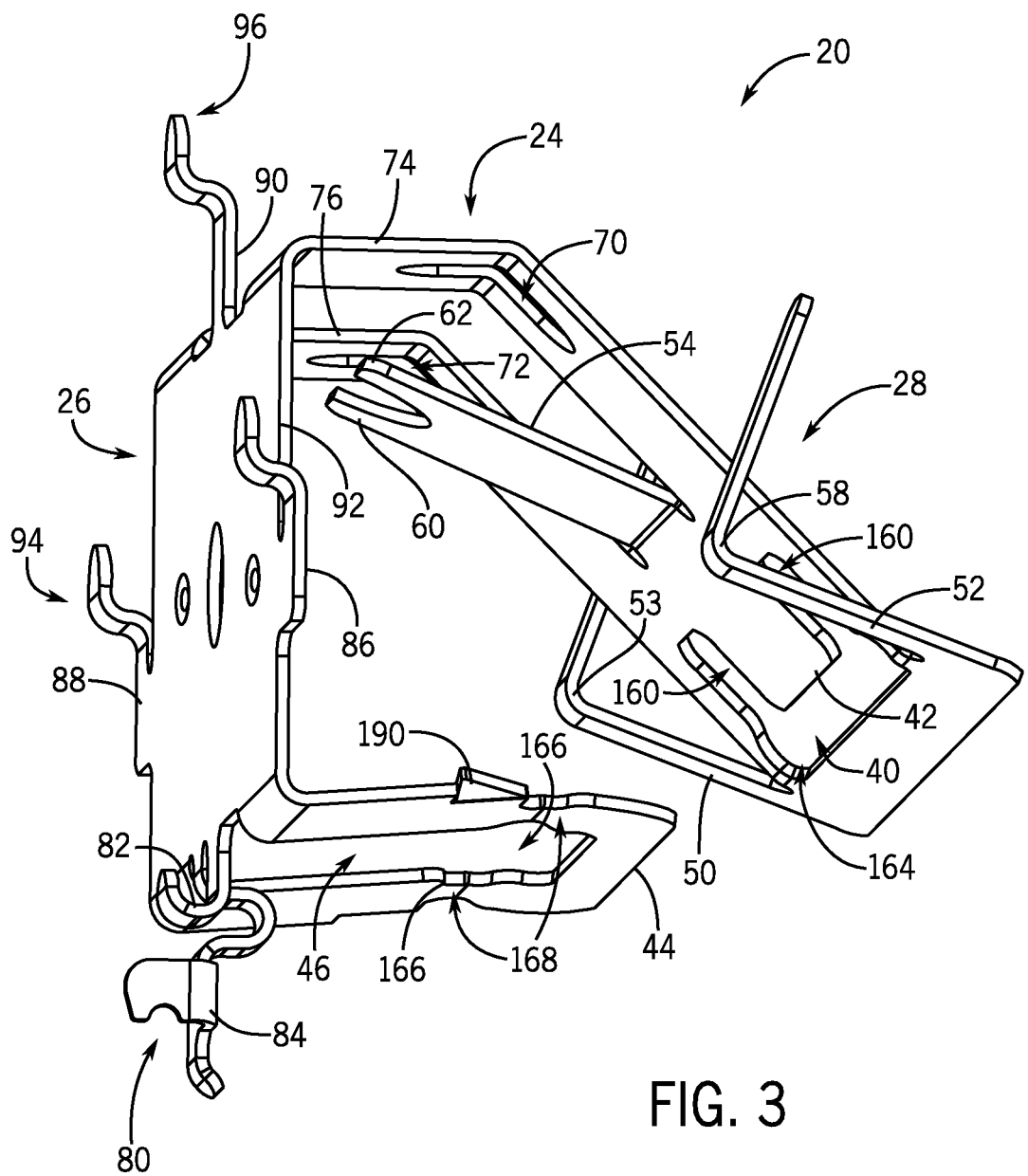
Figure 4:
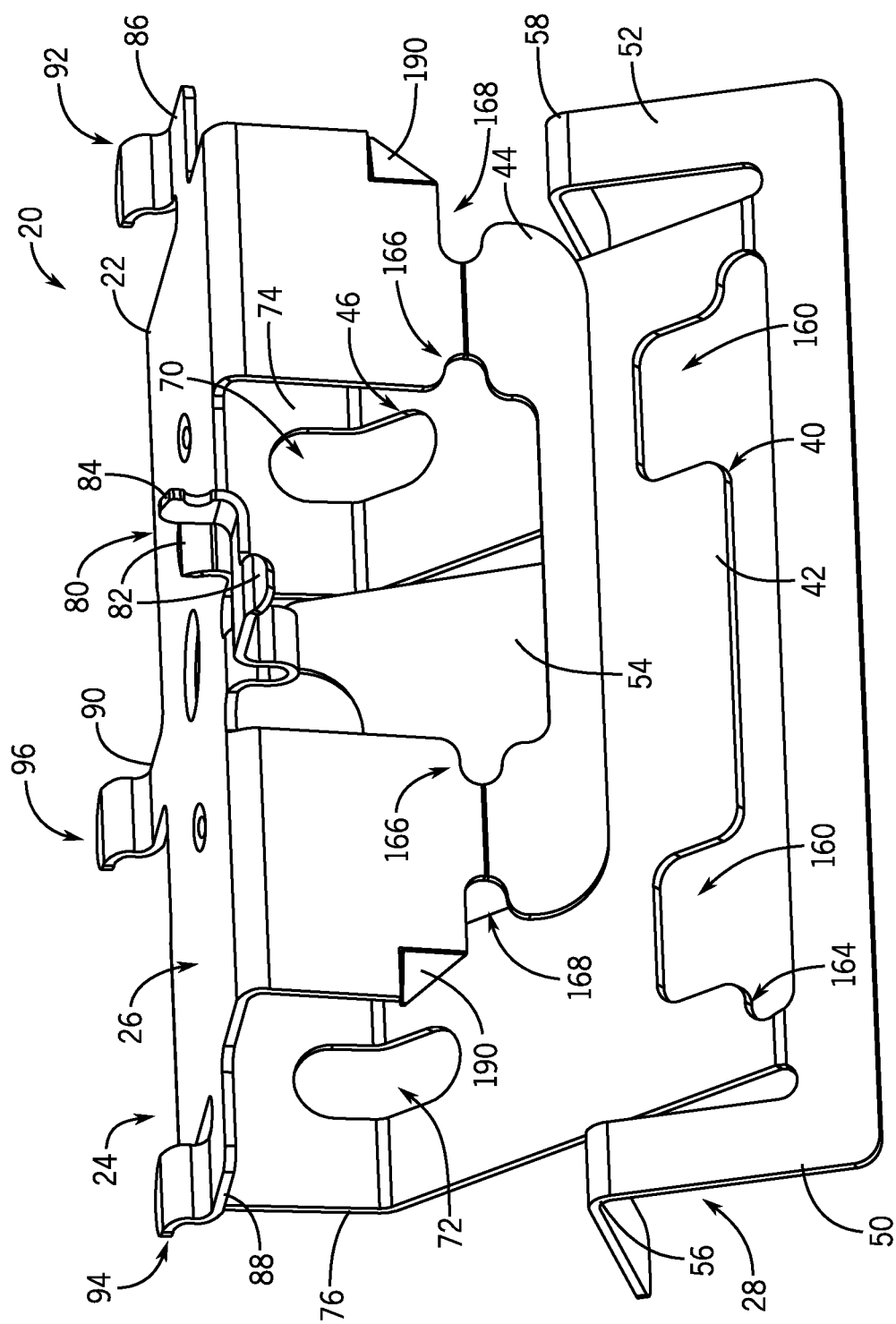

In different embodiments, different types of locking features can be provided to secure an attachment body in a locked configuration. For example, as illustrated in FIG. 2 in particular, the back portion 28 of the attachment body 22 includes a locking cut-out 40, and a locking tab 42 that extends into the locking cut-out 40. Correspondingly, as illustrated in FIG. 4 in particular, a locking feature that extends from the front portion 26 of the attachment body 22 is configured as a locking tongue 44 with a central opening 46. As also discussed below, the locking tongue 44 is configured to simultaneously engage with the locking tab 42 and with side walls of the locking cut-out 40 in order to releasably secure the attachment body 22 in a locked configuration.

In some embodiments, other features can be provided to help secure an attachment to a support structure. For example, in the embodiment illustrated, a set of spring arms 50, 52, 54 extend from the back portion 28 of the attachment body 22. In particular, the spring arms 50, 52 extend from opposite lateral sides of the back portion 28 of the attachment body 22, as may be useful, for example, to secure an electrical box against rotation. To help provide appropriate flexibility, the spring arms 50, 52 are connected by an angled flange that extends integrally across the lateral width of the back portion 28, adjacent to the locking cut-out 40. Further, each of the spring arms 50, 52 exhibits a substantially right-angle bend 56, 58 at approximately a mid-point of its length.

In lateral offset from the spring arms 50, 52, the spring arm 54 extends from a central area of the back portion 28 of the attachment body 22, substantially in alignment with the locking tab 42. Further, a free end of the spring arm 54 includes a set of prongs 60, 62 that are spaced apart from each other by a cut-out 64.

Also to help secure the attachment 20 to a support structure, the inside face of the front portion 26 of the attachment body 22 includes a set of protrusions 66 (see, e.g., FIGS. 1 and 2). In the embodiment illustrated, a linear array of at least two of the protrusions 66 is provided, with the protrusions being formed as generally semi-spherical features, although other configurations are possible. As also discussed below, the protrusions 66 can engage corresponding features on a support structure to index and secure the attachment 20 relative to the support structure.

In some embodiments, aspects of an attachment body can allow an attachment to be manually (or otherwise) deformed into closed, locked, or other configurations. In the embodiment illustrated, for example, closed slots 70, 72 are formed, respectively, on support arms 74, 76 that extend along the top and back portions 24, 28 of the attachment body 22. As desired, the configuration (e.g., width) of the slots 70, 72 and of the support arms 74, 76 can be selected to provide an appropriate balance of resilience and flexibility for the attachment body 22. This may be useful, for example, during installation of the attachment 20, as also discussed below.

In some embodiments, an attachment according to the invention can include one or more engagement arrangements that are configured to engage an electrical box (or other object) to secure the electrical box (or other object) to the attachment. In some embodiments, as also noted above, engagement arrangements can allow an electrical box (or other object) to be secured to an attachment without the use of screws or other separate fasteners. In the embodiment illustrated, for example, a first engagement arrangement 80 includes a first arm 82 and a second arm 84 that are configured to be placed into simultaneous, screw-less engagement with a mounting opening on an electrical box.

Additional engagement arrangements of the attachment body 22 can also be configured to engage mounting openings of an electrical box without the use of fasteners. For example, in the embodiment illustrated, a set of three tabs 86, 88, 90 provide additional engagement arrangements, each being formed integrally with the attachment body 22 and including a respective jogged end 92, 94, 96.

In the embodiment illustrated, the attachment arrangement 80 is disposed centrally, at a bottom end of the front portion 26 of the attachment body 22. The tabs 86, 88 are disposed at opposite lateral ends of the front portion 26 of the attachment body 22, and the tab 90 is disposed centrally at a top end of the front portion 26 of the attachment body 22. As also discussed below, this may be useful to secure an electrical box with standard mounting openings to the attachment body 22. In other embodiments, however, other configurations are possible, including configurations with different numbers, orientations, or structural designs of engagement arrangements.

Figure 5B:
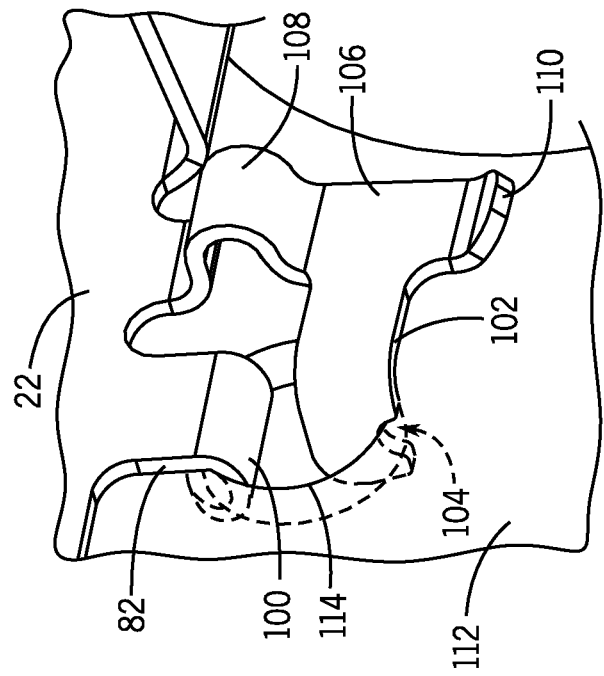
FIGS. 5A and 5B are isometric views of an engagement arrangement of the attachment of FIGS. 1 through 4, according to an embodiment of the invention, in isolation and as engaged with an electrical box, respectively.
Figure 5A:
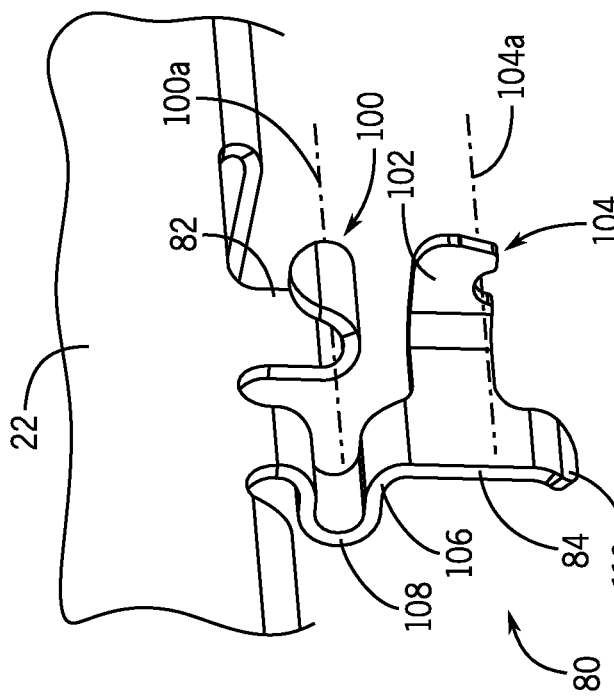

Certain additional aspects of the engagement arrangement 80 are illustrated in particular in FIG. 5A. As also noted above, the first and second arms 82, 84 of the engagement arrangement 80 are configured to be placed into simultaneous engagement with a single mounting opening of an electrical box. In some embodiments, the first and second arms 82, 84 can be configured to engage opposite portions of a mounting opening, to provide a particularly secure engagement. In the embodiment illustrated, for example, the first arm 82 is configured as a generally planar extension from the front portion 26 of the attachment body 22, with a hooked end 100 that bends generally around an axis 100$a$ back towards the bulk of the attachment body 22 (i.e., upwardly, in the perspective of FIG. 5A).

Similarly to the first arm 82, the second arm 84 includes a generally planar engagement portion 102, with a hooked end 104. However, the hooked end 104 of the second arm 84 bends generally around an axis 104$a$, to extend opposite the hooked end 100 of the first arm 82. Further, an elongate width of the engagement portion 102 of the second arm 84 (i.e., as measured vertically in FIG. 5A) is disposed generally perpendicularly to an elongate width of the first arm 82 (i.e., as measured horizontally in FIG. 5A), where the engagement portion 102 and the first arm 82 are configured to collectively engage a mounting opening (see, e.g., FIG. 5B).

In the embodiment illustrated, the axis 100$a$, around which the hooked end 100 of the first arm 82 bends, is generally parallel to the elongate width of the first arm 82. In contrast, the axis 104$a$, around which the hooked end 104 of the second arm 84 bends, is generally perpendicular to the elongate width of the second arm 84. Likewise, the hooked end 100 is formed as a continuous bend in the first arm 82, whereas the hooked end 104 is formed as a notch in the engagement portion 102 of the second arm 84. In other embodiments, other configurations are possible.

In some embodiments, one or more parts of an engagement arrangement can be configured to provide a biasing force to help secure an electrical box to the relevant attachment. In the embodiment illustrated, for example, the second arm 84 includes a support portion 106 that is configured to bias the hooked end 104 of the engagement portion 102 away from the hooked end 100 of the first arm 84, when the hooked ends 100, 104 are engaged with an electrical box (see, e.g., FIG. 5B). In particular, the support portion 106 includes a resilient convolute spring section 108 configured to urge the hooked end 104 generally downwardly when the hooked ends 100, 104 are engaged with a standard mounting opening of an electrical box. In other embodiments, however, other biasing configurations are possible.

In some embodiments, other features can be provided. For example, in the embodiment illustrated, a free end of the second arm 84 of the engagement arrangement 80 also includes an angled tab 110. As also discussed below, the tab 110 can be useful when removing an electrical box from engagement with the attachment 20.

As also noted above, and as illustrated in FIG. 5B in particular, the hooked ends 100, 104 of the first and second arms 82, 84 can be used to simultaneously engage an electrical box. For example, with a rear face of an electrical box 112 seated against the front portion 26 of the attachment body 22, the first and second arms 82, 84 can extend into a single mounting opening 114 of the electrical box 112, with the hooked ends 100, 104 engaging opposing sides of the mounting opening 114. This can relatively firmly secure the electrical box 112 to the engagement arrangement 80.

Further, in some embodiments, simultaneous engagement of the hooked ends 100, 104 with a mounting opening may require an upward displacement of the second arm 84, so that the spring section 108 is somewhat compressed. Accordingly, for example, the spring section 108 may bias the hooked end 104 (and, indirectly, also the hooked end 100) into an even more secure engagement with the mounting opening 114. Thus, for example, the hooked ends 100, 104 can cooperate to relatively firmly secure the electrical box 112 to the attachment body 22.

In some embodiments, the hooked ends 100, 104 can be configured for selectively releasable engagement with an electrical box. For example, in some arrangements, a user may be able to manually (or otherwise) apply an upward or prying force to the tab 110, in order to remove the hooked end 104 from the mounting opening 114. With the hooked end 104 thus removed from the mounting opening 114, it may then be possible to also readily remove the hooked end 100 from the mounting opening 114, and thereby release the electrical box 112 from the engagement arrangement 80.

In some configurations, an electrical box can include multiple openings. Correspondingly, in some embodiments of the invention, multiple engagement arrangements on an attachment can be configured to secure an electrical box in an installed configuration. Further, in some embodiments, multiple engagement arrangements can cooperate to assist a user in properly and easily installing the electrical box on the attachment.

Figure 6:
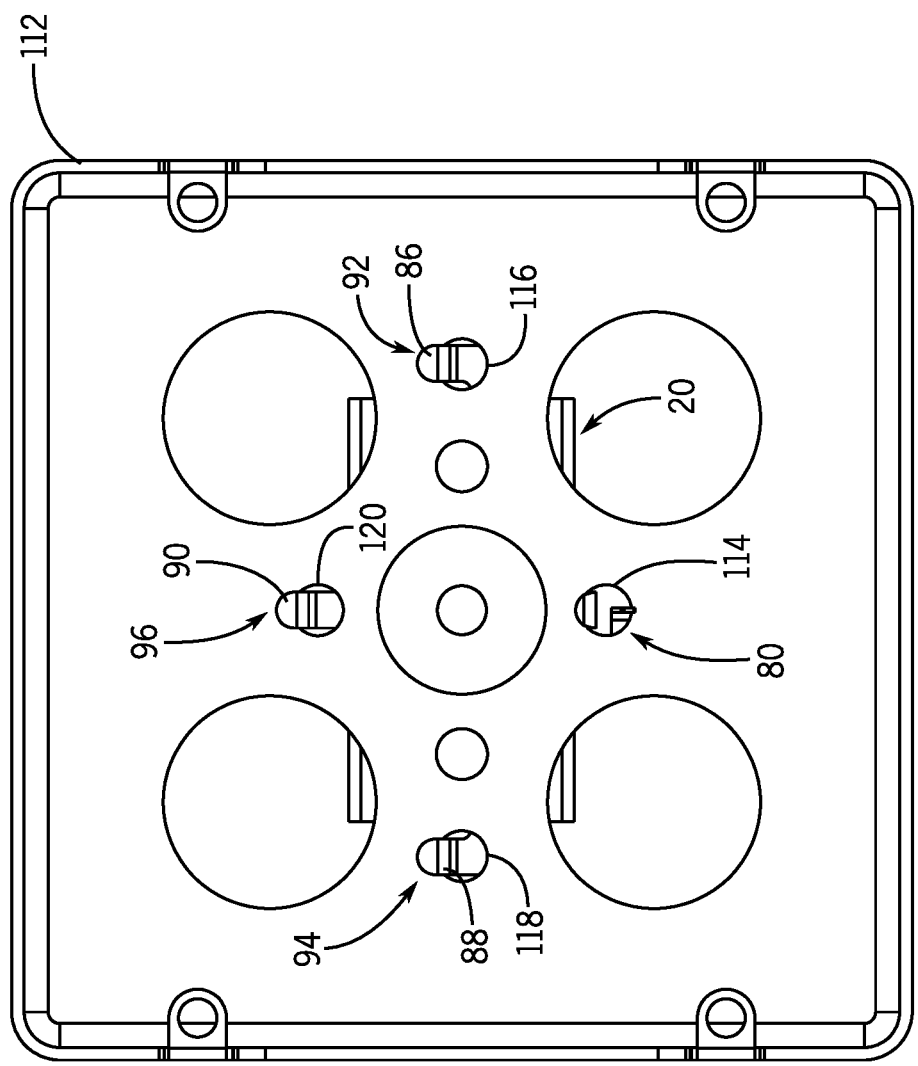
FIG. 6 is a front elevation view of the attachment of FIGS. 1 through 4 engaged with an electrical box.

As illustrated in FIG. 6, for example, the electrical box 112 further includes mounting openings 116, 118, 120. In some arrangements, to secure the electrical box 112 to the attachment body 22, the mounting openings 116, 118, 120 can be aligned to receive the jogged ends 92, 94, 96 of the tabs 86, 88, 90. The electrical box 112 can then be slid along the attachment body 22 (i.e., downward, from the perspective of FIG. 6), with the relative movement of the tabs 86, 88, 90 within the mounting openings 116, 118, 120 helping to guide movement of the electrical box 112 into appropriate alignment with the engagement arrangement 80.

In this way, for example, via a sliding movement of the electrical box 112, as guided by the tabs 86, 88, 90, the hooked end 100 of the first arm 82 (see also FIG. 5A) can be engaged with the mounting opening 114. Further, with appropriate pressure on the electrical box 112, assisted as needed by application of an upward force on the second arm 84 (see also FIG. 5A), the hooked end 104 of the second arm 84 can also be moved (e.g., snapped) into engagement with the mounting opening 114. Thus, for example, the electrical box 112 can be firmly secured to the attachment body 22 with a relatively simple installation process and without requiring any separate fasteners.

Figure 7:
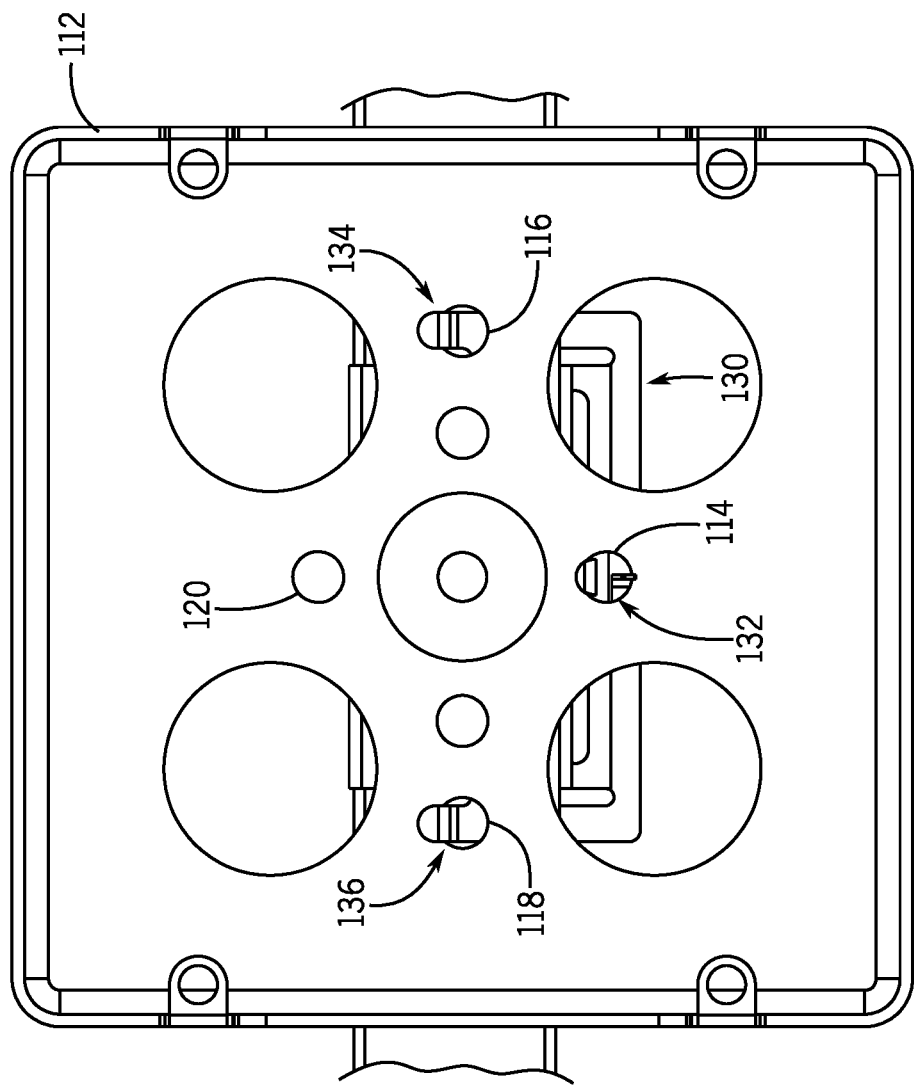
FIG. 7 is a front elevation view of another attachment engaged with an electrical box, according to other embodiments of the invention.

In other embodiments, other configurations are possible. In some embodiments, for example, as also noted above, a different number of engagement arrangements can be provided on an attachment. As illustrated in FIG. 7, for example, an attachment 130 is generally similar to the attachment 20, including with respect to a two-armed engagement arrangement 132 and jogged left and right engagement tabs 134, 136. In contrast to the attachment 20, however, an engagement arrangement is not provided at the top of the attachment 130. In this regard, for example, the electrical box 112 can be installed on the attachment 130 similarly to the installation described above for the attachment 20. However, the attachment 130 may engage only the mounting openings 114, 116, 118 of the electrical box 112.

Figure 8:
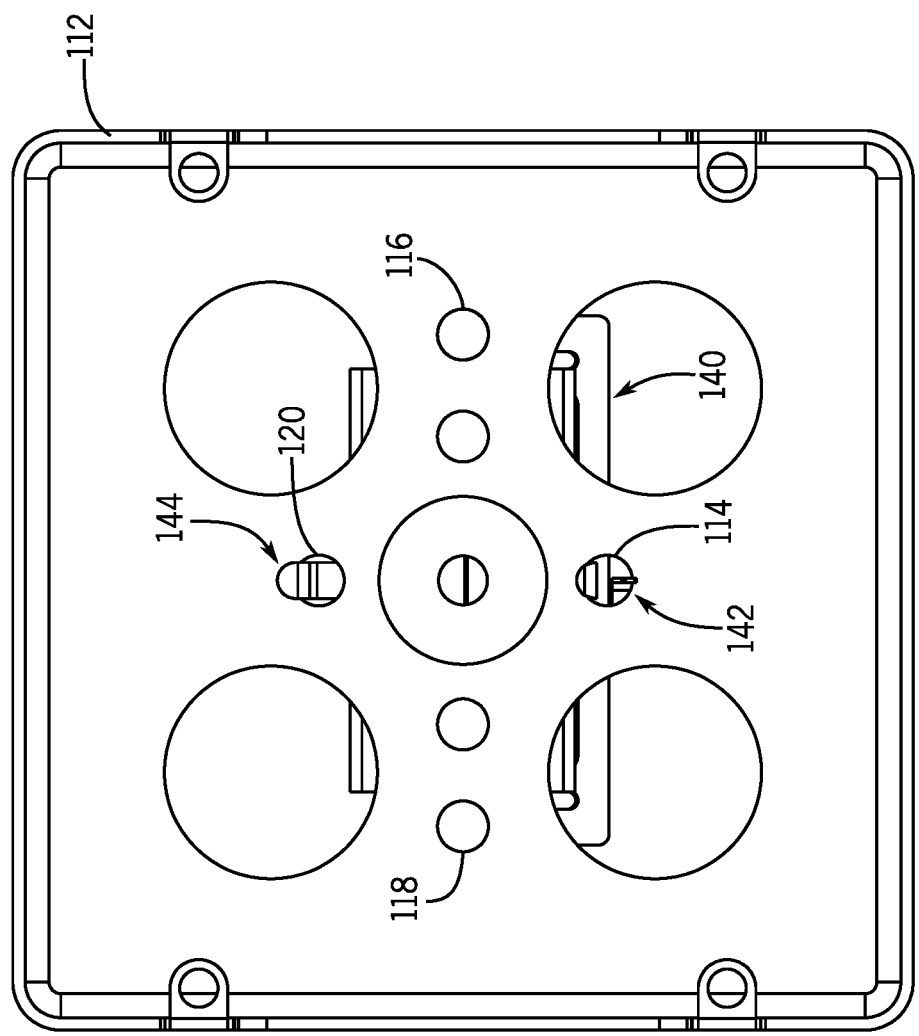
FIG. 8 is a front elevation view of another attachment engaged with an electrical box, according to other embodiments of the invention.

As another example, as illustrated in FIG. 8, an attachment 140 is generally similar to the attachment 20, including with respect to a two-armed engagement arrangement 142 and a jogged top engagement tab 144. In contrast to the attachment 20, however, an engagement arrangement is not provided at either lateral side of the attachment 140. In this regard, for example, the electrical box 112 can be installed on the attachment 140 similarly to the installation described above for the attachment 20. However, the attachment 140 may engage only the mounting openings 114, 120 of the electrical box 112.

As noted above, some embodiments of the invention can be reversibly moved between open, closed, and (as appropriate) locked configurations. In some embodiments, features on an attachment can be configured to help secure the attachment in any one of these configurations. In the attachment 20, for example, as also noted above, the attachment body 22 includes the locking cut-out 40 with the locking tab 42, and the locking tongue 44 with the central opening 46, which can help to secure the attachment 20 in a locked configuration.

Figure 9:
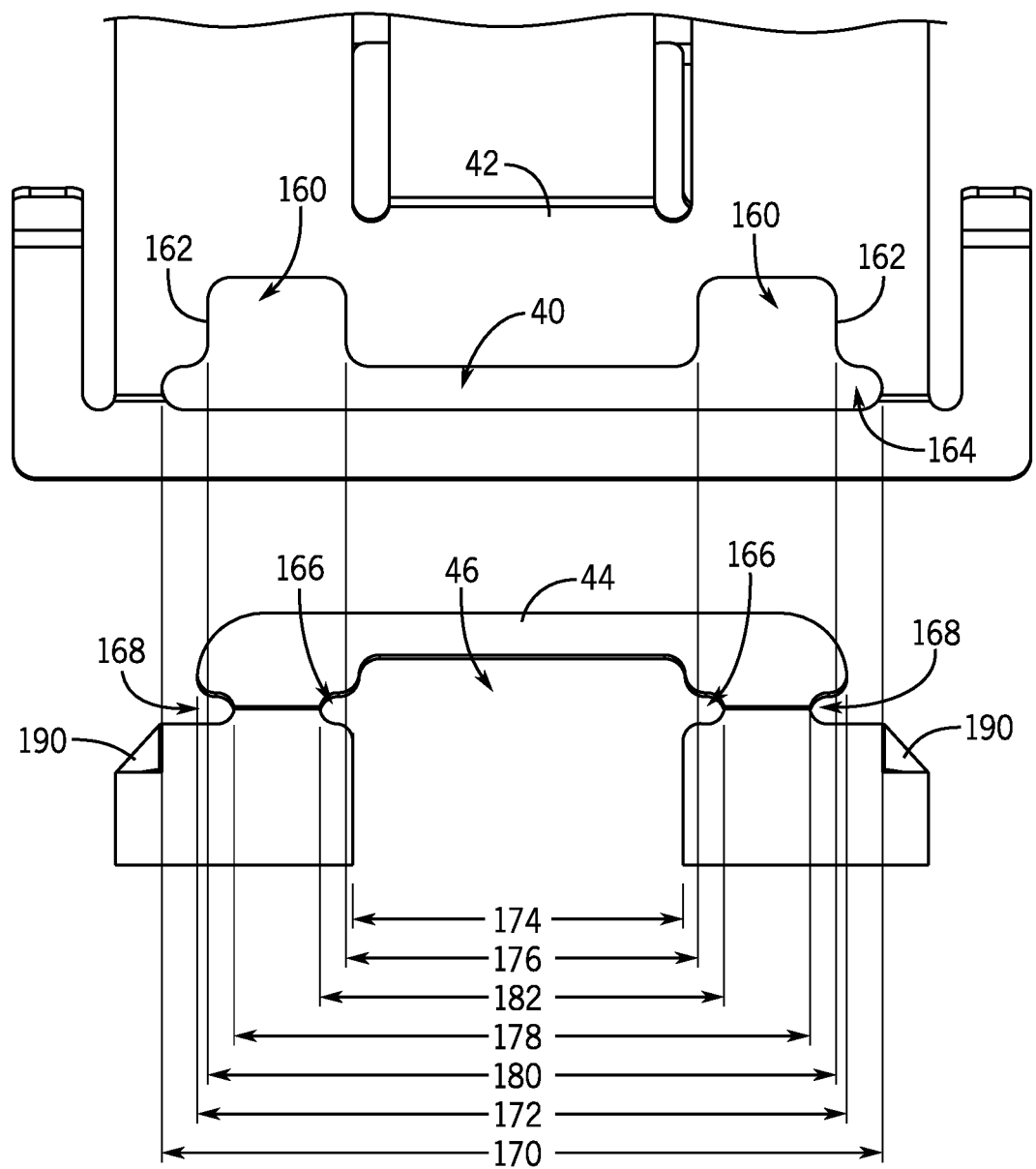
FIG. 9 is a front elevation view of locking features of the attachment of FIGS. 1 through 4, in partial isolation.

In some embodiments, locking features, such as the locking cut-out 40 and the locking tongue 44, can be configured to provide a releasable keyed engagement to secure an attachment in a locked configuration. For example, as illustrated in FIG. 9 in particular, the locking cut-out 40 includes keying portions 160 on opposing sides of the locking tab 42, bounded by lateral side walls 162 of the locking cut-out 40. The locking cut-out 40 also includes an insertion portion 164 that is disposed generally below, opens into, and extends laterally beyond the keying portions 160. Correspondingly, a first set of slots 166 extend from the central opening 46 into the locking tongue 44, and a second set of slots 168 extend from into the locking tongue 44 opposite the first set of slots 166.

Usefully, a lateral width 170 of the insertion portion 164 of the locking cut-out 40 is somewhat wider than a lateral width 172 of a free end of the locking tongue 44. Also, a lateral width 174 of the central opening 46 is generally smaller than a lateral width 176 of the locking tab 42. Further, a lateral width 178 between the closed ends of the slots 168 is somewhat smaller than a lateral width 180 between the side walls 162 of the locking cut-out 40, and a lateral width 182 between the closed ends of the slots 166 is somewhat larger than the lateral width 176 of the locking tab 42.

Figure 10:
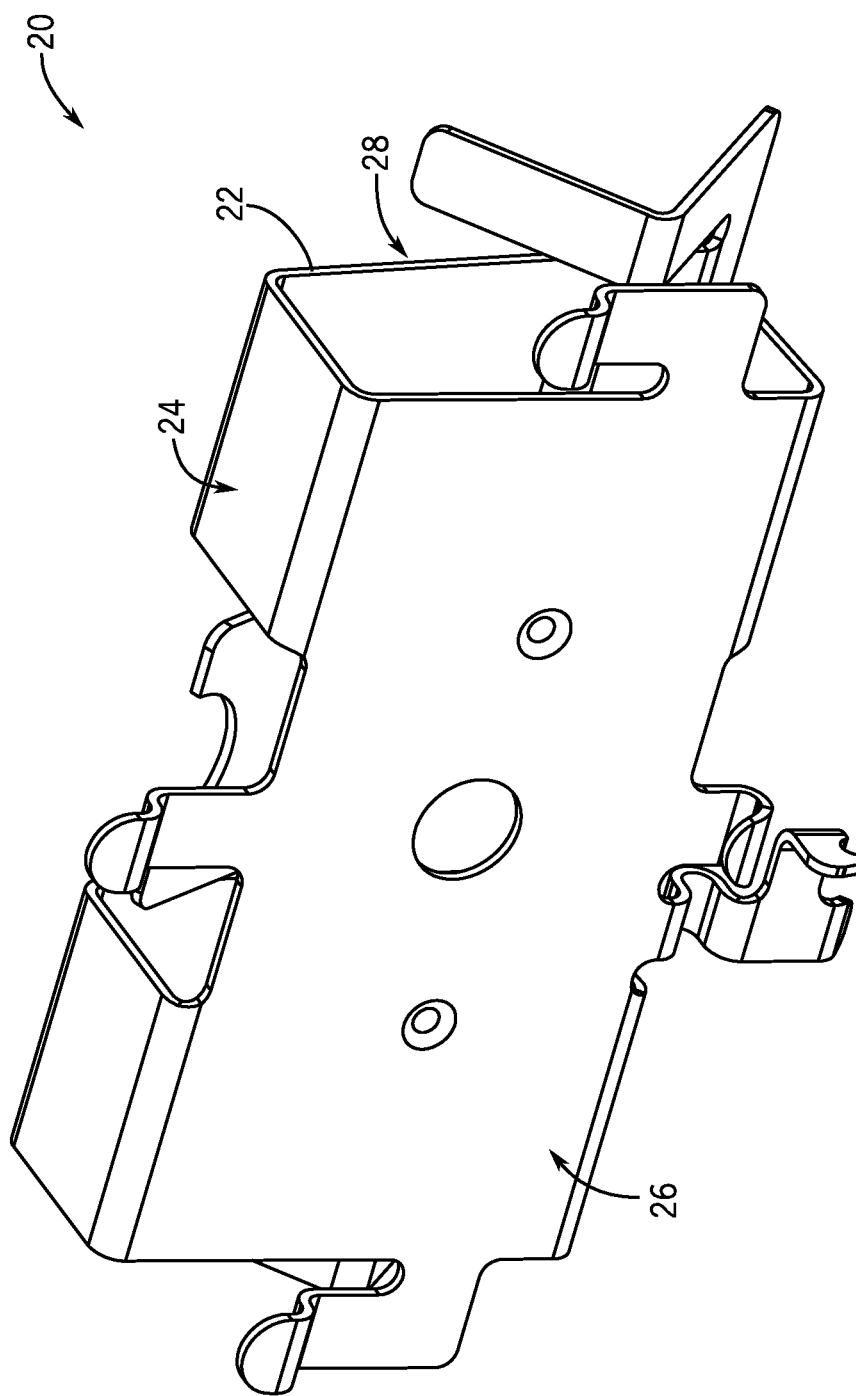
FIG. 10 is an isometric view of the attachment of FIGS. 1 through 4 in a closed configuration.
Figure 11:
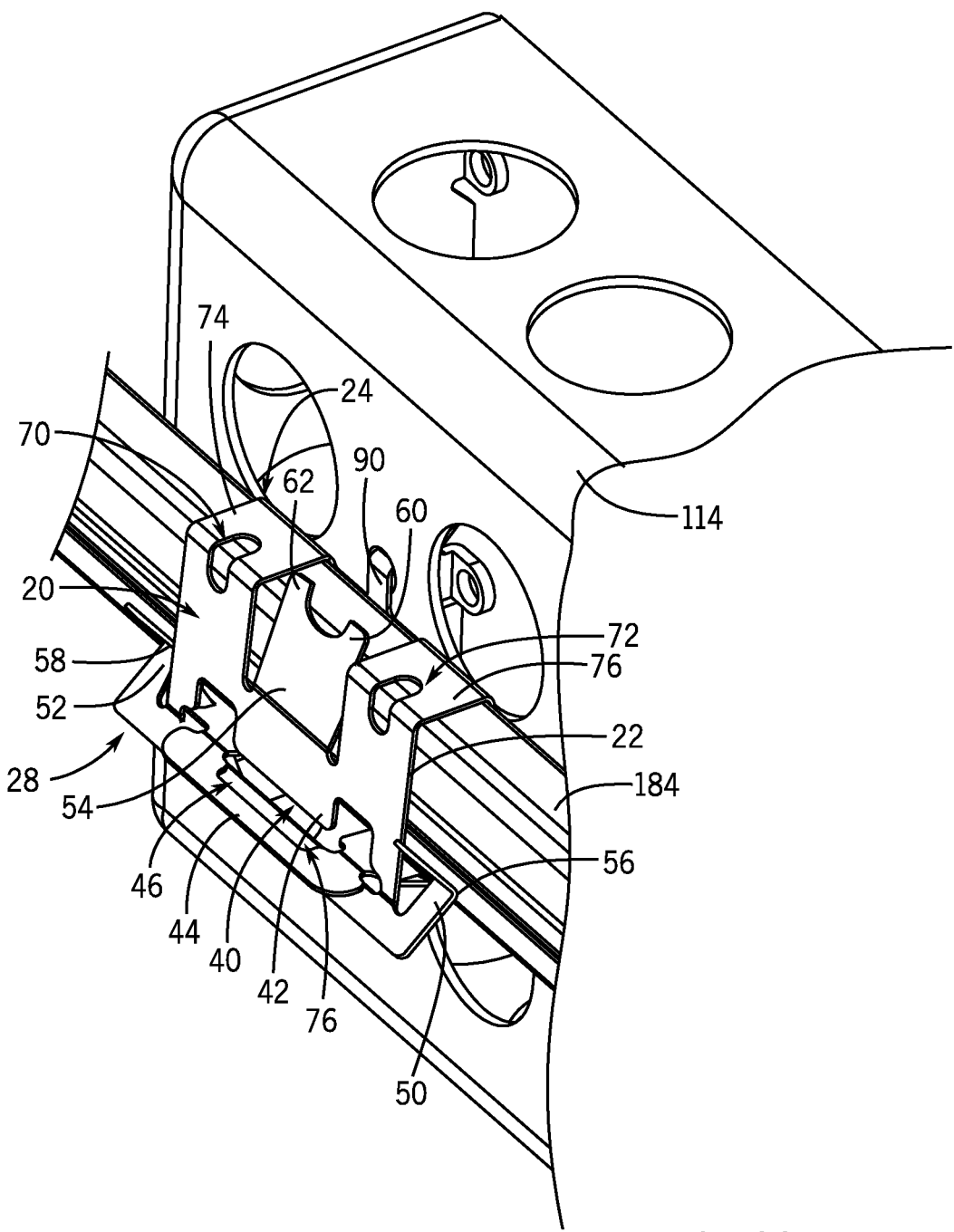
FIGS. 11 and 12 are isometric views of the attachment of FIGS. 1 through 4 in the closed configuration, disposed over a support structure.
Figure 12:
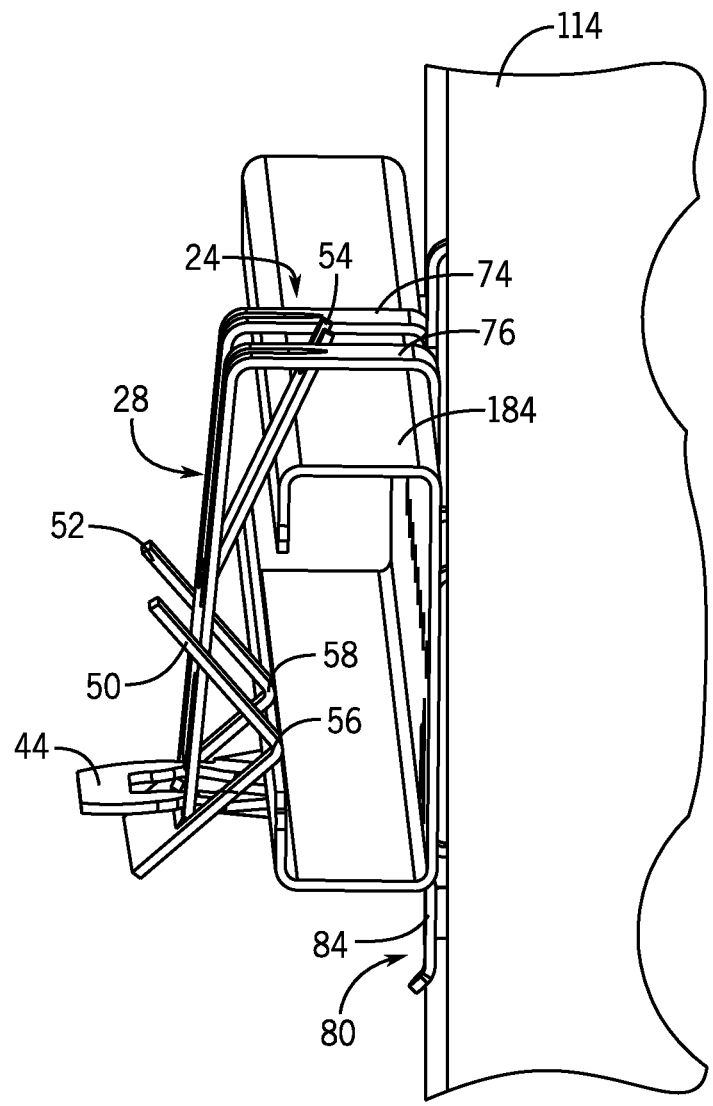
Figure 13:
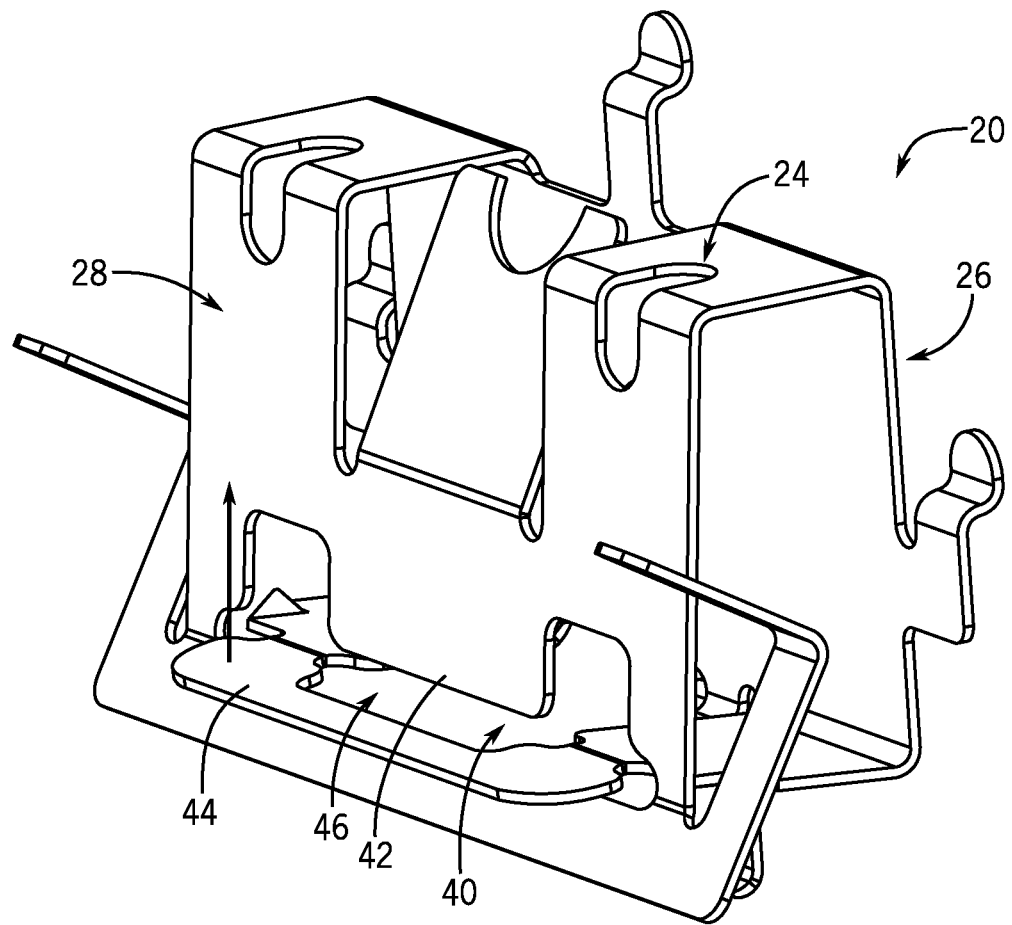
FIG. 13 is an isometric view of the attachment of FIGS. 1 through 4 in the closed configuration.

Accordingly, in the illustrated embodiment, the locking tongue 44 can be readily moved into the insertion portion 164 of the locking cut-out 40, such as by manually urging the front and back portions 26, 28 of the attachment body from an open configuration (see, e.g., FIG. 1) to a closed configuration (see, e.g., FIGS. 10 through 12). The locking tongue 44 can then be urged upwardly (e.g., as indicated in FIG. 13) in order to move the locking tab 42 and the side walls 162 of the locking cut-out 40 into simultaneous engagement with the slots 166, 168, respectively (see, e.g., FIG. 14). In this way, for example, the attachment 20 can be securely locked in a closed configuration around a support structure, such as a between-stud telescoping support 184 (see FIG. 14).

In this regard, to install the attachment 20 on the telescoping support 184, the attachment 20 can first be placed over the telescoping support 184 and then moved to the closed configuration, as illustrated in FIG. 11. In the arrangement illustrated in FIG. 11, when the attachment 20 is in a closed configuration over the telescoping support 184, at least part of each of the top, front, and back portions 24, 26, 28 of the attachment body 22 are seated on the top, front, and back sides of the telescoping support 184. For example, the spring arms 50, 52, 54 of the attachment body 22 are seated on top and bottom rear rails of the telescoping support 184, which can help to generally secure the attachment body 22 to the telescoping support 184, while also urging the front portion 26 of the attachment body 22 into a relatively firmly seated engagement with the telescoping support 184. In other embodiments, other configurations are possible.

With the attachment 20 installed over the telescoping support 184, but not yet locked around the telescoping support 184, it may be possible to slide the attachment 20 along the telescoping support 184 without removing the attachment from the telescoping support 184. This may be useful, for example, in order to position a support electrical box at a relatively precise position along the telescoping support 184. In some arrangements, the attachment 20 can be installed over the telescoping support 184 and slid to an appropriate location before an electrical box is attached to the attachment 20. In some arrangements, an electrical box can be attached to the attachment 20 before the attachment 20 is installed over or slid along the telescoping support 184.

As illustrated in FIGS. 13 and 14 in particular, once the attachment 20 is disposed appropriately along the telescoping support 184 (not shown in FIG. 13), the attachment 20 can be locked around the telescoping support 184 by urging the locking tongue 44 upwardly into keyed engagement with the locking cut-out 40 and the locking tab 42. With the attachment 20 thus locked around the telescoping support 184, it may be relatively difficult to slide the attachment 20 relative to the telescoping support 184. In this way, for example, an attached electrical box (e.g., the electrical box 112) can be relatively firmly, albeit removably, secured at a desired location on the telescoping support.

In some embodiments, features on the attachment 20 can further assist in securing an electrical box relative to a support structure. For example, as illustrated in FIG. 4 in particular, angled teeth 190 can extend inwardly from the locking tongue 44. In some arrangements, as illustrated in FIG. 15 in particular, when the attachment 20 is locked around the telescoping support 184, the teeth 190 can dig into the telescoping support 184 in order to further resist sliding movement of the attachment 20.

Figure 15:
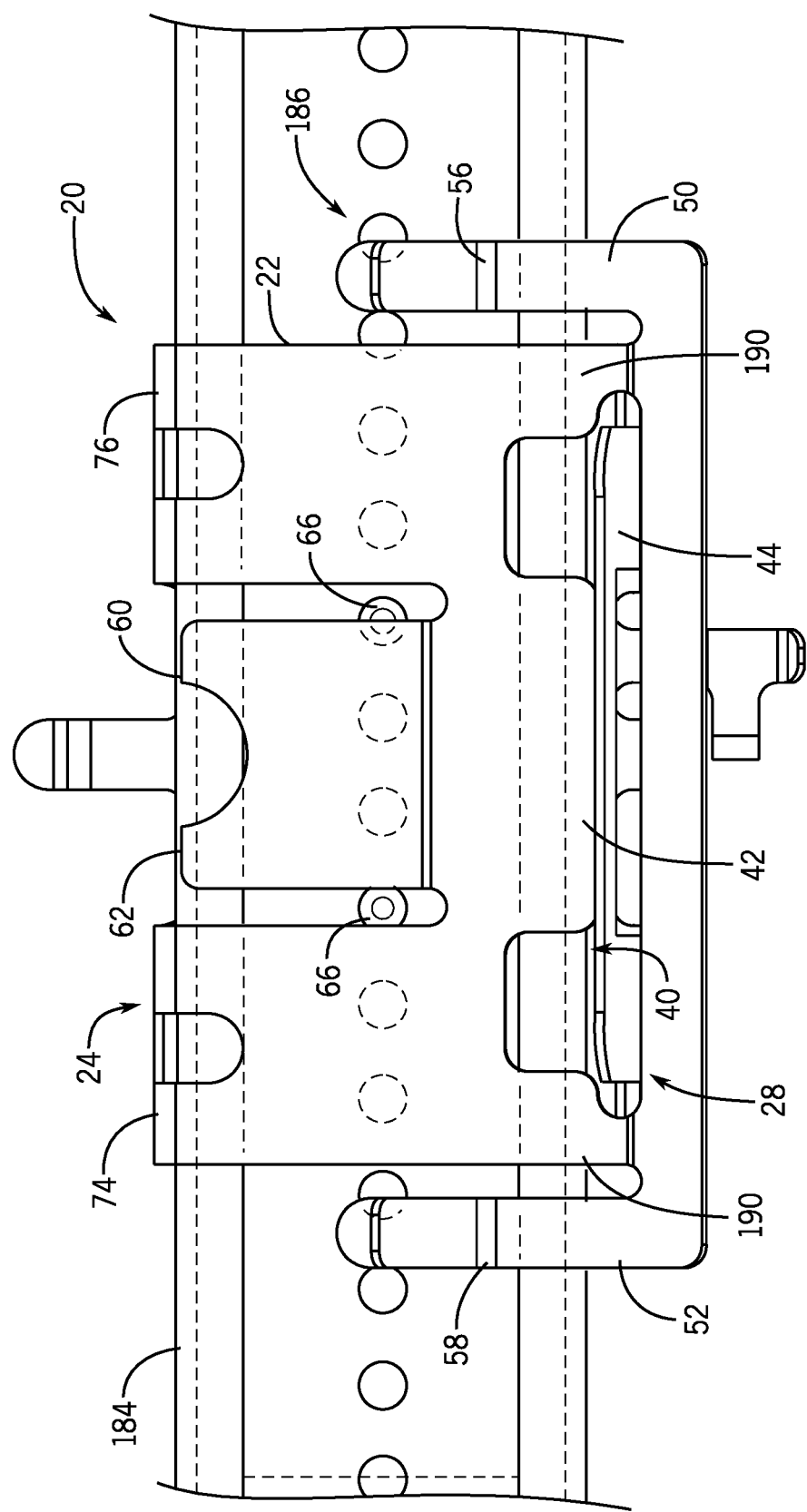
FIG. 15 is a front view of the attachment of FIGS. 1 through 4 in locked engagement with a support structure.

As another example, as also illustrated in FIG. 15 in particular, a linear array of openings 186 is arranged laterally along the telescoping support 184. Usefully, when the attachment 20 is locked around the telescoping support 184, the protrusions 66 on the attachment body 22 can firmly engage select sets of the openings 186 in order to further resist sliding movement of the attachment 20 relative to the telescoping support. Additionally, in some embodiments, alignment of the protrusions with particular openings 186 can help a user to appropriately align a support electrical box at a particular location along the telescoping support 184 (e.g., at a prescribed distance from a stud).

As another example, as also illustrated in FIG. 15 in particular, when the attachment 20 is locked around the telescoping support 184, the bends 56, 58 of the spring arms 50, 52 and the prongs 60, 62 of the spring arm 54 are pressed into engagement with bottom and top rear rails, respectively, of the telescoping support 184. The resulting deformation of the spring arms 50, 52, 54 can impose a biasing force on the attachment body 22, which can relatively firmly urge the front portion 26 of the attachment body 22 into the front side of the telescoping support 184. This arrangement can be useful, for example, in order to ensure that an attached electrical box (not shown in FIG. 15) is appropriately aligned and secured relative to the telescoping support 184. It can also assist in holding the locking tongue 44 in keyed engagement with the locking cut-out 40 and the locking tab 42 (as also described above). Further, by virtue of being disposed on opposite lateral sides of the attachment body 22, the spring arms 50, 52 can provide relatively substantial resistance to rotational deflections of an electrical box.

In some embodiments, one or more of the spring arms 50, 52, 54 can be configured to engage a support structure at different depths relative to another of the spring arms 50, 52, 54. This may be useful, for example, for supports, such as the telescoping support 184, that include a male and a female support member (not shown), with the female support member having a smaller depth than the male support member to allow a telescoped configuration. Because the spring arms 50, 52, 54 can be deflected somewhat independently of each other, some of the spring arms 50, 52, 54 may be able to firmly engage a male support member, while others of the spring arms 50, 52, 54 may be able to simultaneously firmly engage a female support member, to appropriately secure the electrical box to the telescoping support 184. Further, in some arrangements, with the attachment body straddling a divider between the male and female support members, the spring arm 54 can twist relative to the remainder of the attachment body 22, so that the prongs 60, 62 can respectively engage the male and female support members simultaneously.

Figure 16:
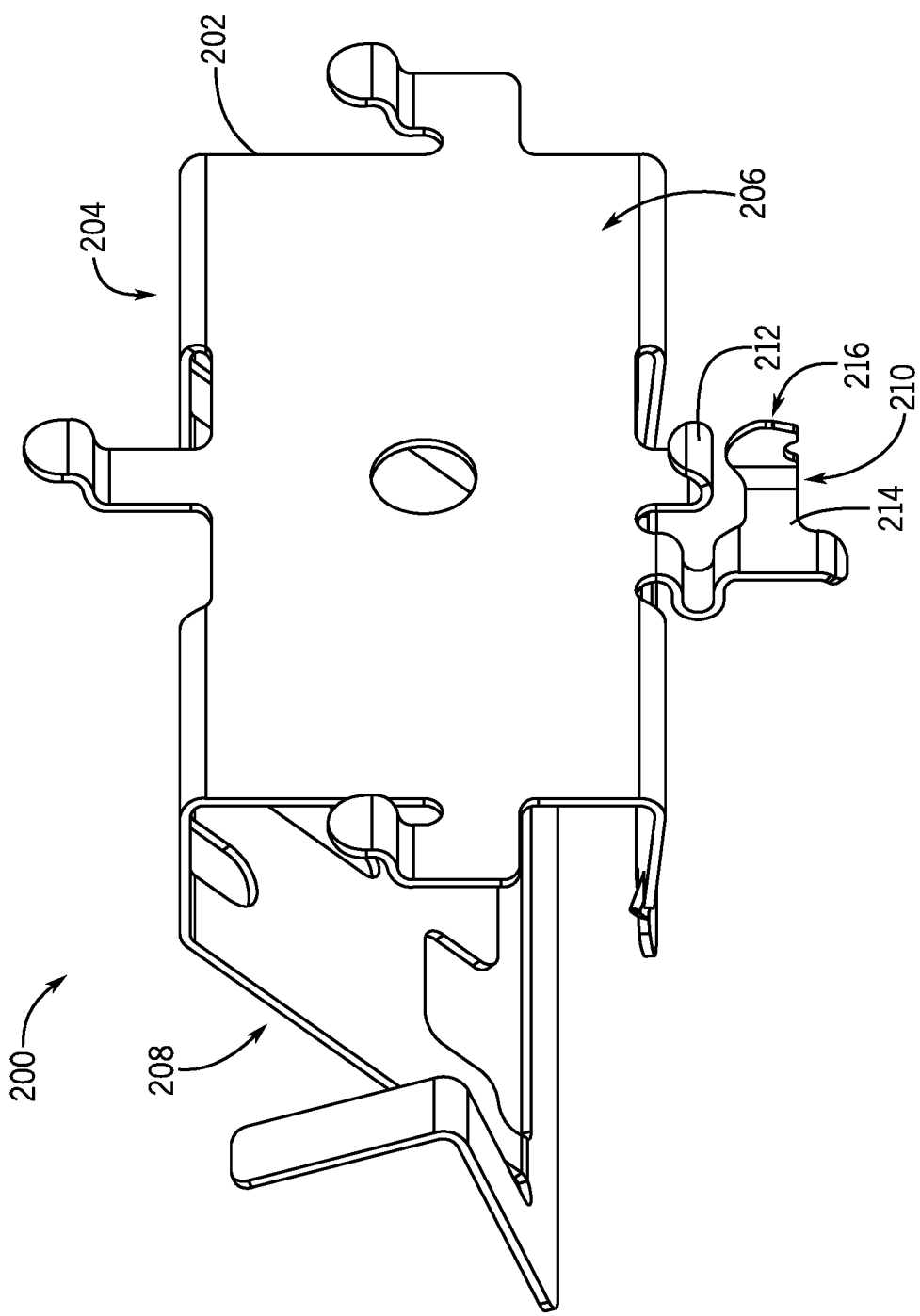
FIG. 16 is an isometric view of another attachment according to an embodiment of the invention.

In other embodiments, other configurations are possible. For example, FIG. 16 illustrates an attachment 200 that is generally similar to the attachment 20 (see, e.g., FIGS. 1 through 4), with an integral attachment body 202, a top portion 204, a front portion 206, and a back portion 208 that are generally similar to the attachment body 22, the top portion 24, the front portion 26, and the back portion 28. The attachment 200 also includes an engagement arrangement 210 that includes first and second arms 212, 214 that are generally similar to the first and second arms 82, 84 of the engagement arrangement 80 (see, e.g., FIG. 5A).

Figure 17:
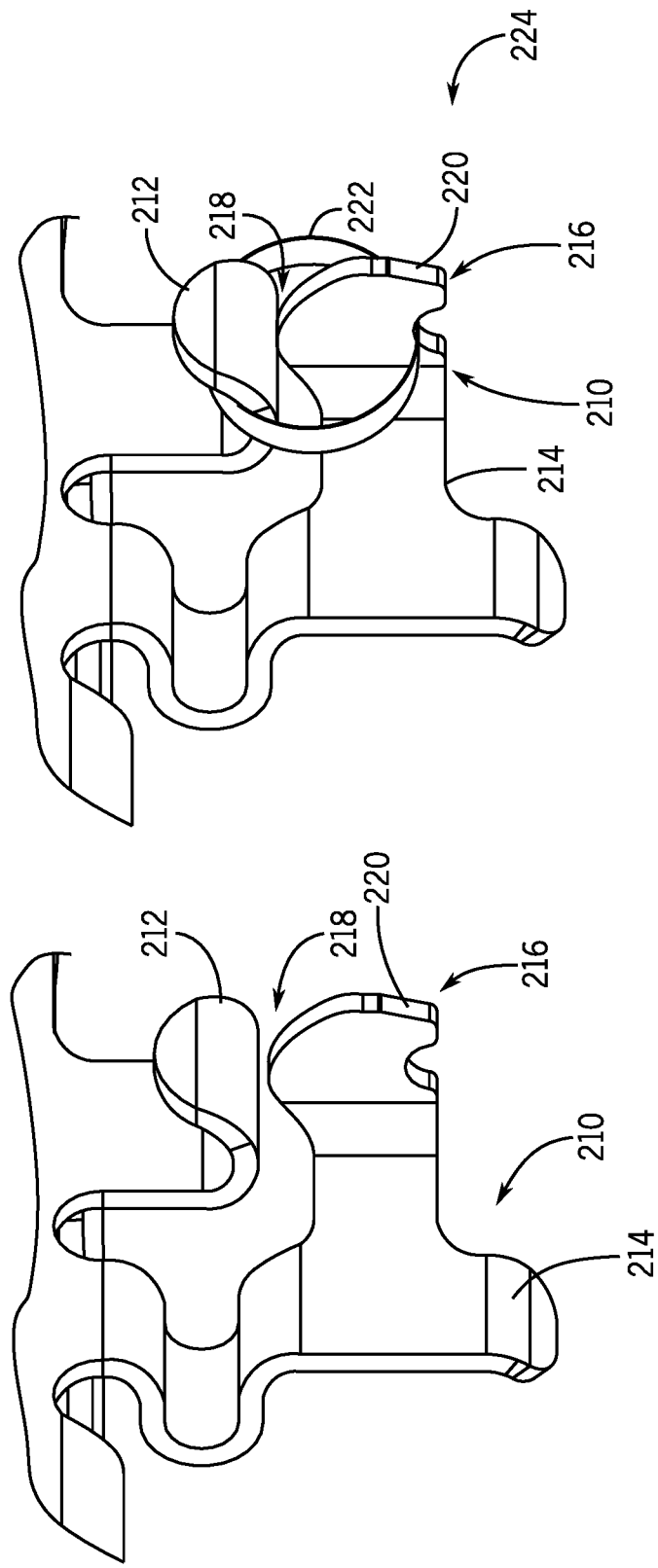
FIGS. 17A and 17B are isometric views of an engagement arrangement of the attachment of FIG. 16, according to an embodiment of the invention, in isolation and as engaged with an electrical box, respectively.

In some aspects, however, the attachment 200 differs from the attachment 20. As one example, as illustrated in FIGS. 17A and 17B in particular, the second arm 214 of the engagement arrangement 210 includes a hooked end 216 that is configured somewhat differently than the hooked end 104 of the second arm 85 of the engagement arrangement 80 (see, e.g., FIG. 5A). For example, the hooked end 216 includes a notch that is similar to the notch of the hooked end 104, and is similarly configured to help secure an electrical box to the attachment 200. However, the hooked end 216 also include an upwardly extending cam portion 218 and a radiused front portion 220. Usefully, the front portion 220 can engage a face of an electrical box 224 near an opening 222 (see FIG. 17B) as the attachment 200 is being secured to the electrical box 224, in order to deflect the second arm 214 to help allow the notch to be moved into engagement with the opening 222. Similarly, once the hooked end 216 is engaged with the opening 222, the cam portion 218 can bear against the first arm 212 in order to help to impede removal of the hooked end 216 from the opening 222.

Figure 18:
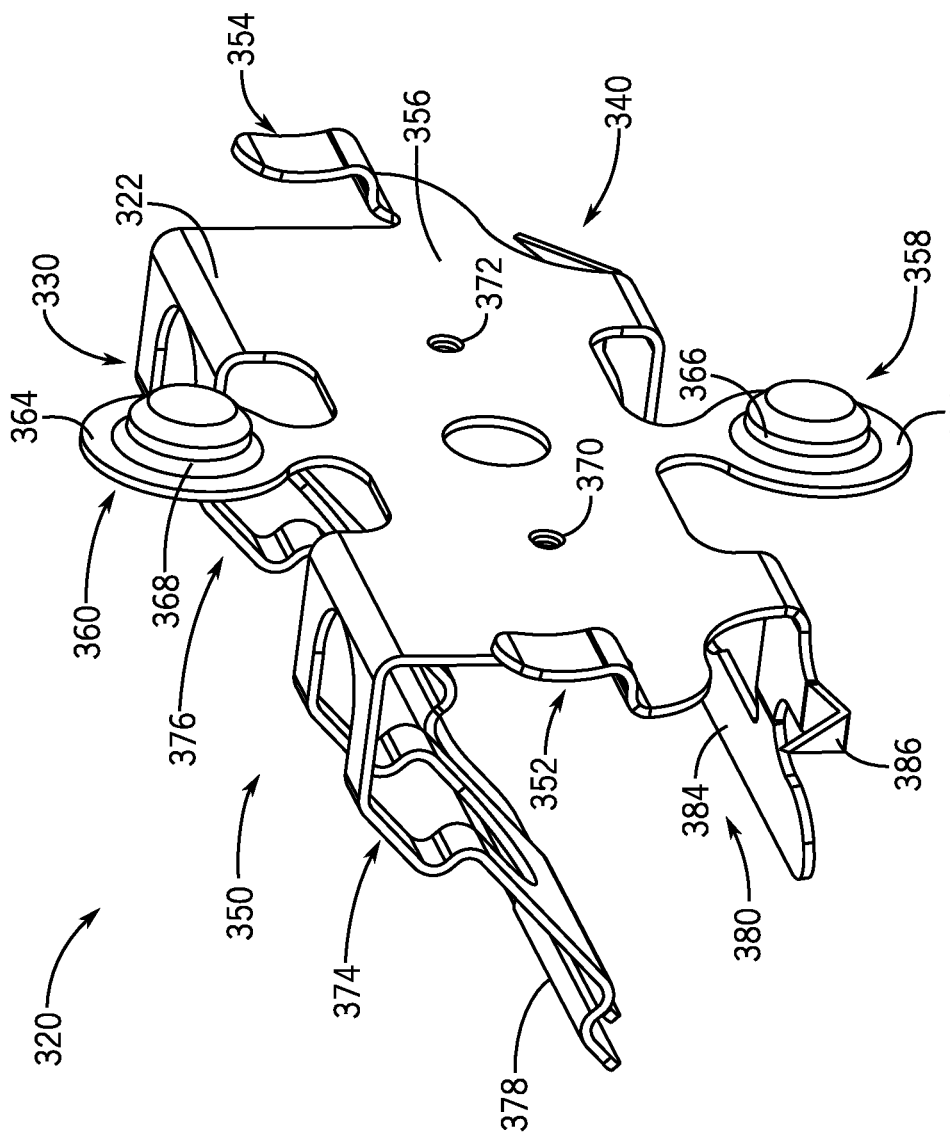
FIGS. 18 and 19 are isometric views of an attachment according to an embodiment of the invention, configured in an open configuration.
Figure 19:
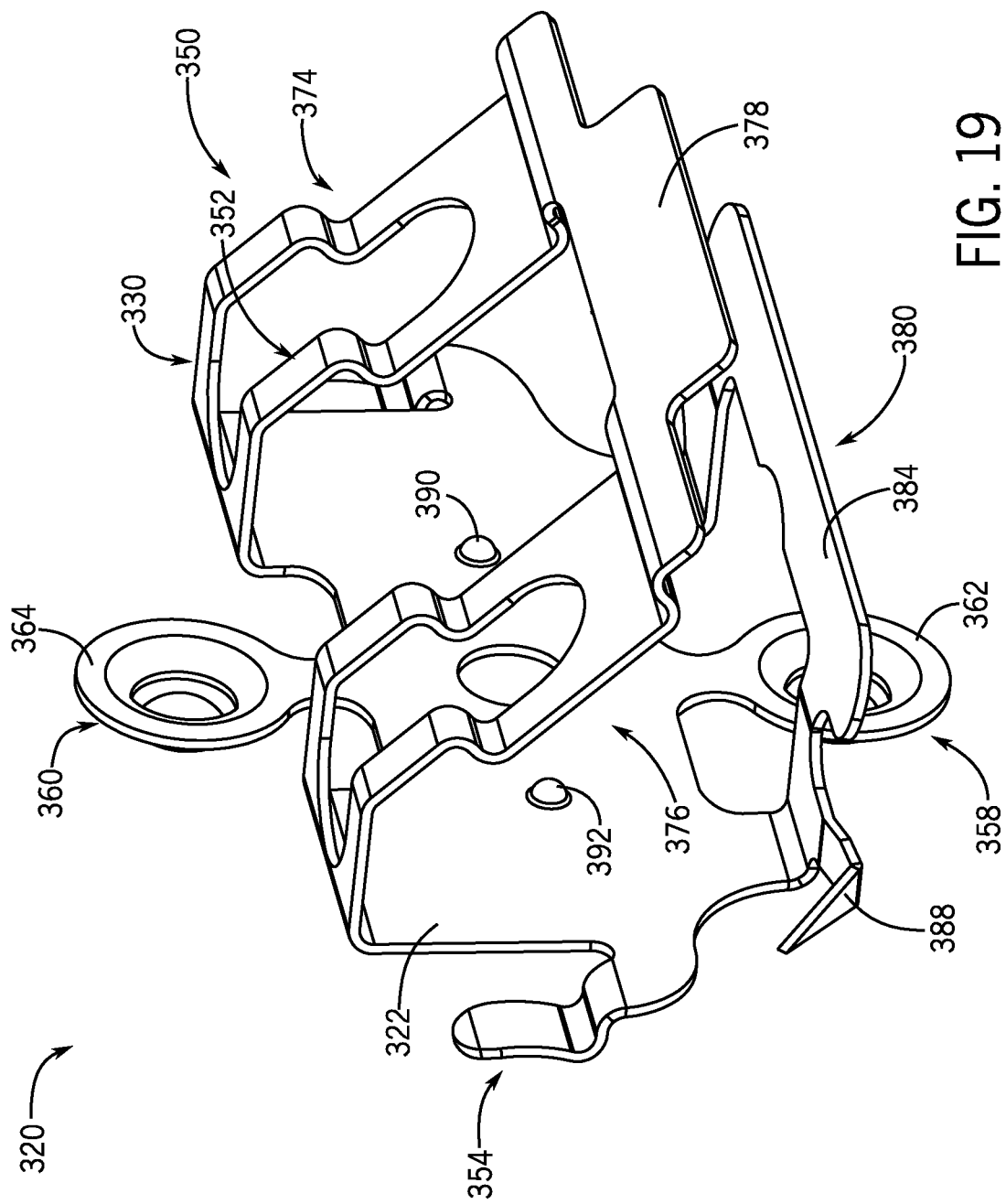

FIGS. 18 and 19 illustrate perspective views of an attachment 320, according to one embodiment of the invention. In this embodiment, all of the components or features that form the attachment 320 generally emanate from an integral attachment body 322, although other configurations are possible. In this regard, for example, the attachment 320 can be formed by die stamping a single piece of sheet metal, followed by folding, forming, or manipulating portions of the finished stamped part ultimately yielding the attachment 320. In other embodiments, other manufacturing processes can be used.

In the illustrated embodiment, the integral attachment body 322 includes a top portion 330, a front portion 340, and a back portion 350. As illustrated in FIGS. 18 and 19, the front and back portions 340, 350 are spaced apart from each other, as may be appropriate to receive a relevant support structure. Further, with the attachment 320 in an open configuration, the back portion 350 angles away from the front portion 340.

In some embodiments, attachments according to the invention can include engagement arrangements with attachment structures to secure electrical boxes or other objects to the attachments, including without requiring separate fasteners. In the illustrated embodiment, for example, the integral attachment body 322 includes bent (e.g., hooked) arms 352, 354 that each project out of a corresponding side of the integral attachment body 322. In particular, the bent arm 352 stems from a side of the integral attachment body 322 that is opposite to the side from which the bent arm 354 stems. In other embodiments, other configurations are possible.

Attachment structures such as bent arms can exhibit different geometry in different embodiments, in order to help secure objects to the relevant attachment. In the embodiment illustrated, for example, the bent arms 352, 354 are generally L-shaped, as viewed from a lateral perspective (see FIG. 20) and each has at least two distinct regions of curvature. A first region of curvature extends from a front surface 356 of the front portion 340 of the attachment 320 and includes a convolute profile, which can allow this region to store and release mechanical energy in a spring-like fashion. A second region of curvature extends from the first region towards a free end of the respective hooked arm 352, 354, along a longer, generally vertical, region of the L-shape. The second region of curvature is concave (from a front perspective) along a front surface 356 of the front portion 340 with a free end that angles away from the front surface 356.

Other attachment structures are also possible. For example, the integral attachment body 322 also includes engagement arrangements 358, 360, each of which projects out of a corresponding side of the integral attachment body 322. In particular, in the illustrated embodiment, the engagement arrangement 358 stems from a side of the integral attachment body 322 that is opposite to the side from which the engagement arrangement 360 stems. Further, as illustrated in FIGS. 18 and 19 in particular, none of the bent arms 352, 354 and engagement arrangements 358, 360 shares a side of the integral attachment body 322 with any other one of the bent arms 352, 354 or engagement arrangements 358, 360. For example, the bent arm 352 emanates from a left side of the integral attachment body 322, the bent arm 354 emanates from a right side of the integral attachment body 322, the engagement arrangement 358 emanates from a bottom side of the integral attachment body 322, and the engagement arrangement 360 emanates from a top side of the integral attachment body 322. In this regard, for example, these attachment structures can generally provide four distributed locations for engagement with an electrical box or other object.

In the embodiment illustrated, the engagement arrangements 358, 360 are configured as resilient extensions that can automatically engage with openings on an object when appropriately aligned. In this regard for example, the engagement arrangements 358, 360 include corresponding resilient extension arms 362, 364, respectively, each of which is integrally connected to the attachment body 322 by a respective reduced-width neck region. In the illustrated embodiment, the extension arms 362, 364 are circular, although in other embodiments the extension arms 362, 364 can take on other shapes (e.g., a square, hexagonal, etc.).

In the embodiment illustrated, in order to engage openings on an object to be secured by the attachment 320, the extensions arms 362, 364 include corresponding protrusions 366, 368, respectively. In different embodiments, a protrusion on an extension arm can exhibit different shapes and can be formed in different ways. In the illustrated embodiment, for example, the protrusions 366, 368 are formed as cylindrical extrusions that are concentrically centered on the circular portion of the extension arms 362, 364. In other embodiments, other forms and manufacturing techniques are possible.

Generally, protrusions on an extension arm can be configured to extend forward of a front face of the relevant attachment body in order to engage corresponding mounting openings in an object (as also discussed below). As illustrated in FIGS. 18 and 19, for example, the front surface 356 of the front portion 340 is contiguous with front surfaces of the extension arms 362, 364. Thus, the protrusions 366, 368, being extruded from the front surface of the respective extension arms 362, 364, also extend forward of the front surface 356.

In the illustrated embodiment, the free end each of the protrusions 366, 368 exhibits an inwardly tapered region. The tapered regions can be formed as a chamfer or a fillet on a respective edge of the protrusions 366, 368 or in various other ways and, in some embodiments, no taper can be provided. Further, although the protrusions 366, 368 are shown as extruded cylinders, other shapes or forms are also possible. In some embodiments, for example, protrusions located similarly to the protrusions 366, 368 can be formed as another extruded shape such as a cross having rounded edges or an extruded semi-circle, as a stamped flap or other feature, or otherwise.

Some embodiments of the invention can include attachments that are configured to be clamped closed around a support structure. For example, in the illustrated embodiment, the top portion 330 and back portion 350 of the attachment 320 include resilient support arms 374, 376. The support arms 374, 376 extend away from the front portion 340 as part of the integral attachment body 322, and are connected to each other, opposite the front portion 340, to define a locking tab 378. In some embodiments, including as illustrated, each of the support arms 374, 376 have slots within their structure, which can allow for more flexibility, balance, and resilience of the support arms 374, 376, and the attachment 320 generally. Portions of each of the support arms 374, 376 can be configured to engage different portions of a support structure (e.g., a telescoping support 398), including as detailed below.

Also in the embodiment illustrated, and corresponding to the configuration of the back portion 350, a locking portion 380 extends generally perpendicularly away from the front portion 340 and towards the back portion 350. The locking portion 380 includes a locking tongue 384 that defines a void configured to receive the locking tab 378. In this way, for example, as also described below, the locking portion 380 can receive and engage the locking tab 378 to secure the attachment 320 around a structure.

In some embodiments, other engagement structures can be provided. For example, in the illustrated embodiment the locking region 380 includes winged supports 386, 388 which extend from exterior edges of the locking tongue 384 (e.g., opposite the void configured to receive the locking tab 378). The winged supports 386, 388 extend from the side edges of the locking tab 378, and are angled relative to the locking region 380. Specifically, the winged supports 386, 388 are angled upward, towards the top portion 30. Accordingly, for example, the winged supports 386, 388 can contact an edge of a support structure, and thus help to prevent rotation or translation of the attachment 320 relative to the support structure.

Other features can also be provided. For example, in the illustrated embodiment, the integral attachment body 322 also includes depressions 370, 372 (see FIG. 18) that extend into the front surface 356, corresponding to projections 390, 392 (see FIG. 19) that protrude rearward from the front portion 340 towards the back portion 350 of the attachment 320. Usefully, the depressions 370, 372 can be spaced apart at a predetermined distance that can correspond to various other structures, such as locating recesses arrayed along a support structure.

Figure 26:
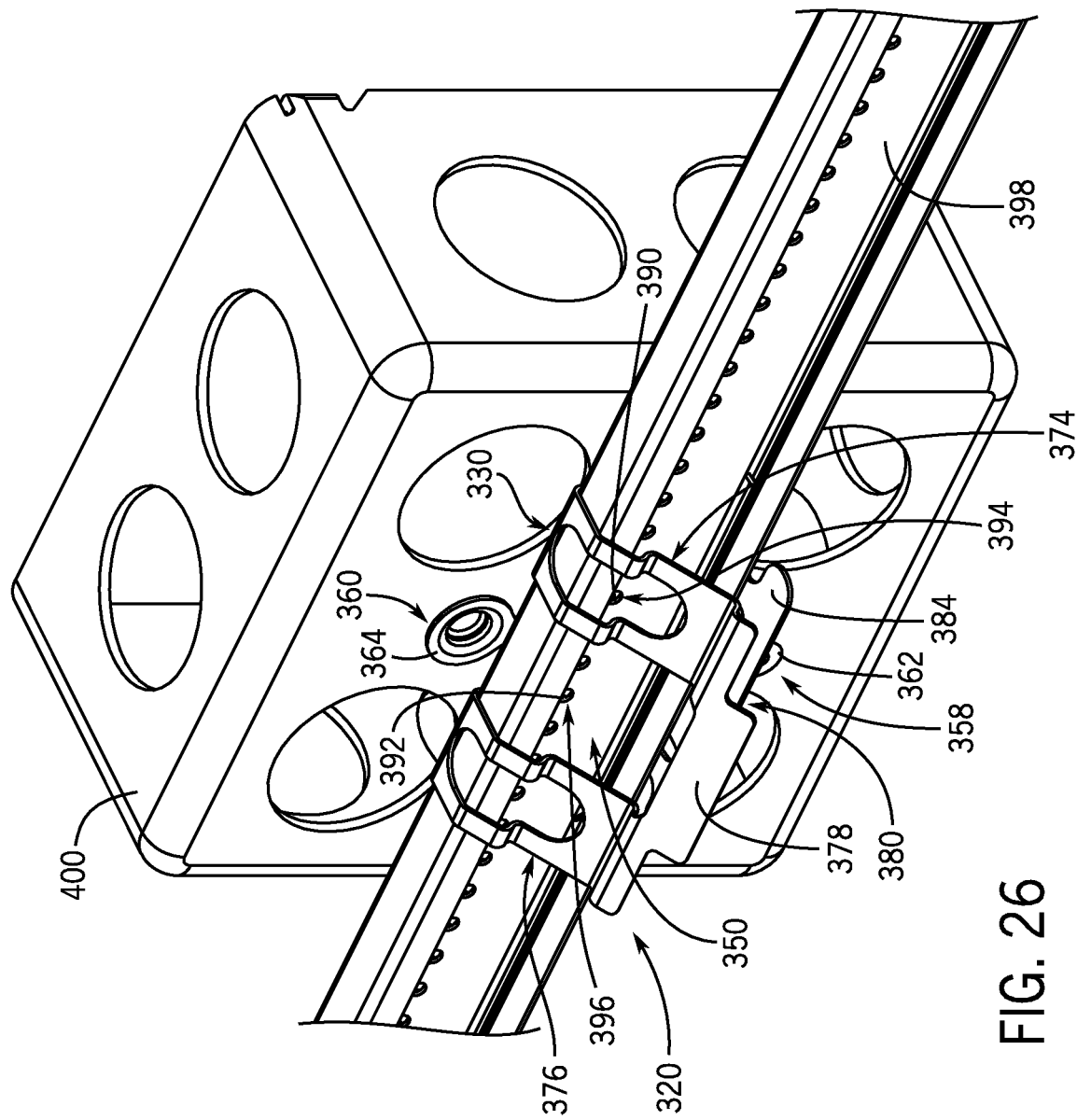
FIG. 26 is an isometric view of the attachment of FIGS. 18 and 19, engaged with an electrical box, disposed over a support structure, and configured in an open configuration.
Figure 27:
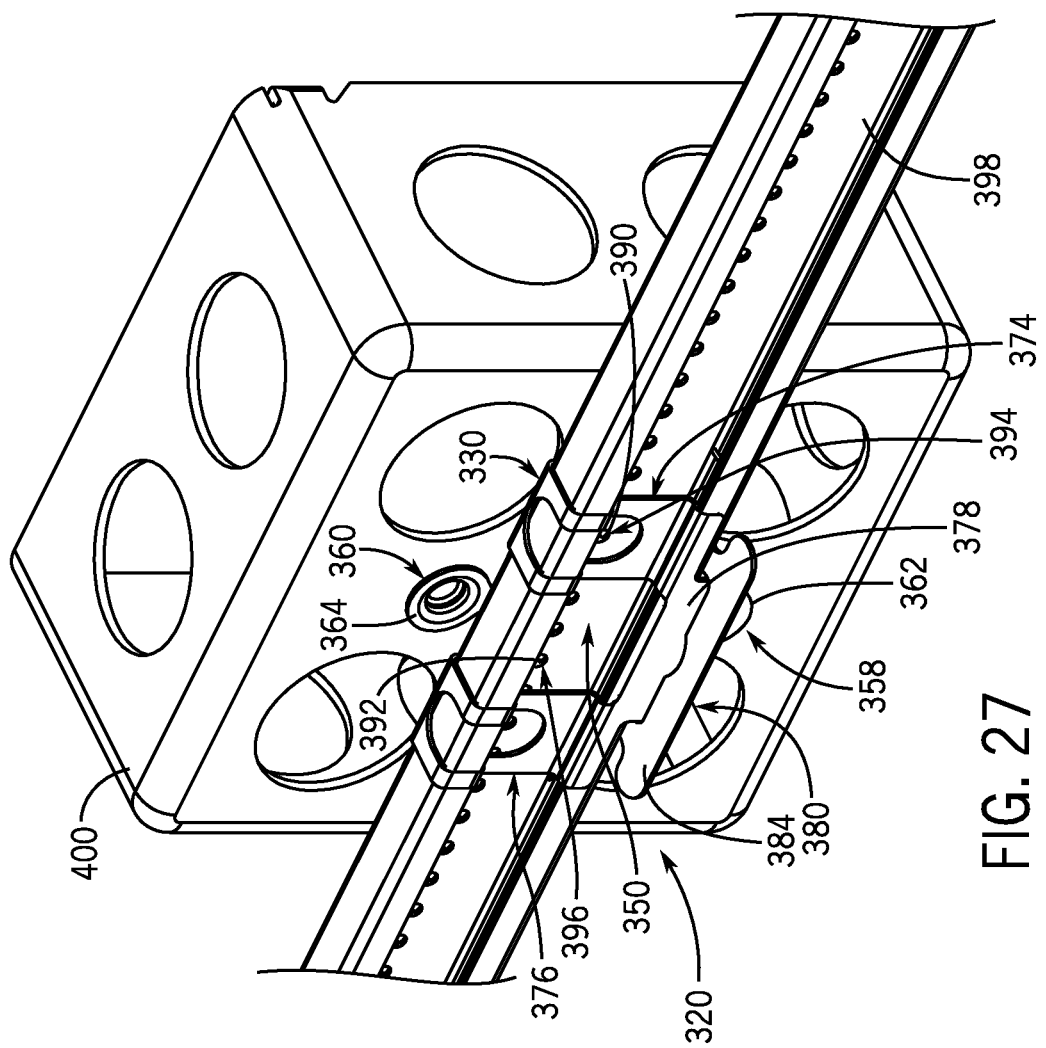
FIG. 27 is an isometric view of the attachment of FIGS. 18 and 19, engaged with an electrical box, disposed over a support structure, and configured in a closed configuration.

In the embodiment illustrated, the projections 390, 392 are spherically shaped and are configured to engage corresponding circular recesses 394, 396 of the telescoping support 398 (see, e.g., FIGS. 26 and 27). In other embodiments, similar projections may not necessarily be circular, such as may be appropriate for particular support structures.

Figure 20:
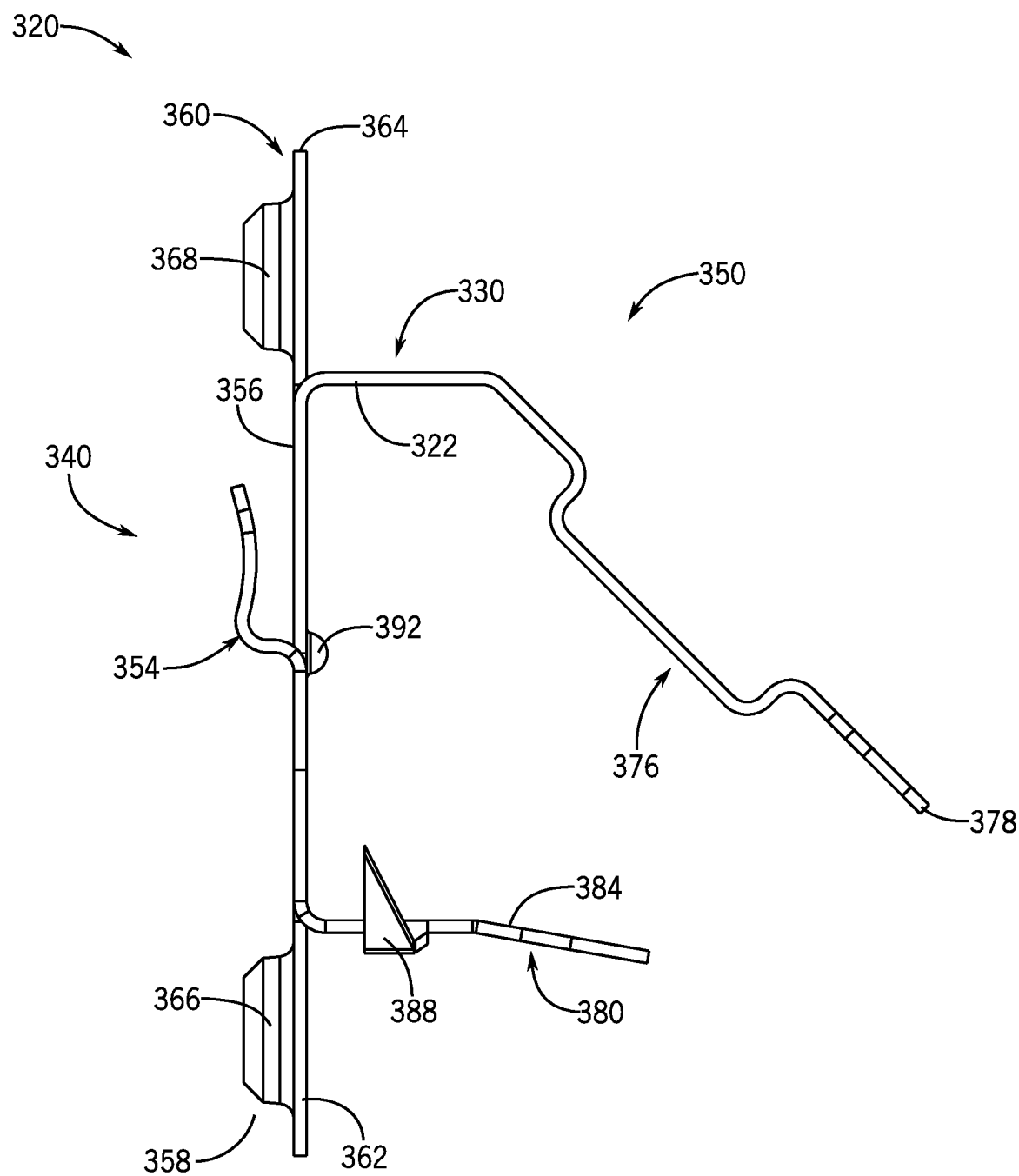
FIG. 20 is a side view of the attachment of FIGS. 18 and 19, configured in the open configuration.

FIG. 20 illustrates a side view of the attachment 320 of FIGS. 18 and 19, configured in an open configuration. As illustrated, the back portion 350 and the locking region 380 extend away from the front portion 340. Further, the back portion 350 is angled relative to the front portion 340, and the locking region 380 is perpendicular to the front portion 340.

The side view of the attachment 320 further illustrates the curvature of the bent arms 352, 354. As illustrated, and discussed above, the bent arms 352, 354 are generally L-shaped and extend forward of the front surface 356 of the front portion 340. The second (i.e., free-end) region of curvature of each of the bent arms 352, 354 extends generally along the front surface 356 of the front portion 340. However, the free end of each of the second regions angles generally away from the front surface 356, such that the concave maxima within each second region of curvature is disposed at a minimum distance from the front surface 356 relative to the remainder of the second region. In some configurations, as also discussed below, these concave maxima can contact a relevant object, and thus help to secure the object to the attachment 320.

Figure 21:
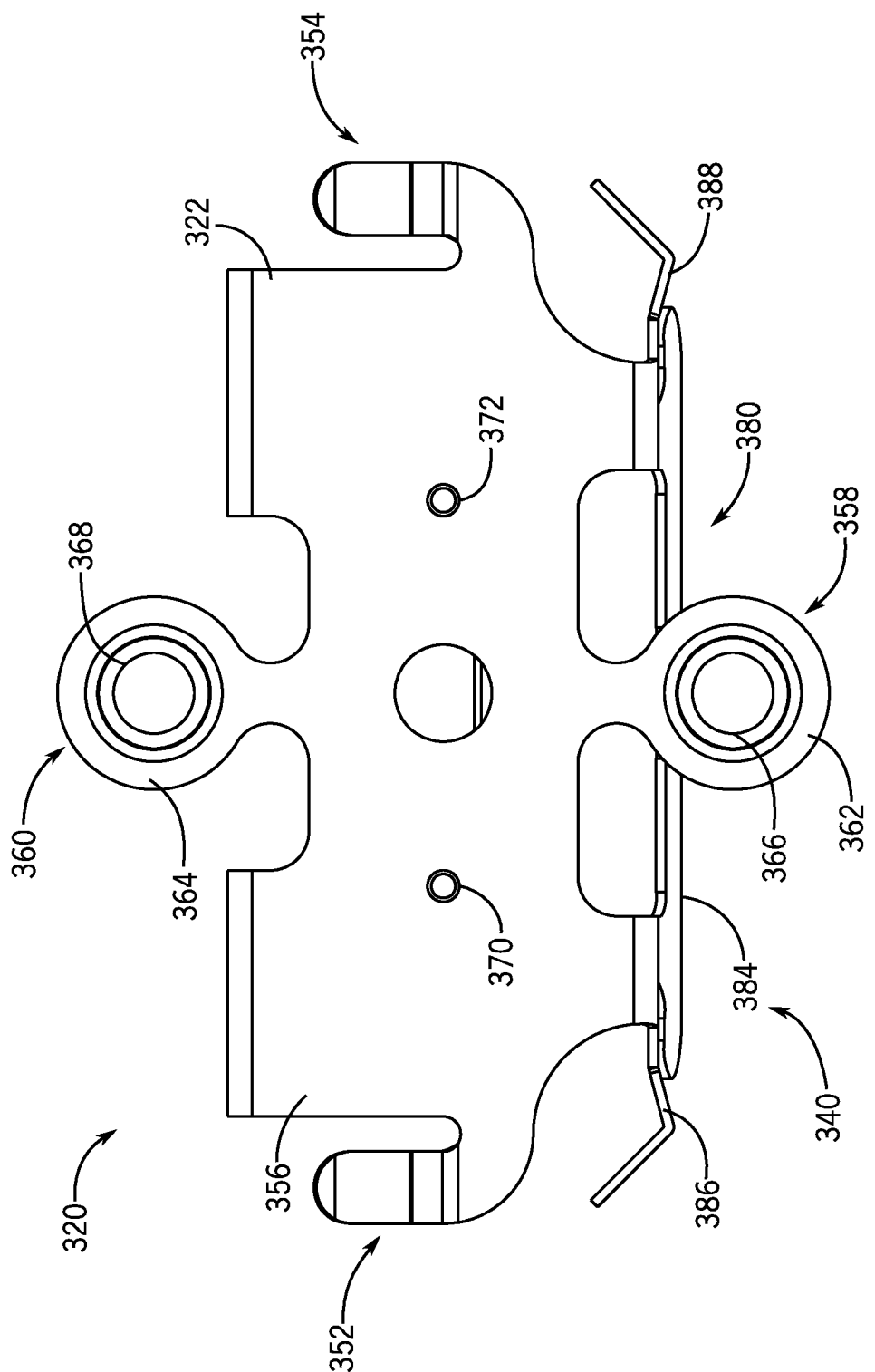
FIG. 21 is a front view of the attachment of FIGS. 18 and 19, configured in the open configuration.
Figure 22:
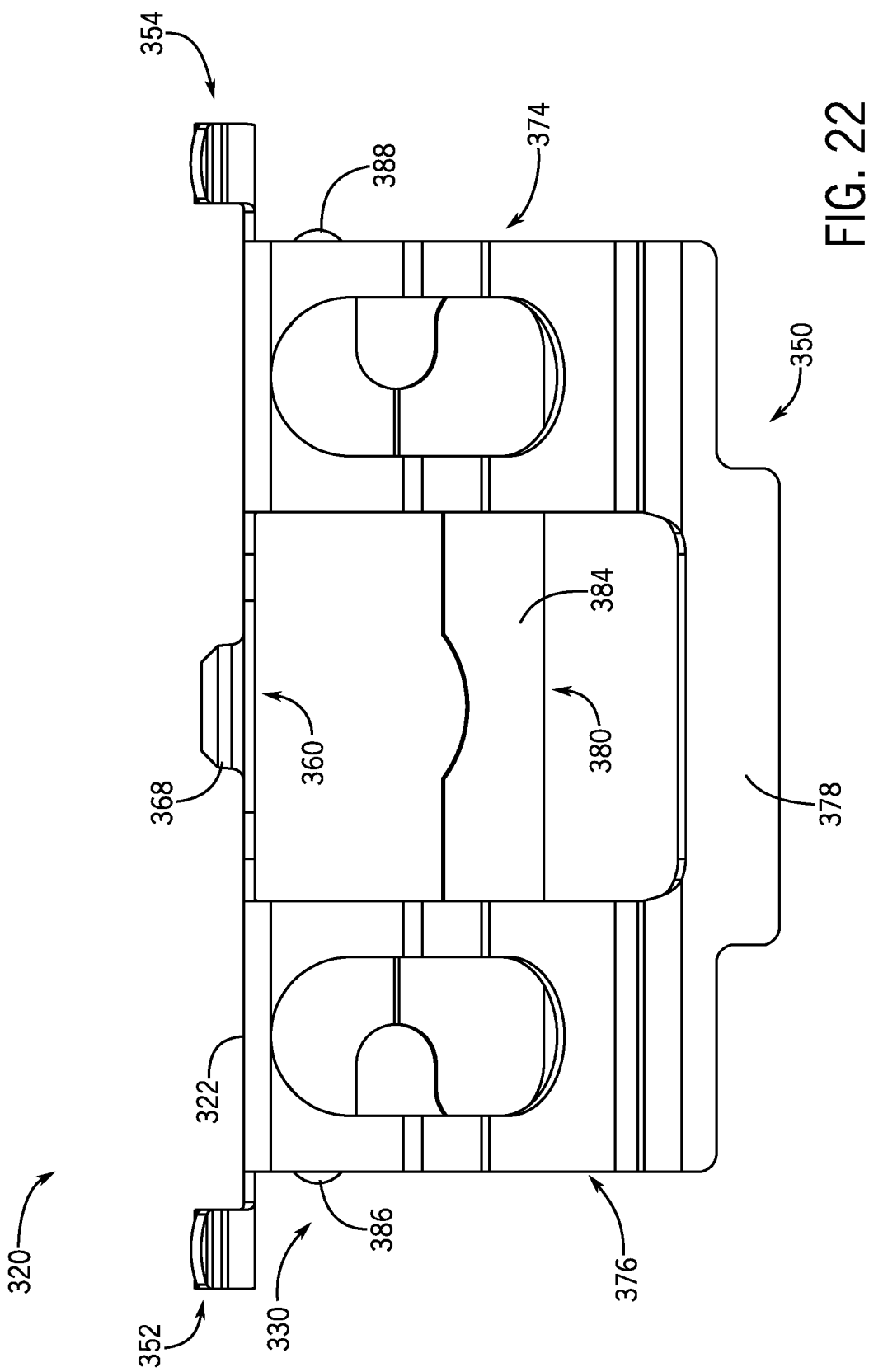
FIG. 22 is a top view of the attachment of FIGS. 18 and 19, configured in the open configuration.

FIGS. 21 and 22 further illustrate other features of the attachment 320. For example, FIG. 21 illustrates, in particular, the upward angle of the winged supports 386, 388 towards the top portion 330. FIG. 22 further illustrates the shape of the slots that are defined by the support arms 374, 376. As discussed above, the slots within each of the support arms 374, 376 and the void defined between the support arms 374, 376 can allow the attachment 320 to be sufficiently flexible for ready (e.g., manual) attachment to support structures.

Figure 23:
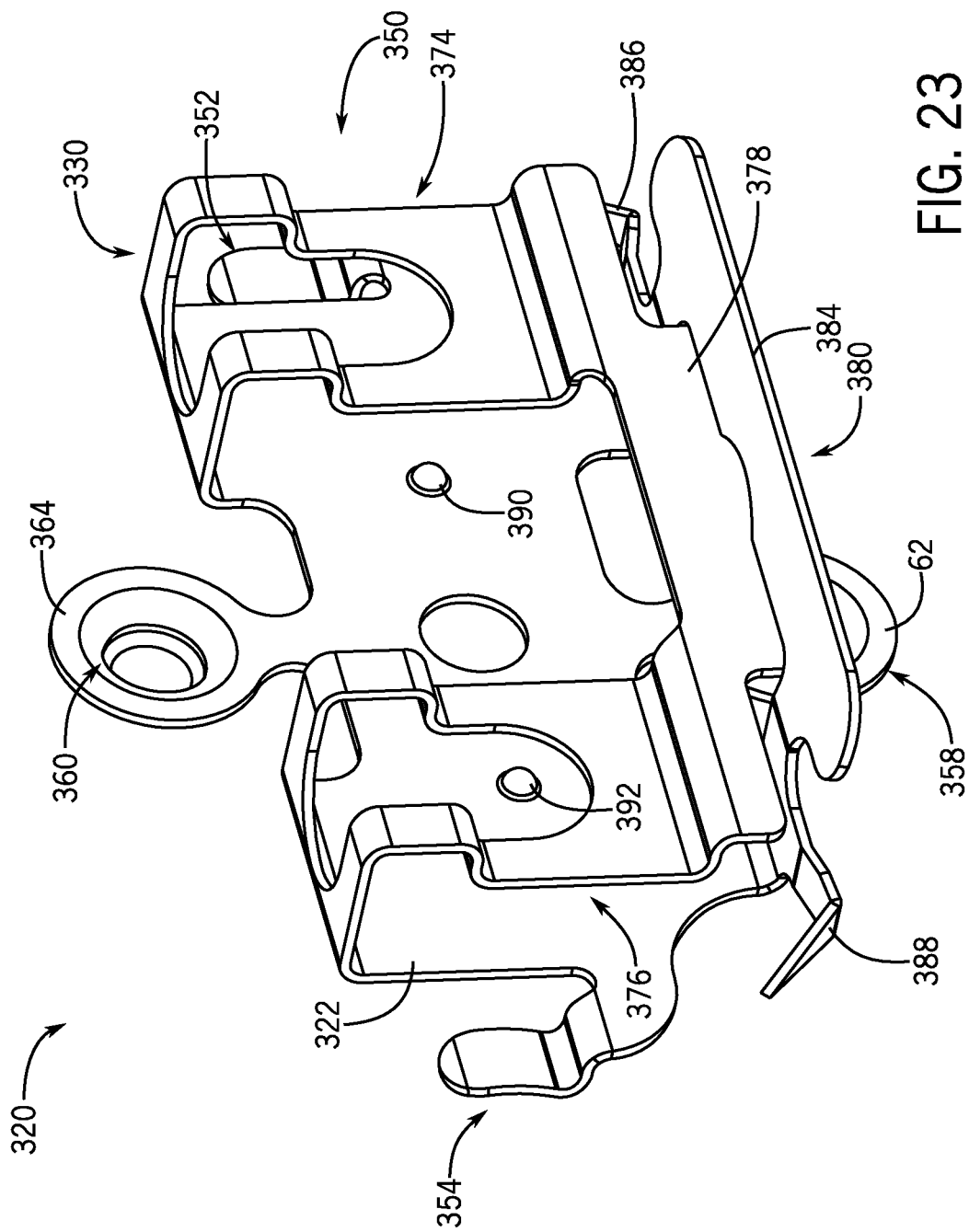
FIGS. 23 and 24 are isometric views of the attachment of FIGS. 18 and 19, configured in a closed configuration.
Figure 24:
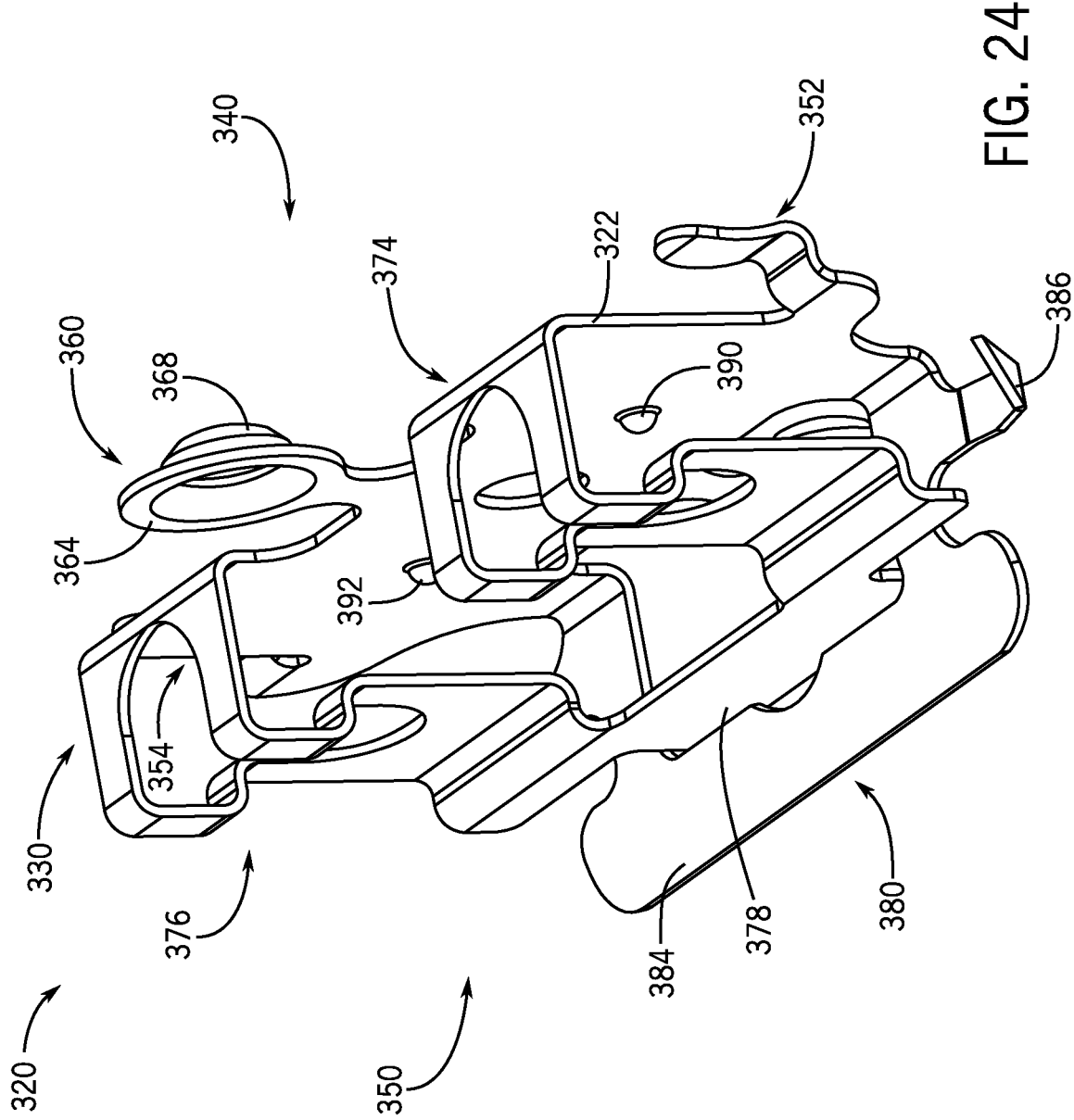
Figure 25:
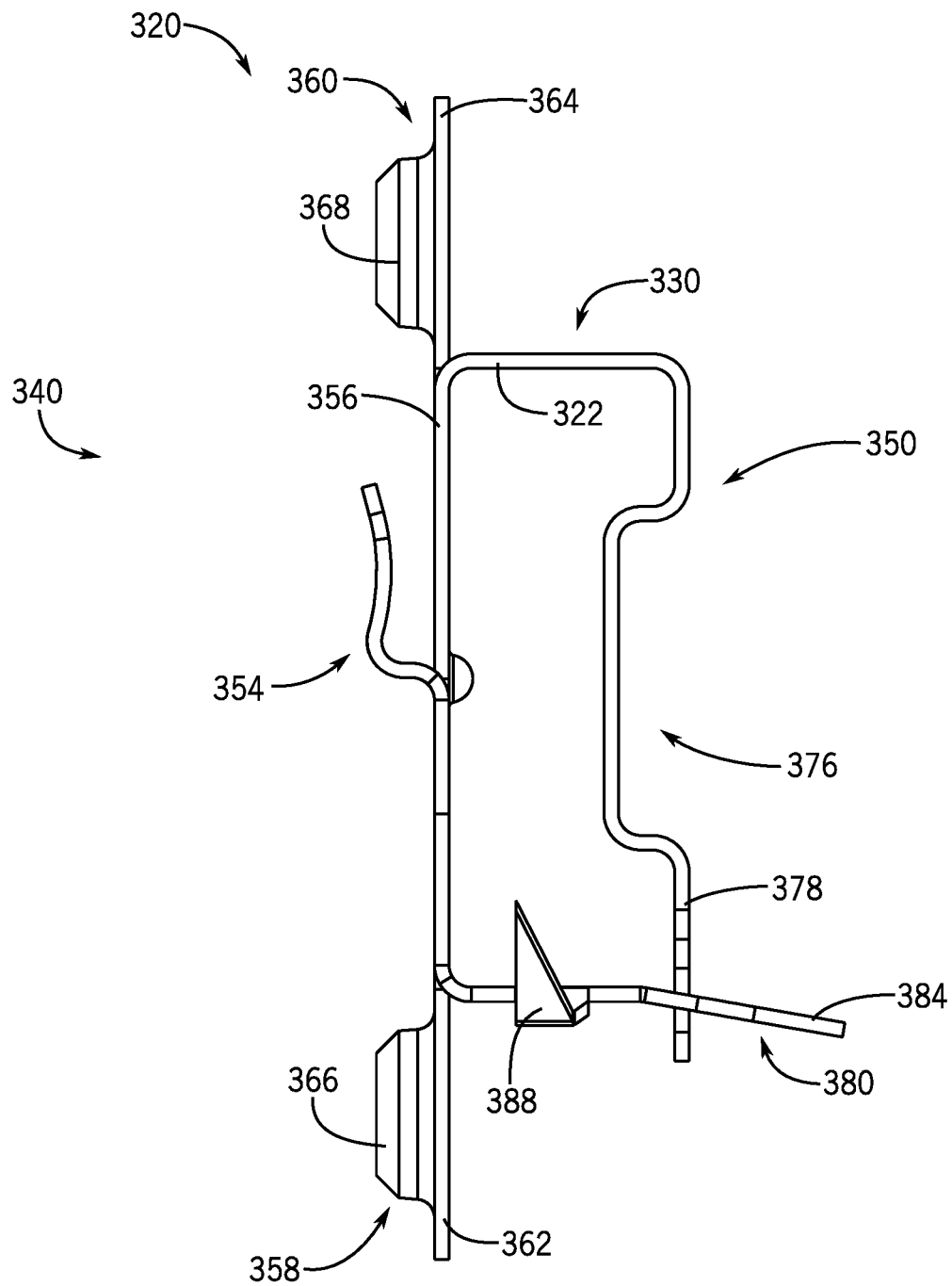
FIG. 25 is a side view of the attachment of FIGS. 18 and 19, configured in a closed configuration.

FIGS. 23-25 illustrate the attachment 320 in a closed and locked configuration, but without a support structure, for clarity of presentation. As illustrated, to secure the attachment 320 in the closed configuration, the locking tab 378 is inserted into the void defined by the locking tongue 384, thus closing the support structure and, as appropriate, securing the attachment 320 around a support structure. Further, the resilient response of the support arms 374, 376 can urge the locking tab 378 into the locking tongue 384, to help secure the attachment 320 in the closed configuration until the locking tongue 384 is bent (e.g., manually) downward to release the locking tab 378. As illustrated in FIGS. 7 and 8, a gap between the locking tab 378 and the locking tongue 384 is shown. However, this gap may not be present in some configurations. Similarly, although not shown, other protrusions can extend from the locking region 380, such as may aid in blocking or otherwise engaging a portion of the locking tab 378 and, thus, in further maintaining the closed configuration of the attachment 320.

FIGS. 26 and 27 illustrate an example process for attaching the attachment 320 to a support structure. For example, FIG. 26 illustrates the attachment 320 in an open configuration, disposed around the telescoping support 398, and engaged with the electrical box 400. Specifically, in the illustrated configuration, the projections 390, 392 are disposed to engage corresponding apertures 414, 416 of the telescoping support 398. This engagement can help to support the attachment 320 relative to the telescoping support 398, and to quickly, efficiently, and correctly place the attachment 320 at an appropriate location on the telescoping support 398.

Once appropriately aligned, the attachment 320 can then be secured in a closed configuration around the support 398, as illustrated in particular in FIG. 27. For example, as also discussed above, the back portion 350 can be urged towards the support 398 until the locking tab 378 is received (e.g., snaps) into the void defined within the locking tongue 384. Thus, the attachment 320 can be easily (e.g., manually) locked onto the telescoping support 398 to firmly secure the electrical box 400 thereto.

In some embodiments, specific portions of an attachment can be configured to engage particular portions of a corresponding support. For example, when the attachment 320 is in the closed and locked configuration, as shown in FIG. 27, at least part of each of the top, front, and back portions 330, 340, 350 of the attachment body 322 are seated on the top, front, and back sides of the telescoping support 398, respectively. In this regard, for example, multiple points of engagement between the attachment body 322 and the support 398 can help to ensure a secure and relatively movement-free connection between the attachment body and the support 398.

As a further example, as also illustrated in FIG. 27, the top, front, and back portions 330, 340, 350 are contoured to seat relatively closely around the corresponding portions of the telescoping support 398. For example, the back portion 350 of the attachment 320 has concave portions (as viewed from the front), extending along the slots in the arms 374, 376. These concave portions are dimensioned to be seated around the rails of the telescoping support 398 to help secure the attachment 320 against undesired movement relative to the support 398. Further, the back portion 350 also includes a convex portion (as viewed from the front), extending along the arms 374, 376 between the top portion 330 and the locking tab 378. This convex portion is dimensioned to be seated within the channel of the telescoping support 398, as illustrated in FIG. 10 in particular, potentially in close engagement with lips on the top and bottom of the channel. In general, these contoured portions of the top, front, and back portions 330, 340, 350 can aid in securing the attachment 320 to the telescoping support 398, including so as to help prevent sliding of the attachment 320 along the support 398 (e.g., similarly to the winged supports 386, 388). In other embodiments, other configurations are possible.

Figure 28:
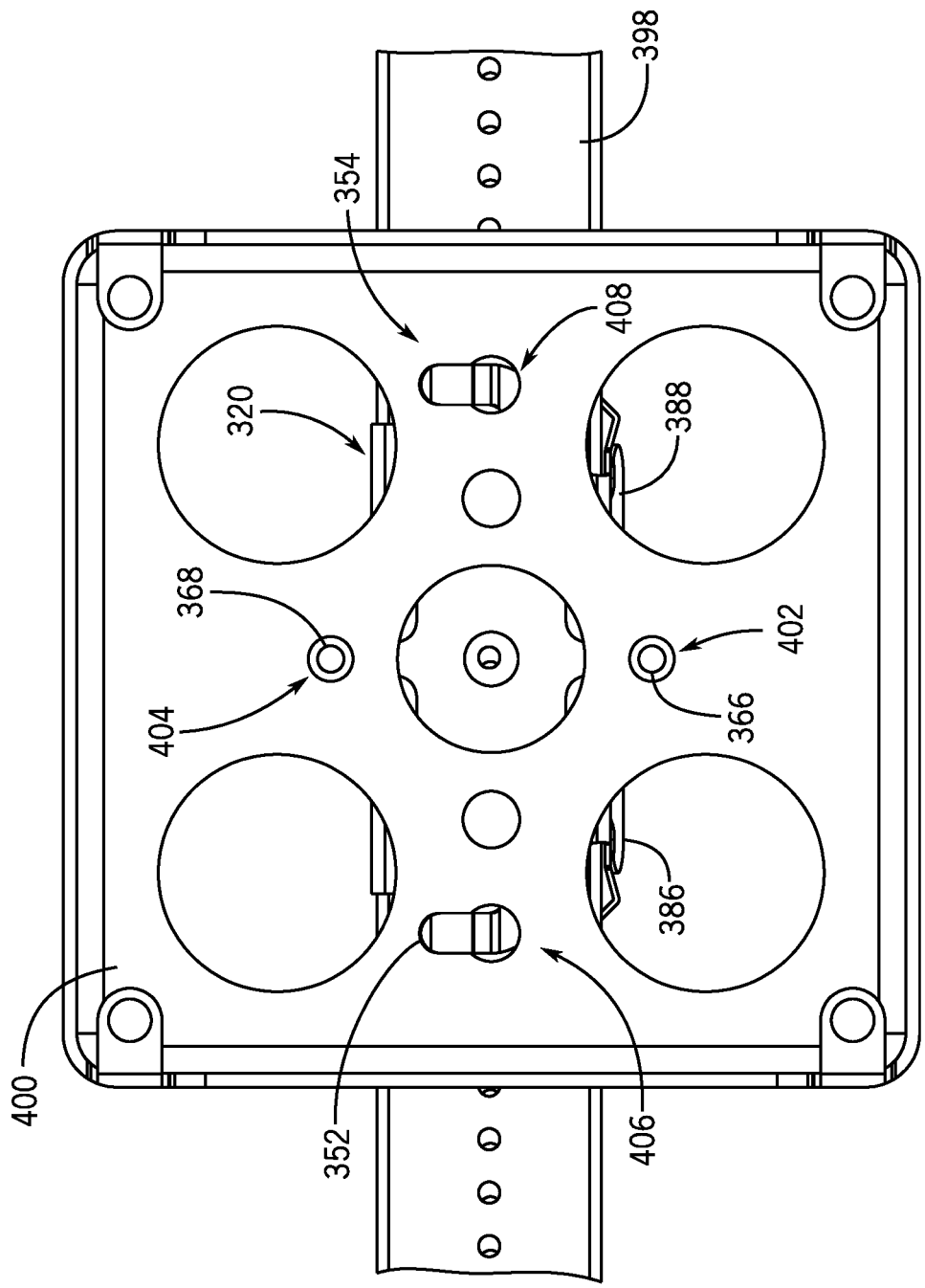
FIG. 28 is a front view of the attachment of FIGS. 18 and 19, engaged with an electrical box, disposed over a support structure, and configured in a closed configuration.

FIG. 28 in particular illustrates certain aspects of the engagement between the attachment 320 and the electrical box 400. In the embodiment illustrated, the electrical box 400 has circular mounting openings 402, 404, 406, 408 arranged in an array. As discussed in detail below, the protrusions 366, 368, and the bent arms 352, 354, respectively, are configured to be readily installed into engagement with the openings 402, 404, 406, 408 to secure the electrical box 400 to the attachment 320.

To install the electrical box 400 onto the attachment 320 with, for example, the attachment 320 locked around the telescoping support 398 and in a closed configuration, the electrical box 400 can be disposed relative to the telescoping support 398 such that the bent arms 352, 354 are received by the mounting openings 406, 408, respectively, and the top of the electrical box 400 angles somewhat away from the attachment 320. The electrical box 400 can then be moved towards the attachment 320, sliding and rotating into more closely parallel alignment with the attachment 320, as guided by movement of the bent arms 352, 354 through the mounting openings 406, 408. In this regard, for example, the angled and convex aspect of the bent arms 352, 354 can assist both in initial insertion of the arms 352, 354 into the mounting openings 406, 408 and in urging the electrical box 400 towards the attachment 320 as the arms 352, 354 move through the mounting openings 406, 408.

Usefully, as the bent arms 352, 354 are moved through the mounting openings 406, 408, the curvature of the arms 352, 354 can guide the electrical box 400 so that the protrusions 368 become aligned with the mounting openings 402, 404. As assisted, for example, by the tapered end of the protrusion 368, the protrusions 368 can accordingly be automatically guided into the mounting openings 402, 404 without requiring user engagement other than the bulk movement of the electrical box 400.

In the illustrated embodiment, as the bent arms 352, 354 are further received within the corresponding mounting openings 406, 408, the non-tapered surface of the protrusions 366, 368 eventually fully seat (e.g., snap) into the corresponding mounting openings 402, 404. This engagement between the protrusions 366, 368 and corresponding mounting openings 402, 404, can help to secure the electrical box 400 to the attachment 320, to help prevent rotation or translation of the electrical box 400 relative to the attachment 320. Similarly, when the bent arms 352, 354 are fully received in the corresponding mounting openings 406, 408, the bent arms 352, 354 also help to prevent translation and rotation of the electrical box 400 relative to the attachment 320.

In this regard, as also discussed above, the relative curvature of the first and second regions of the bent arms 352, 354 can assist in installing and securing the electrical box 400. For example, as the bent arms 352, 354 are received further within the corresponding mounting openings 406, 408, the second region of curvature on each of the bent arms 352, 354 can help to guide the electrical box 400 towards the attachment 320. Further, upon full installation, the resilient response of the bent arms 352, 354 to deformation imposed by installation of the electrical box 400 can allow the bent arms 352, 354 to resiliently hold the electrical box 400 to the attachment 320. Indeed, in some cases, even if the electrical box 400 is rotated out of alignment (e.g., out of the page with respect to the view in FIG. 28), the corresponding resilient response of the bent arms 352, 354 can help to urge the electrical box 400 back in place.

As described above, the electrical box 400 can be secured to the attachment 320 after the attachment 320 is closed around the support 398. In other instances, other approaches are possible. For example, in some cases, an electrical box can be secured to an attachment (e.g., the attachment 320) before the attachment is mounted on or closed around a relevant support.

In some embodiments, and as previously discussed, the protrusions 366, 368 can take the form of other three-dimensional shapes, other than the configurations illustrated. In some embodiments, the protrusions 366, 368 (or others) can be dimensioned with respective diameters that are 95% or more of the diameter of the corresponding mounting openings 402, 404. This dimensional relationship, for example, can allow the protrusions 366, 368 to be easily installed and secured within the corresponding mounting openings 402, 404, while still providing a relatively secure engagement, with relatively little freedom of movement of the mounting openings 402, 404 around the protrusions 366, 368. In some embodiments, other dimensional relationships are possible.

As also noted above, the winged supports 386, 388 can also aid in securing the attachment 320 to the telescoping support 398. For example, the winged supports 386, 38 can resiliently resist rotation of the electrical box 400 and the attachment 320 in a clockwise or counterclockwise direction, respectively, relative to the view in FIG. 28. Further, the winged supports 386, 388 can also help to prevent translation of the attachment 320 and the electrical box 400 along the telescoping support 398 via spring-like engagement with the support 398.

Figure 29:
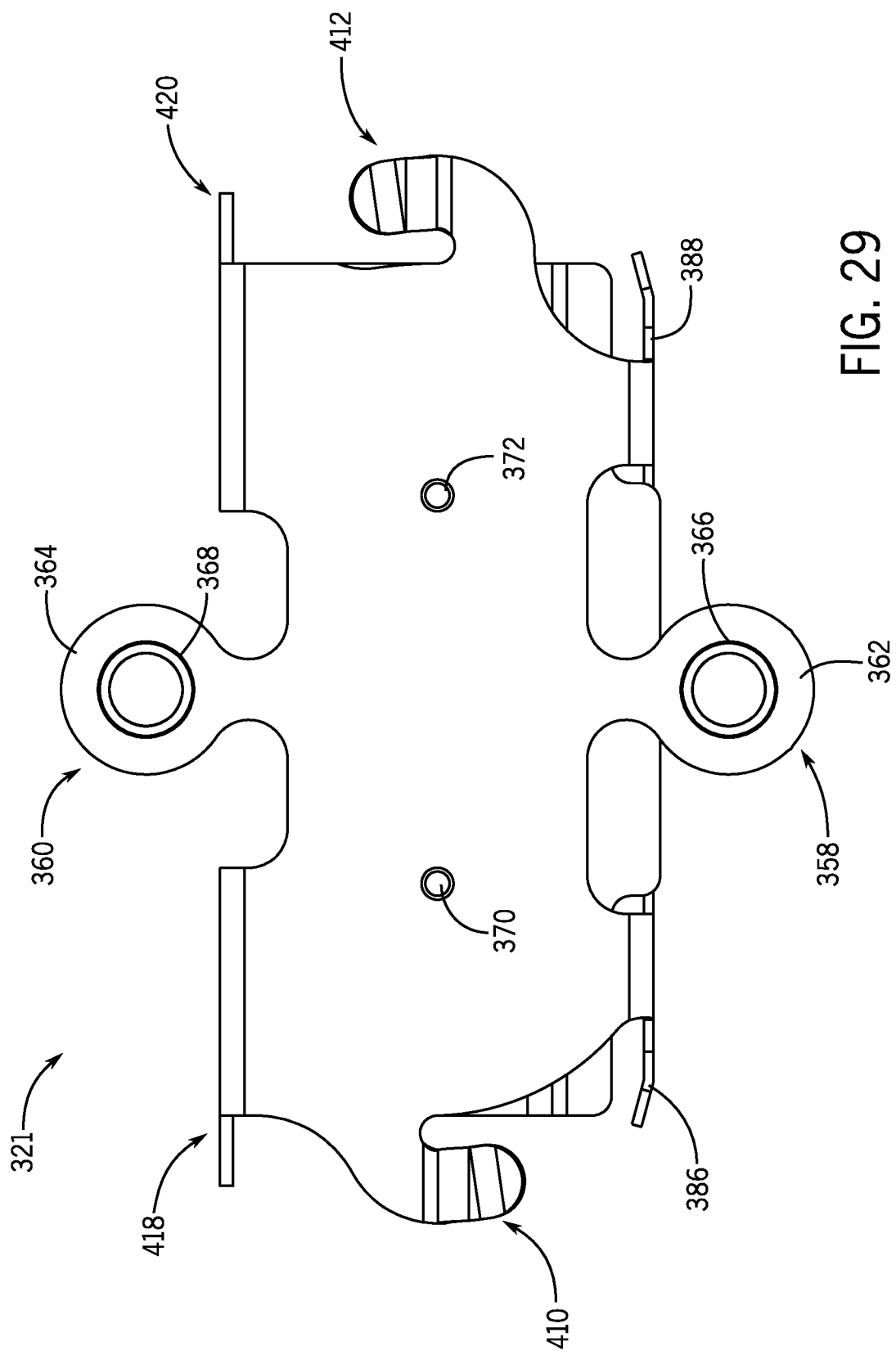
FIG. 29 is a front view of another attachment, according to another embodiment of the invention, configured in a closed configuration.
Figure 30:
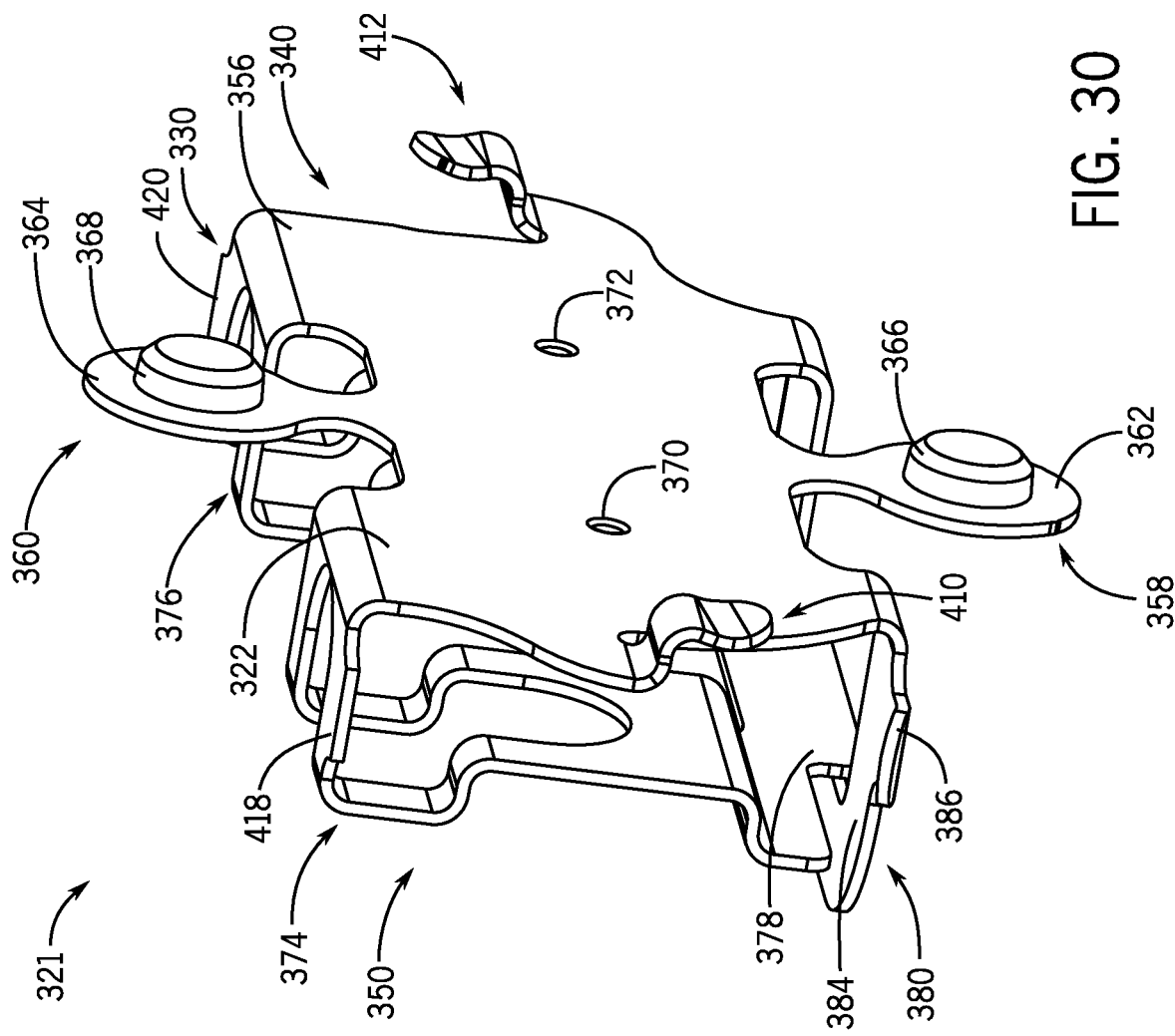
FIG. 30 is an isometric view of the attachment of FIG. 29 configured in a closed configuration.
Figure 31:
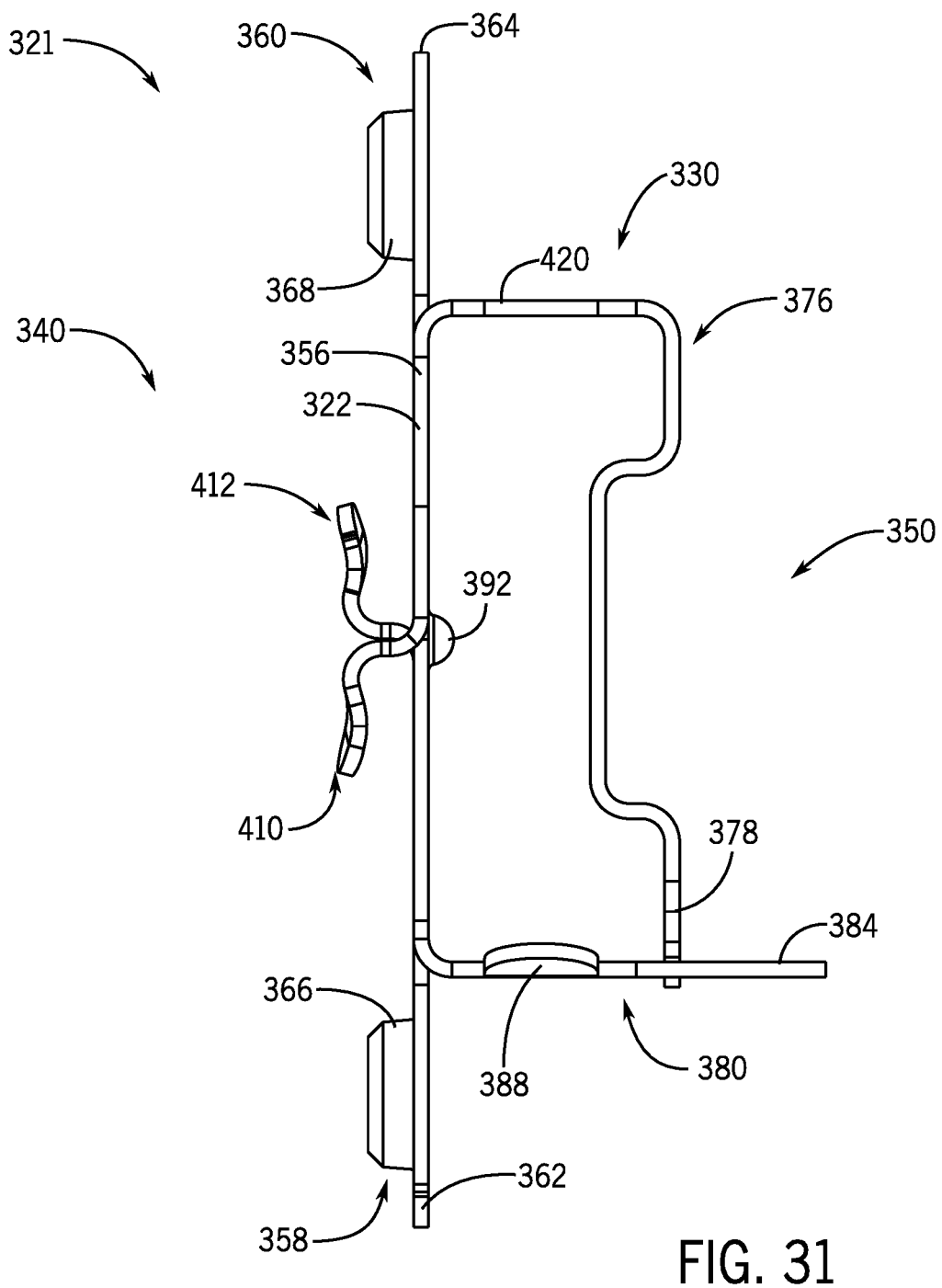
FIG. 31 is a side view of the attachment of FIG. 29, configured in a closed configuration.

FIGS. 29-31 illustrate an attachment 321, according to another embodiment of the invention. The attachment 321 is generally similar to the attachment 320, although the attachments 320, 321 differ in some regards, including as discussed below. Thus, what has been previously described with regard to the attachment 320, also generally pertains to the attachment 321.

Generally, the attachment 321 can help to secure an object similarly to the attachment 320. But the attachment 321 can be secured to an object somewhat differently than the attachment 320. In this regard, for example, the attachment 321 includes bent arms 410, 412 that differ from the bent arms 352, 354 of the attachment 321. Similarly to the bent arms 352, 354, the bent arms 410, 412 emanate from opposing sides of the integral attachment body 322. In contrast to the bent arms 352, 354, however, the bent arms 410, 412 extend in generally opposite directions relative to each other. For example, as illustrated in FIG. 30, the bent arm 410 extends towards the bottom end of the integral attachment body 322 and the bent arm 412 extends towards the top end of the integral attachment body 322. In other words, the bent arm 410 is positioned on a side opposite the curved bent arm 412, and the curved bent arms 410, 412 extend in opposite direction relative to one another.

FIGS. 29-31 also illustrate the attachment 321 having extensions 418, 420 that protrude laterally outwardly from the corresponding support arms 374, 376. Specifically, each of the extensions 418, 420 are configured to protrude from an outer edge of the corresponding support arms 374, 376, away from a central axis defined by the engagement arrangements 358, 360. Similarly to the supports 386, 388 (see, e.g., FIG. 20), each of the extensions 418, 420 is configured to engage the top portion of the telescoping support 398, in order to prevent rotation of the attachment 321 relative to the support structure 398. For example, potential counterclockwise or clockwise rotation of the attachment 321 relative to the view in FIG. 32 can be decreased or prevented by the extensions 418, 420.

Figure 32:
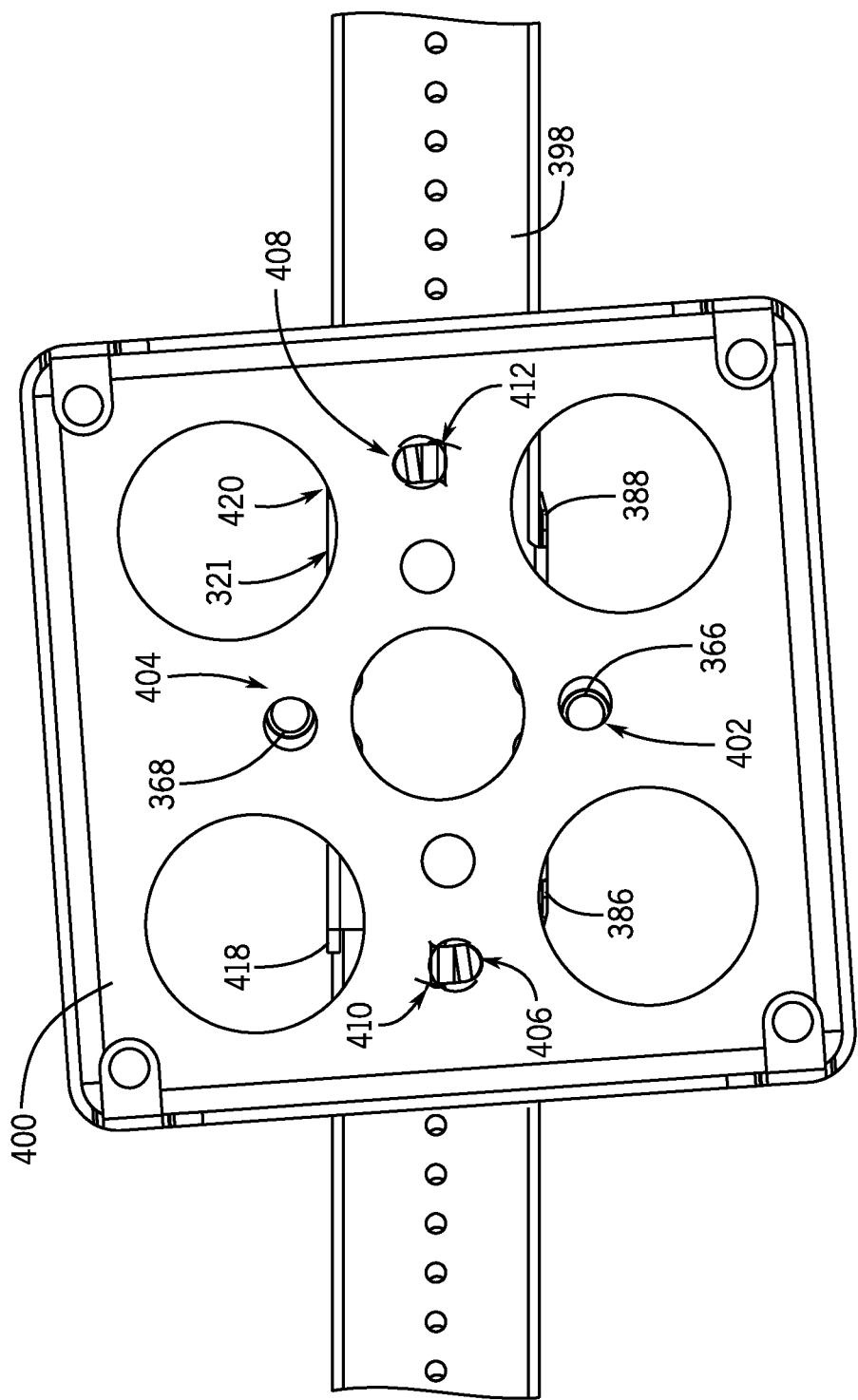
FIG. 32 is a front view of the attachment of FIG. 29, partially engaged with an electrical box and secured around a support structure, and configured in a closed configuration.
Figure 33:
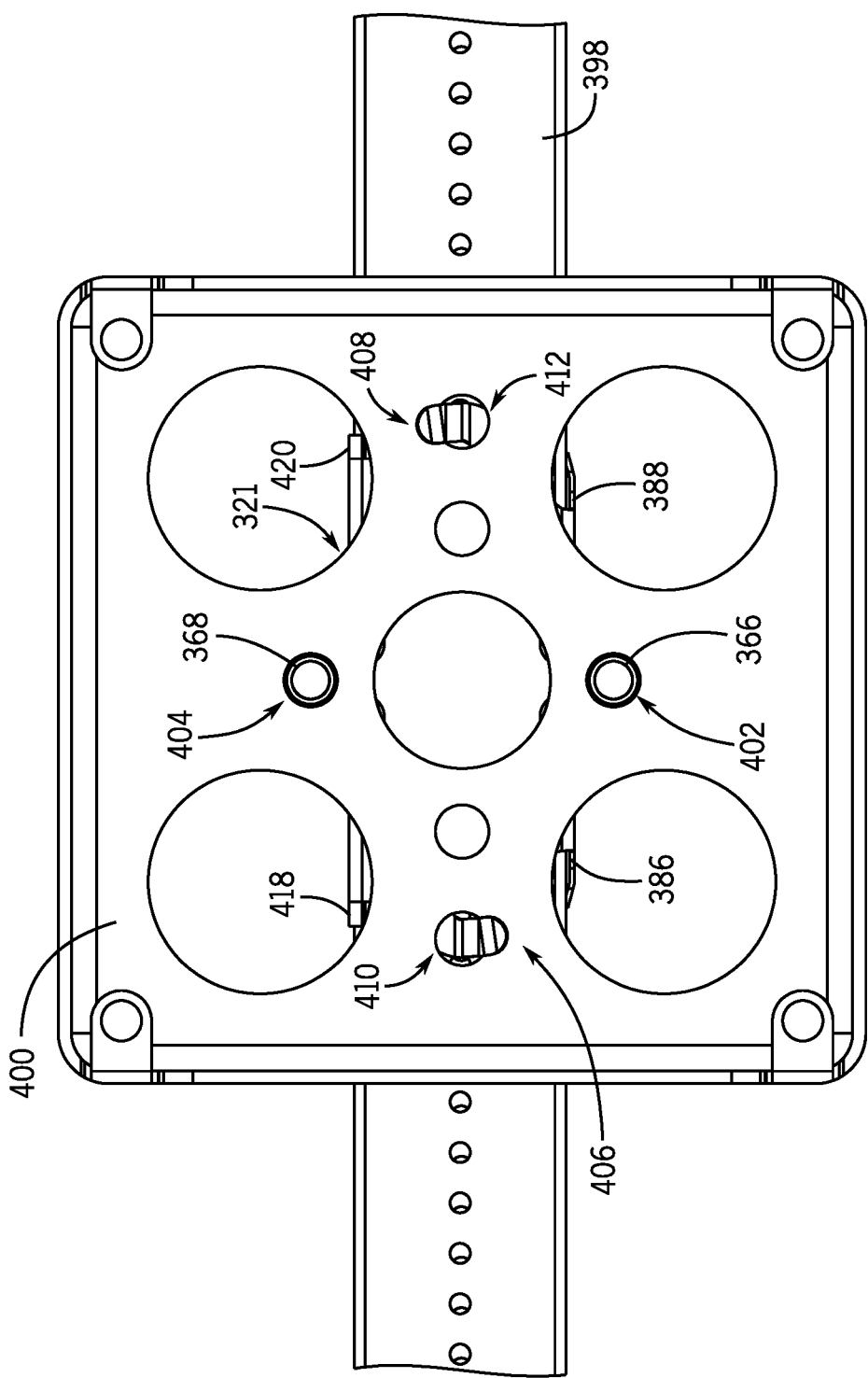
FIG. 33 is a front view of the attachment of FIG. 29, fully engaged with an electrical box and secured around a support structure, and configured in a closed configuration.

FIGS. 32 and 33 illustrate an example installation of the electrical box 400 onto the attachment 321. Generally, the electrical box 400 can be secured to the attachment 321 similarly to the attachment 320, but with a laterally rotational adjustment to achieve full engagement (e.g., in contrast to the sliding, slightly transverse rotational installation for the attachment 320). For example, once the attachment 321 is disposed on the telescoping support 398, and is in the closed and locked configuration, the electrical box 400 can be rotated in a counterclockwise direction (relative to the view in FIG. 32), or otherwise adjusted, to align the mounting openings 406, 408 for initial engagement with the ends of the arms 410, 412. The electrical box 400 is then rotated in a clockwise direction relative to the view in FIG. 32, such that the bent arms 410, 412 move through the corresponding mounting openings 406, 408.

As the electrical box 400 is further rotated in a clockwise direction as guided by the bent arms 410, 412, the movement of the bent arms 410, 412 through the mounting openings 406, 408 can draw the electrical box 400 into closer engagement with the attachment 321, similarly to the bent arms 352, 354. Further, with sufficient rotation, the protrusions 366, 368 can be aligned to be received within (e.g., snap into) the corresponding mounting openings 402, 404. In the embodiment illustrated, for example, the protrusions 366, 368 are configured to be fully engaged with the corresponding mounting openings 402, 404 substantially simultaneously with the bent arms 410, 412 being fully received within the corresponding mounting openings 406, 408, and with the electrical box 400 in a parallel orientation relative to the attachment 321 and the support structure 398 (see, e.g., FIG. 33).

As similarly noted with regard to the attachment 320, the electrical box 400 need not necessarily be secured to the attachment 321 after the attachment 321 is closed around the support 398. For example, in some cases, an electrical box can be secured to an attachment (e.g., the attachment 21) before the attachment is mounted on or closed around a relevant support.

In some embodiments, other approaches are possible. For example, some attachments according to the invention can include protrusions that engage surfaces of an electrical box or other object, rather than mounting openings. For example, the protrusions 366, 368 can be configured, in some arrangements, to engage a flat back surface of an electrical box (or other object), and thereby secure the electrical box (or other object) via the correspondingly imposed bias of the extension arms 362, 364. Similarly, some attachments according to the invention can be configured to engage mounting openings other than those expressly discussed above. For example, some protrusions can be configured to engage larger knock-out openings in an electrical box, or other similar openings.

Figure 34:
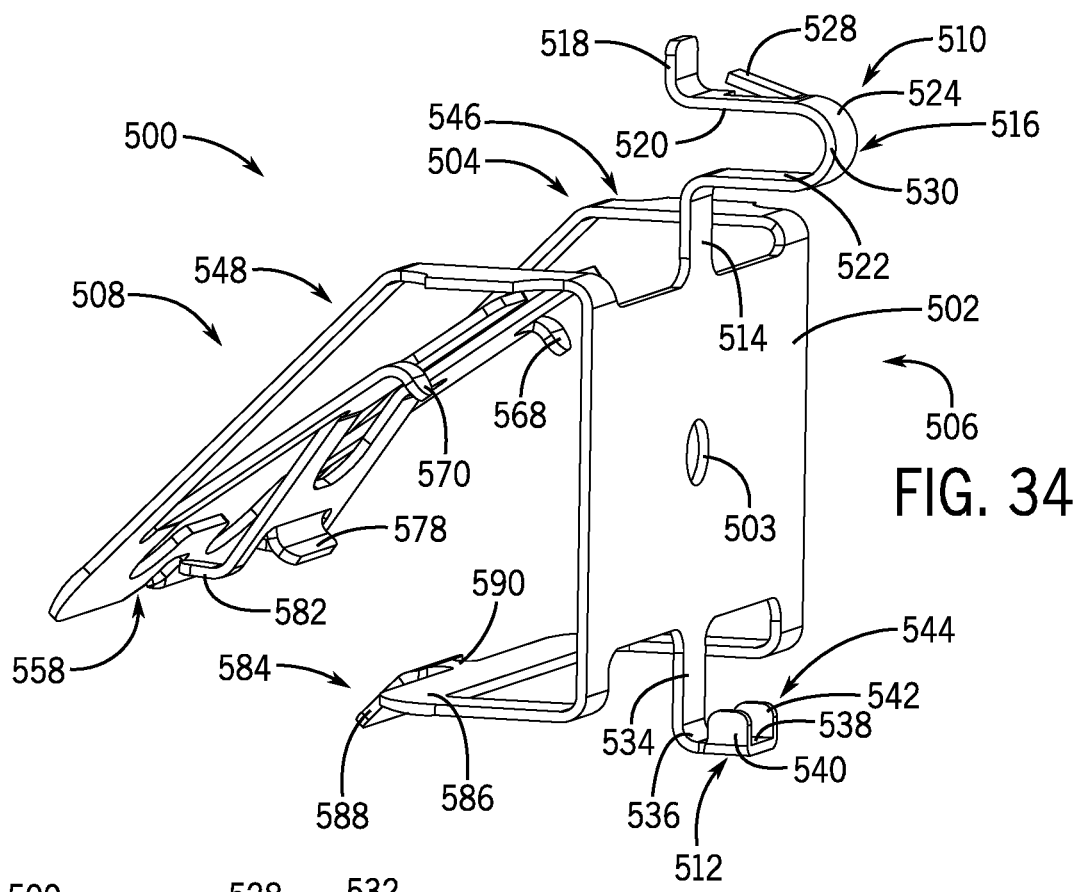
FIGS. 34 and 35 are isometric views of another attachment according to an embodiment of the invention, configured in an open configuration.
Figure 35:
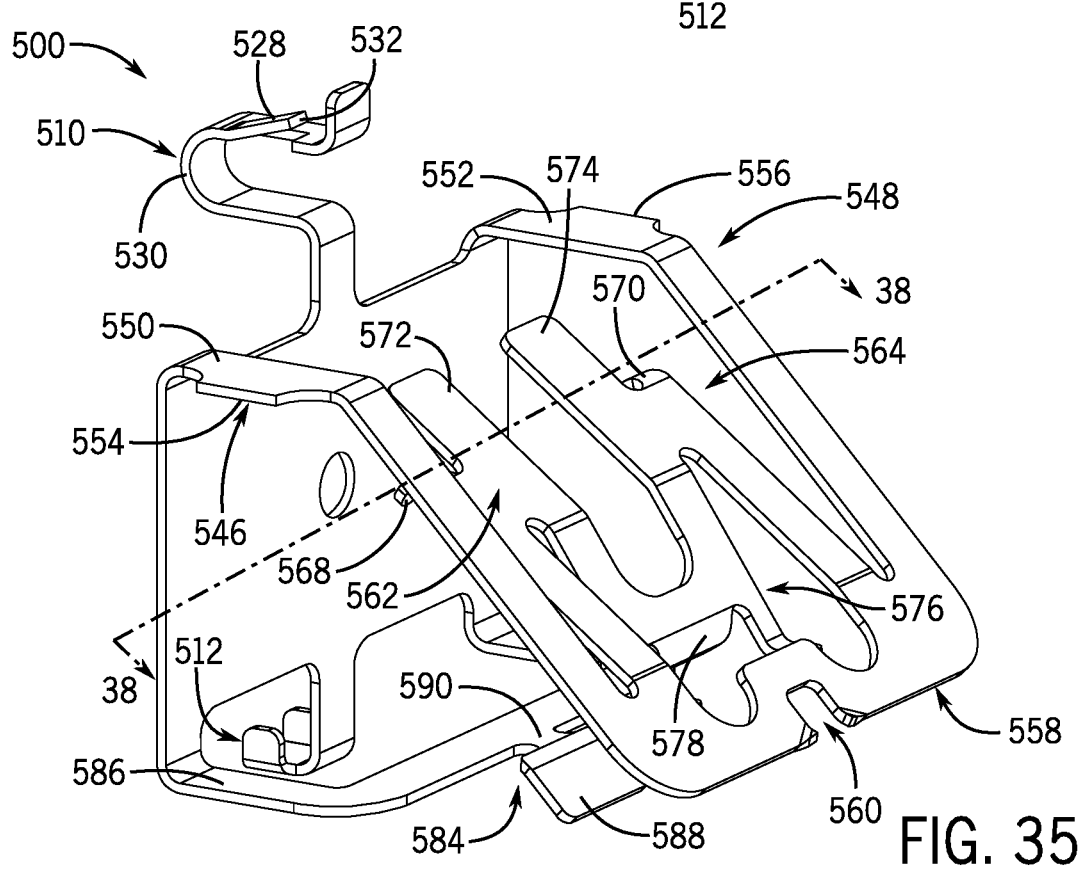

FIGS. 34 and 35 illustrate perspective views of another attachment 500, according to some embodiments of the present disclosure. The attachment 500 is generally similar to other attachments discussed herein, although it is configured to engage a support structure and an electrical box somewhat differently.

In the embodiment illustrated, the attachment 500 is formed from a contiguous piece of material, for example, a die stamped piece of sheet metal. The illustrated shape of the attachment 500 can then be created by folding, forming, or manipulating portions of the contiguous piece about an integral attachment body 502 of the attachment 500, as may be facilitated by locating features such as the aperture 503. Thus, generally, components or features of the attachment 500 emanate integrally from the attachment body 502. Although, the attachment 500 is illustrated as being formed from a single contiguous piece of material, in other embodiments, attachments can be formed by other manufacturing processes. For example, individual components can be joined together by welding, using fasteners, using adhesives, etc.

The attachment 500 generally includes a top portion 504, a front portion 506, and a back portion 508. As shown in FIGS. 34 and 35, in the open configuration, the back portion 508 angles away from the front portion 506. As discussed in more detail below, the top portion 504, the front portion 506, and the back portion 508 are configured to be releasably secured to surround a support structure, which can be for example, a telescoping support structure.

In some embodiments, and as generally discussed previously, attachments can include engagement arrangements that are configured to secure the attachment to electrical boxes, or other components, without the usage of separate fasteners (e.g., threaded fasteners). For example, an engagement arrangement 510 projects upwardly from a top portion of the integral attachment body 502. At an opposing bottom portion of the integral attachment body 502, an engagement arrangement 512 projects downwardly from the integral attachment body 502. Thus, the engagement arrangement 510 and the engagement arrangement 512 are located on opposing sides of the integral attachment body 502.

Although the engagement arrangements 510, 512 are discussed as projecting from a top side, and a bottom side of the integral attachment body 502, respectively, in some embodiments, the engagement arrangements 510, 512 can project from lateral sides of the integral attachment body 502. In other embodiments, for example, engagement arrangements similar to one or both of the engagement arrangements 510, 512 can project from opposing lateral sides of the integral attachment body 502. In other embodiments, other engagement arrangements combinations and substitutions (e.g., with other previously discussed engagement arrangements) are possible.

FIGS. 34 and 35 in particular illustrate specific example structures of the engagement arrangements 510, 512. For example, in the embodiment illustrated, the engagement arrangement 510 includes an extension arm 514 that projects upwardly from the integral attachment body 502. Referring in particular to FIG. 34, the extension arm 514 is shaped to include a U-shaped (e.g., hairpin) bent region 516 that projects outwardly away from the front portion 506 and the back portion 508. Situated above and integral with the U-shaped bent region 516 is an extension 518 that is generally planar and projects upwardly away from the U-shaped bent region 516 (and, in particular, a first section 520 thereof). The extension 518 is positioned towards the back portion 508 relative to the portion of the extension arm 514 that projects out from the integral attachment body 502. In other embodiments, however, an extension of an extension arm can coincide with the same plane as the portion of the extension arm that extends from a corresponding attachment body.

In addition to the first section 520, the U-shaped bent region 516 includes a second section 522 disposed between the first section 520 and the attachment body 502. The first and second sections 520, 522 are joined together by a convex region 524, all of which generally define the U-shaped bent region 516. The first and second sections 520, 522 are illustrated as substantially parallel to each other (e.g., deviating from being parallel by 1°, 2°, 3°, 4°, 5°, 10°, etc.) although other configurations are possible.

In some embodiments, a bent region of an engagement arrangement can be configured to assist in a snap-in engagement with a mounting opening of an electrical box. For example, the distance 526 (see FIG. 36) between the first section 520 and the second section 522, or a distance from the second section to a locking tab 328, can be smaller than an expected diameter of a circular mounting opening of an electrical box. Accordingly, for example, when the engagement arrangement 510 is installed or disposed within the circular mounting opening of the electrical box, the first section 520 and the second section 522 can elastically deflect toward each other, with a corresponding, responsive, elastic biasing force, such that the first section 520 and the second section 522 are urged outward toward the internal edges of a mounting opening. In some embodiments, for example, the first and second sections 520, 522 can be urged by the bias of the bent region 516, to abut against internal edges that define the circular mounting opening, or the tab 528 can be biased to extend beyond the internal edges of the mounting opening. This can help to secure the engagement arrangement 510 to the electrical box, or other object.

As also noted above, the second section 522 also includes the tab 528, which is integral with, and which projects upwardly at an angle from, the second section 522. In the illustrated embodiment, the tab 528 is formed as an upwardly biased deviation of a portion of the width of the second section 522, extending over less than the entire length of the second section 522 (e.g., defined along the edge 530), although other configurations are possible. With this arrangement, as also discussed below, when the engagement arrangement 510 is secured within the mounting opening of the electrical box, the electrical box is situated between an end 532 of the tab 528 and the extension 518. Accordingly, as also noted above, the tab 528 can also aid in the installation of the attachment 500 to the electrical box. For example, as the engagement arrangement 510 is installed in a mounting opening of an electrical box, the tab 528 deflects downwardly towards the section 522 (e.g., independently or as part of a deflection of the first section 520). Then, after the engagement arrangement 510 has been appropriately extended through the mounting opening of the electrical box, the tab 528 can return upwardly, under the bias provided by the bent region 516, to engage an internal wall of the electrical box adjacent to the mounting opening and thus resist withdrawal of the bent region 516 from the mounting opening. In some embodiments, the upward deflection of the tab 528 can thus provide a snap-in engagement, including an auditory and tactile indication to the installer that the electrical box has been appropriately engaged. This can be advantageous, for example, because it can provide confidence to a worker that the engagement arrangement 510 is secured to the electrical box, without necessarily requiring a visual confirmation.

FIGS. 34 and 35 in particular also show the specific structure of the engagement arrangement 512. The engagement arrangement 512 includes an extension arm 534 that projects downwardly from the integral attachment body 502. The extension arm 534 includes a curved region 536 and a planar region 538 joined with the curved region 536. The planar region 538 is substantially perpendicular to both the integral attachment body 502 and the portion of the extension arm 534 that projects from the integral attachment body 502. A protruding feature in the extension arm 534 includes two prongs 540, 542 that extend upwardly on opposing sides of the planar region 538, such that the prongs 540, 542 and the planar region 538 collectively define a u-shaped hook 544. When the engagement arrangement 512 is installed within a mounting opening of an electrical box, a rear wall of the electrical box is situated between the u-shaped hook 544 and the portion of the extension arm 534 that projects from the integral attachment body 502. Thus, for example, the hook 544 can engage an internal rear wall of the electrical box, adjacent to a mounting opening, to help prevent movement of the electrical box relative to the attachment 502 (e.g., translation, rotation, etc.). In some embodiments, as also discussed below, the hook 544 can also facilitate easy installation of an electrical box, such as by helping to stage the electrical box for engagement with the engagement arrangement 510.

In some embodiments, an engagement arrangement can engage an electrical box elastically to secure an attachment to the electrical box. As also discussed above, for example, the engagement arrangement 510 can exhibit an elastic bias to help snap the engagement arrangement 510 into firm engagement with an electrical box. Similarly, the u-shaped hook 544 and the engagement arrangement 512 can be configured to engage an electrical box without plastic deformation of the hook 544, or the engagement arrangement 512 generally. Such an elastic configuration, for example, can help to allow for more automatic engagement of the electrical box by an attachment, as it can avoid the need for a user to manually deform the engagement arrangement. Further, in part because the stresses of plastic deformation can be avoided, some embodiments of the disclosed attachments can be used and reused multiple times without any substantial degradation in engagement strength or reliability.

FIGS. 34 and 35 in particular also show components that releasably secure the attachment 500 around a support structure (e.g., a telescoping support). In the illustrated embodiment, for example, the back portion 508 includes support arms 546, 548, which are integrally joined with and extend away from the integral attachment body 502. Generally, planar portions 550, 552 of the support arms 546, 548, respectively, coincide with the top portion 506 of the attachment 502, and are substantially perpendicular to the integral attachment body 502. The planar regions 550, 552 include lateral extensions 554, 556, respectively, that project outwardly from lateral sides of the corresponding planar region. As shown, the lateral extensions 554, 556 project outwardly in opposing directions, extending laterally away from the integral attachment body 502.

When the attachment 500 is installed, the planar portions 550, 552, and the extensions 554, 556 can contact a top portion of the support structure. Thus arranged, for example, the extensions 554, 556 can increase the stability of the attachment 500 relative to the support structure, including by increasing the contact area between the attachment 500 and the support structure and limiting rotational movement of the attachment 500 relative to the support structure (e.g., counterclockwise or clockwise rotation from a front perspective).

As also shown in FIGS. 34 and 35 in particular, the support arms 546, 548 extend away from the front portion 506 and are joined together opposite the front portion 506 to define a locking feature 558. In particular, the locking feature 558 includes a centrally located rectangular slot 560, situated equidistant between the support arms 546, 548. The edges that define the rectangular slot 560 are flared upwardly toward the top portion 504. As also discussed below, the locking feature 558 is configured to engage a corresponding locking feature that extends from an opposing side of the attachment 500 to help secure the attachment 500 around a support structure.

Extending upwardly away from the locking feature 558 are flexing arms 562, 564, which are generally supported by a corresponding one of the support arms 546, 548. The flexing arms 562, 564 include corresponding hooked ends 568, 570, respectively, that bend inwardly towards the integral attachment body 502. When the attachment 500 is installed around a support structure with a channel or other similar feature, as also discussed below, the hooked ends 568, 570 can contact one or more lips of the channel or other feature (e.g., on an upper telescoping rail) to help stabilize the attachment 500 relative to the support structure.

The flexing arms 562, 564 also include projections 572, 574, respectively, which extend upwardly at an angle towards the integral attachment body 502. The projections 572, 574 are generally planar, are located laterally to the inside of the hooked ends 568, 570, and generally extend along a common plane. In other words, the flat projections 572, 574 are located closer to the central axis defined by the engagement arrangements 510, 512 when compared to the hooked ends 568, 570, although other configurations are possible. Usefully, although ultimately linked via the attachment body 502 and other features, the flat projections 572, 574 are generally independently flexible relative to one another. This can be advantageous, for example, when the attachment 500 straddles portions of a support structure with different thicknesses or heights (e.g., a seam on a telescoping support structure). In such an arrangement, the flat projections 572, 574 can accommodate the different heights or thicknesses of the support structure across the attachment 500 by flexing to extend at different angles relative to the integral attachment body 502 and thus engage the support structure on different planes.

In the illustrated embodiment, the flexing arms 562, 564 are joined together at a centrally located stabilizing region 576, which is formed from additional sets of flexing arms that extend, respectively, from the flexing arms 562, 564 (and, in particular, from the projections 572, 574). The stabilizing region 576 is bent at an angle relative to the flat projections 572, 574, such that the stabilizing region 576 extends inwardly towards the integral attachment body 502 (e.g., as compared to the laterally outside extensions of the support arms 546, 548). Situated on the distal end of the stabilizing region 576 is another hooked end 578 that bends generally towards the integral attachment body 502. When the attachment 500 is installed around a support structure with a channel or other similar feature, as also discussed below, the hooked end 578 can contact a lip of the channel or other feature (e.g., on a lower telescoping rail) to help stabilize the attachment relative to the support structure 500. In this regard, for example, the hooked ends 568, 570, 578 can cooperate to engage opposing lips of a channel or other feature to provide a substantially stable engagement with a support structure.

Figure 36:
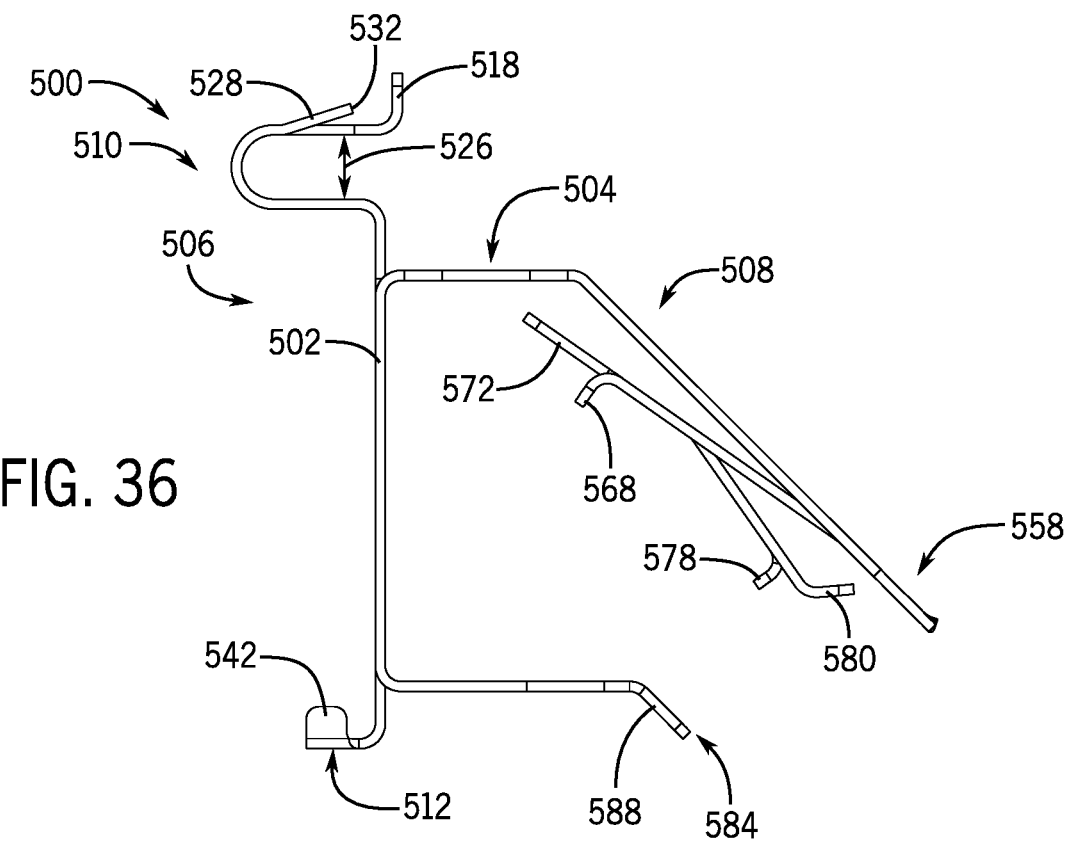
FIG. 36 is a side view of the attachment of FIGS. 34 and 35, configured in the open configuration.
Figure 37:
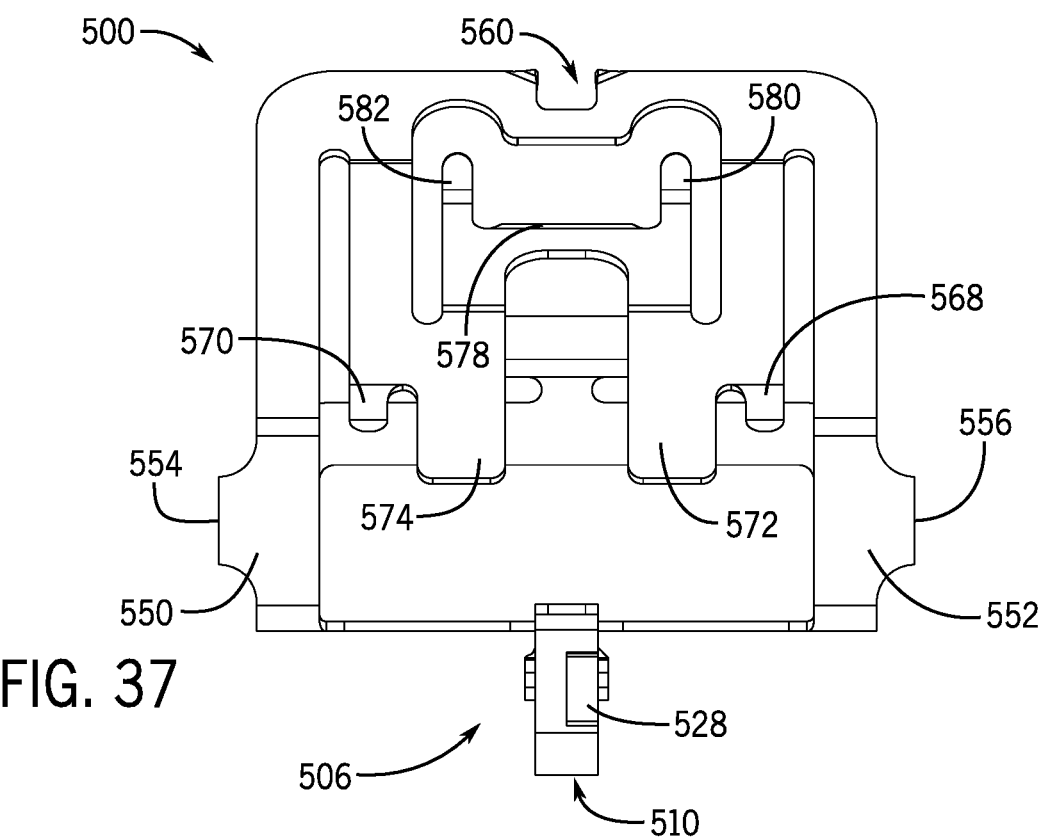
FIG. 37 is a top view of the attachment of FIGS. 34 and 35, configured in the open configuration.
Figure 38:
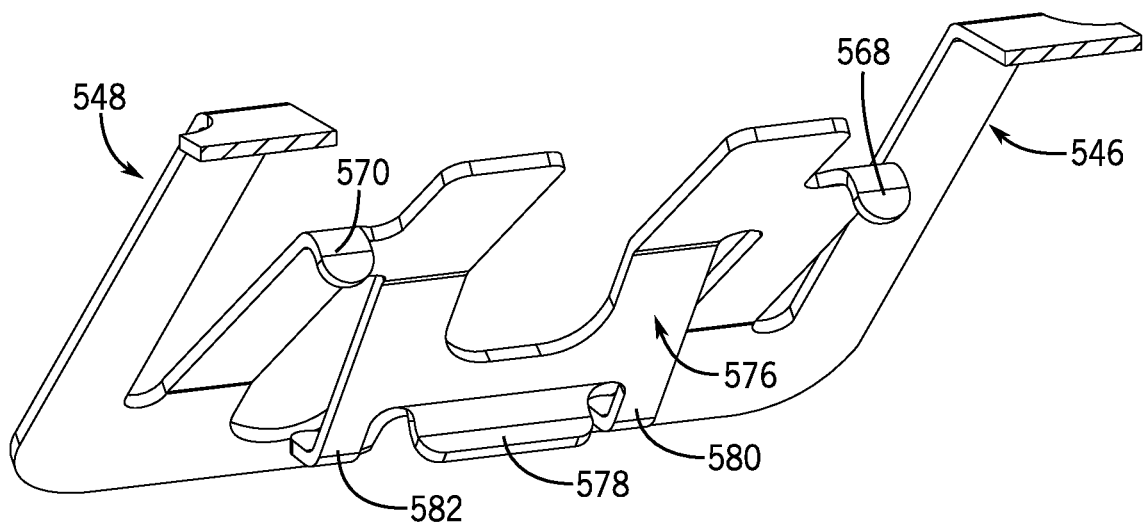
FIG. 38 is an isometric cross sectional view of the attachment of FIGS. 34 and 35, taken along line 38-38 of FIG. 35.

In the illustrated embodiment, additional projections are provided, extending from the stabilizing region 576 on opposing lateral sides of the hooked end 578. As shown in FIGS. 34 and 36 in particular, the projections are configured as hooked ends 580, 582 that bend outwardly away from the attachment body 502, although other configurations are possible. As also discussed below, when the attachment 500 is installed around a support structure, the hooked ends 580, 582 can contact an exterior surface of the support structure, somewhat similarly to the projections 572, 574, to further stabilize the attachment 500 on the support structure.

In order to releasably secure the attachment 500 around a support structure, the locking feature 558 are configured to engage with a complementary locking feature 584, which extends from the integral attachment body 502 and towards the back portion 508. In the illustrated embodiment, for example, the locking portion 584 includes a locking tongue 586 and a tab 588 that is joined to the locking tongue 586 by a narrow extension 590. The narrow extension 590 projects as an extension of the locking tongue 586 at a central region of the locking tongue 586, although other configurations are possible. Further, the tab 588 angles from the extension 590 generally away from the integral attachment body 502.

In order to releasably secure the attachment 500 to a support structure, the locking tongue 586 and the support arms 546, 548 can be manipulated so that the rectangular slot 560 of the locking features 558 (see FIG. 35) receives the narrow extension 590 of the locking portion 584. With the attachment 500 thus arranged, the relatively large width of the tab 588, as engaged by the back portion 508 of the attachment 500 and flared corners of the slot 560 (see FIG. 35) can maintain the extension 590 within the slot 560 so that the attachment 500 remains secured in a closed (and locked) configuration around the support structure.

In some embodiments, the angled configuration of the tab 588 can assist with installation of the attachment 500. For example, the engagement of the back portion 508 of the attachment 500 with the tab 588, as the back portion 508 is urged towards the front portion 506, can inherently urge the tongue 586 to flex downwardly (or the arms 546, 548 to flex upwardly) so that the extension 590 can be received in the slot 560. Similarly, the angled configuration of the tab 588 can provide for relatively easy engagement (e.g., with a hand tool) to remove the extension 590 from the slot 560 and thus dispose the attachment 500 to be moved along or removed from the relevant support structure.

Although the illustrated embodiment shows a single tab 588 and a single corresponding rectangular slot 560, other configurations are possible. For example, in other embodiments, the attachment 500 can have multiple sets of tabs and corresponding slots. For example, rather than a centrally located tab 588, rectangular slot 560, and narrow extension 590, the attachment 500 can include two sets of slots, narrow extensions, and tabs located on opposing sides of the attachment 500. This way, for example, the attachment 500 can be releasably secured at two locations, rather than the single central location. In other embodiments, other configurations are possible.

Figure 39:
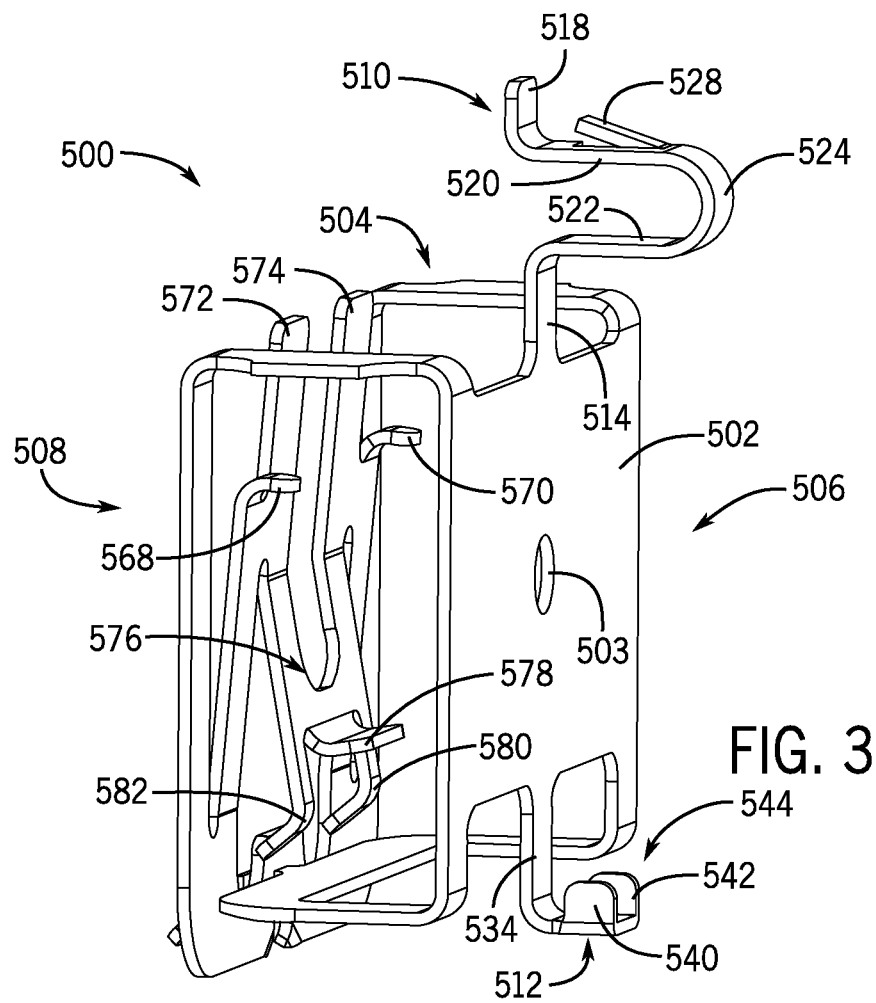
FIGS. 39 and 40 are isometric views of the attachment of FIGS. 34 and 35, configured in a closed configuration.
Figure 40:
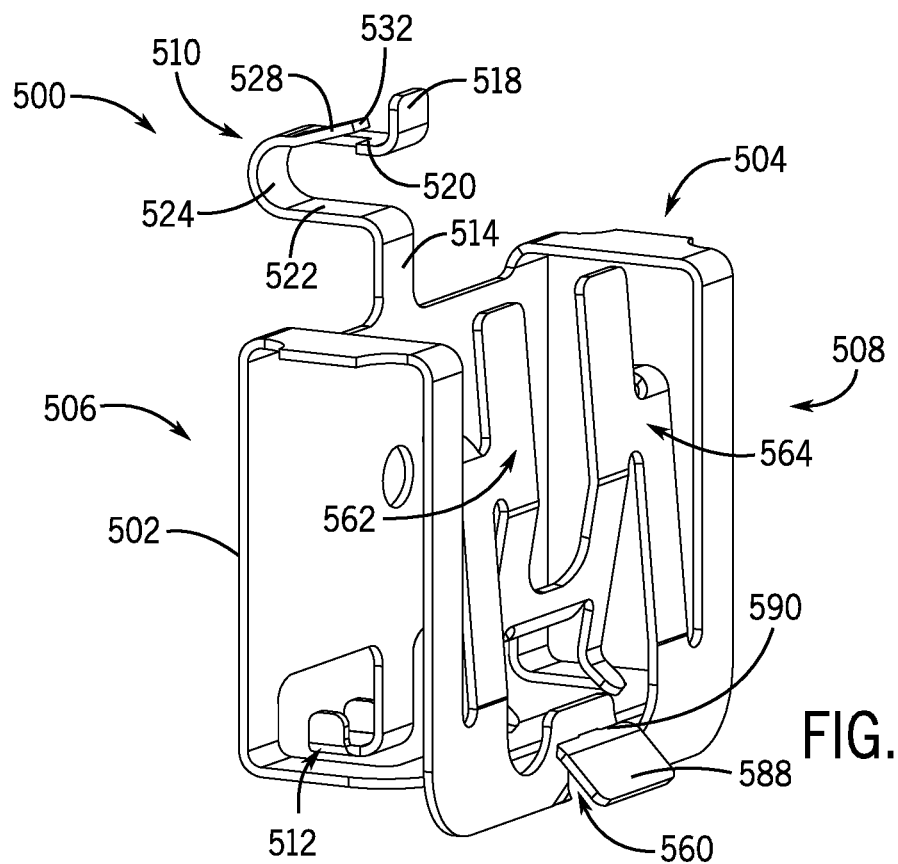
Figure 41:
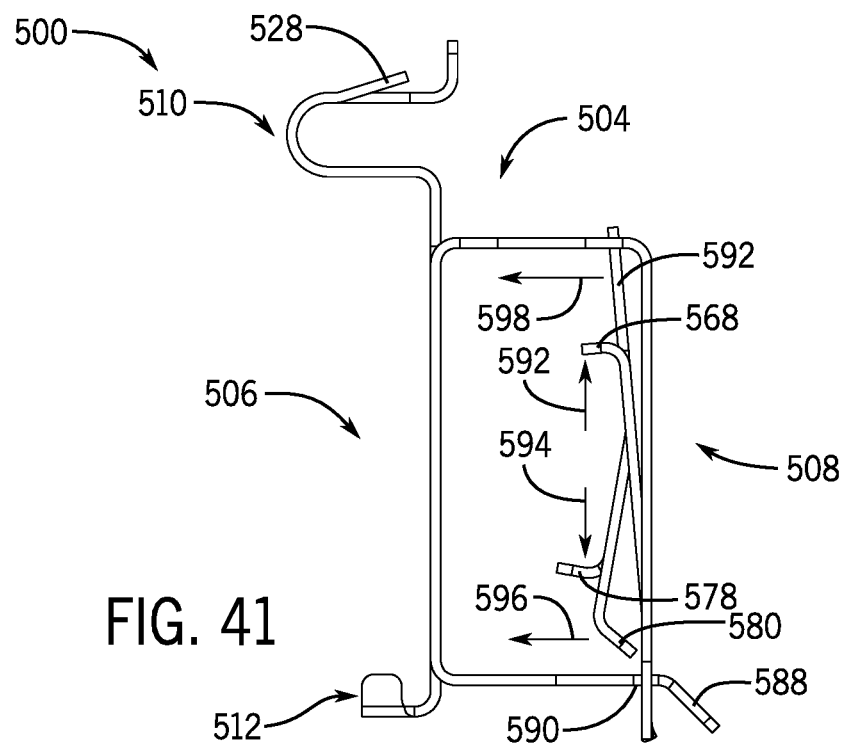
FIG. 41 is a side view of the attachment of FIGS. 34 and 35, configured in the closed configuration.

FIGS. 39-41 illustrate the attachment 500 in a closed configuration, but without a support structure, for clarity of presentation. As alluded to above, the attachment 500 can be manipulated from an open configuration (e.g., FIG. 35) to the closed configuration of FIG. 39 by first urging the back portion 508 towards the front portion 506. With sufficient movement of the back portion 508, as enabled for example by flexing of the support arms 546, 548, the locking features 558, 584 can engage to lock the attachment 500 in the closed configuration.

Figure 42:
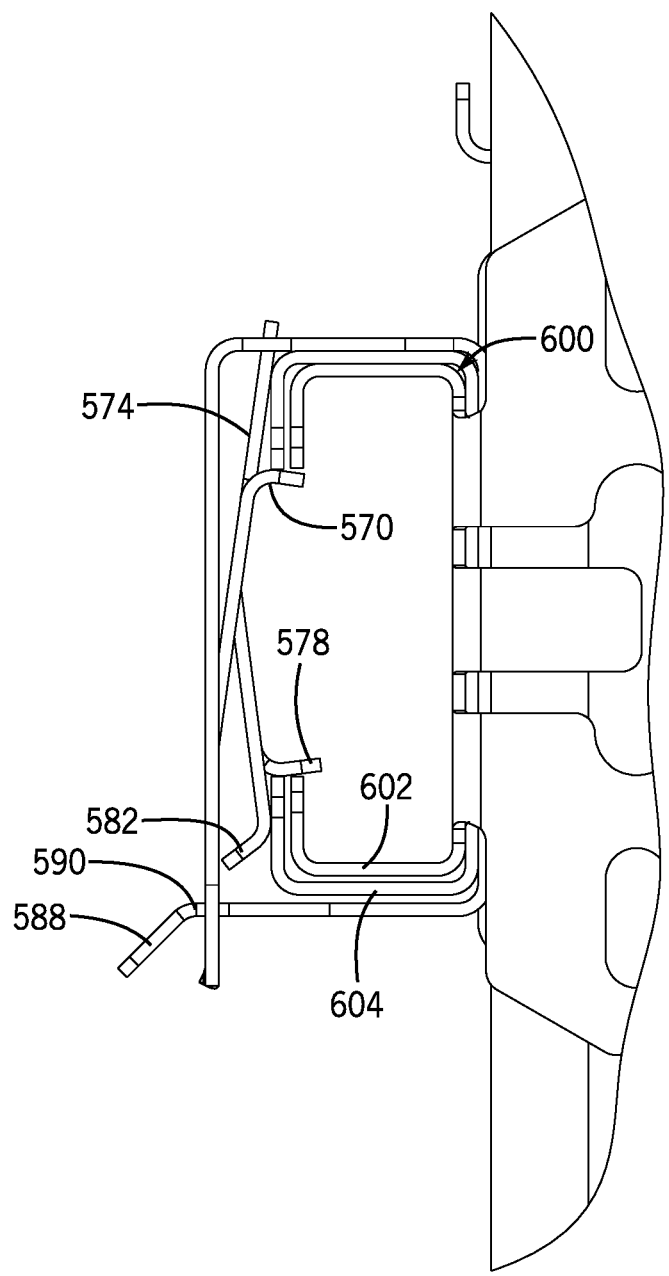
FIG. 42 is a side view of the attachment of FIGS. 34 and 35 disposed over a support structure and configured in the closed configuration.
Figure 43:
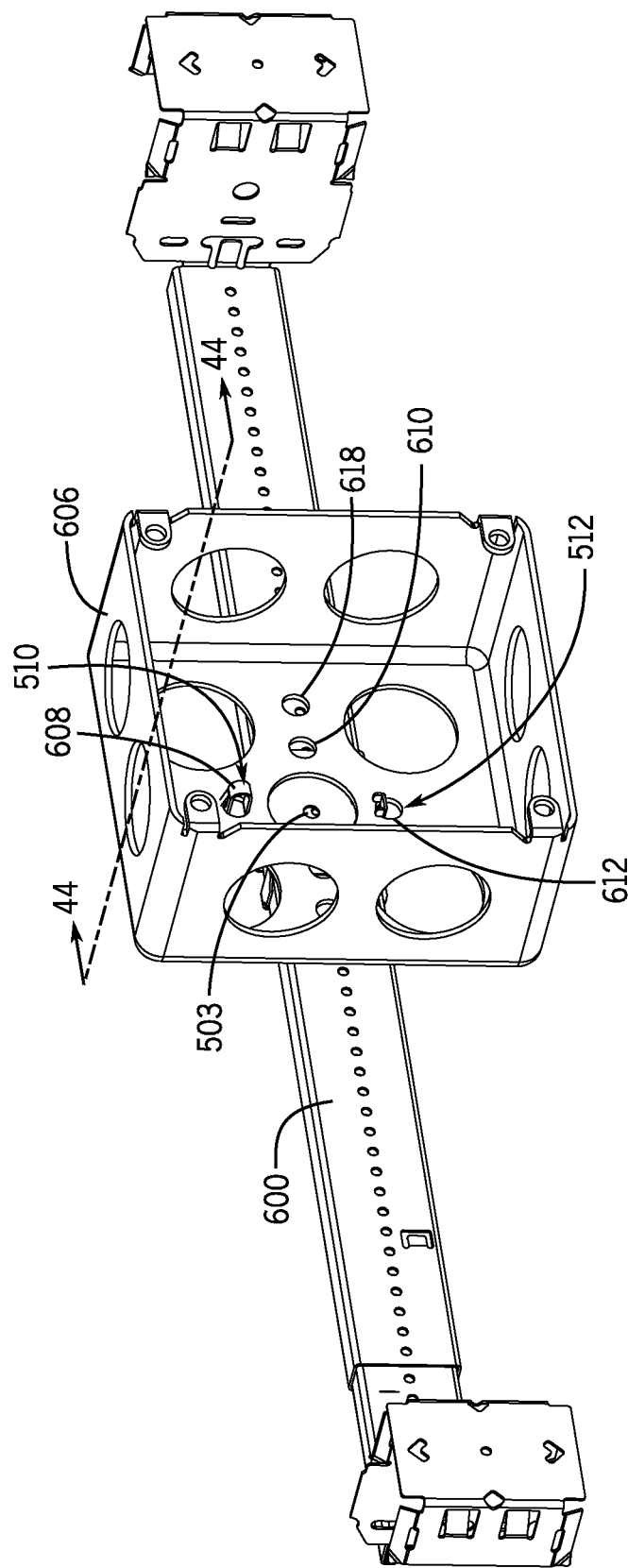
FIG. 43 is an isometric view of the attachment of FIGS. 34 and 35, engaged with an electrical box, disposed over a support structure, and configured in the closed configuration.

Further, as also noted above, as the attachment 500 is moved to a closed configuration around a support structure, such as a telescoping support structure 600 with a male rail 602 that is received within a female rail 604, other features can be correspondingly and automatically also moved into engagement with the support structure. As illustrated in FIG. 42, for example, as the back portion 508 is urged towards the integral attachment body 502, the hooked ends 568, 570 can be moved to be disposed in engagement with an upper internal lip of a channel of the support structure and the hooked end 578 can be moved to be disposed in engagement with a lower internal lip of the channel of the support structure. In particular, moving the attachment 500 to seat the rectangular slot 560 around the narrow extension 590 may load the flexing arms 562, 564 so that the hooked ends 568, 570, 578 firmly contact the lips of the internal channel of the support structure 600. Similarly, the flexing arms 562, 564 can be loaded so that the flat projections 572, 574 and the projections with the hooked ends 580, 582 contact an exterior surface of the support structure to provide lateral support for the attachment 500. Generally, the flat projections 572, 574 contact the exterior surface of the support structure, above the location were the hooked ends 580, 582 contact the support structure.

Referring also to FIGS. 39 through 41, when the attachment 500 is in a closed configuration and secured around a support structure, the top portion 504 contacts the top of the support structure, the front portion 506 contacts the front portion of the support structure, and the back portion 508 contacts the back of the support structure. Specifically, the interior surface of the integral attachment body 502 contacts the front surface of the support structure, and the interior surface of the locking tongue 586 contacts the bottom surface of the support structure. The interior surface of the planar regions 550, 552 including the interior surface of the lateral extensions 554, 556 contact the top surface of the support structure. The interior surface of the locking tongue 586 contacts the bottom surface of the support structure. The contact with portions of the attachment 500 and the support structure can allow for a secure engagement between the attachment 500 and the support structure, without the need for fasteners.

Advantageously, when the attachment 500 is secured around a support structure as discussed above, the biasing of the flexing arms 562, 564 further retains the attachment 500 to the support structure. For example, the flexing arms 562, 564 are biased to direct forces against or along four different locations of the support structure. Specifically, the hooked ends 568, 570 can provide an upwardly force to a lip or other feature of the support structure, shown for example as force 592 in FIG. 41. Similarly, the hooked end 578 provides a downwardly force to a lip or other feature of the support structure, laterally and vertically offset from the hooked ends 568, 570, as shown for example as force 594 in FIG. 41. Further, the hooked ends 580, 582 provide a generally horizontal force to an exterior surface towards the bottom of a support structure, shown for example as force 596 in FIG. 41. And the flat projections 572, 574 provide a generally horizontal force to an exterior surface towards the top of a support structure, vertically offset from the projections 572, 574, shown for example as force 596 in FIG. 41. This can provide a relatively firm engagement of the support structure, so that an electrical box can be held firmly thereto without requiring separate fasteners. In other embodiments, however, other configurations are possible.

FIGS. 42 through 45 illustrate in particular the attachment 500 engaged with an electrical box 606 and secured around the telescoping support 600. In the illustrated embodiment, the electrical box 606 has circular mounting openings 608, 610, 612, 614 arranged in a square array (e.g., a diamond pattern) and an additional two mounting openings 616, 618 located laterally to the outside of the mounting openings 614, 610, respectively. The electrical box 606 also has a centrally located knock-out opening 620. Once the attachment 500 is secured around the telescoping support 600 (or other mounting structure) the electrical box 606 can be secured to the attachment 500. In other configurations, however, the electrical box 606 can be secured to the attachment 500 and subsequently secured around the telescoping support 600 (or other mounting structure).

Figure 44:
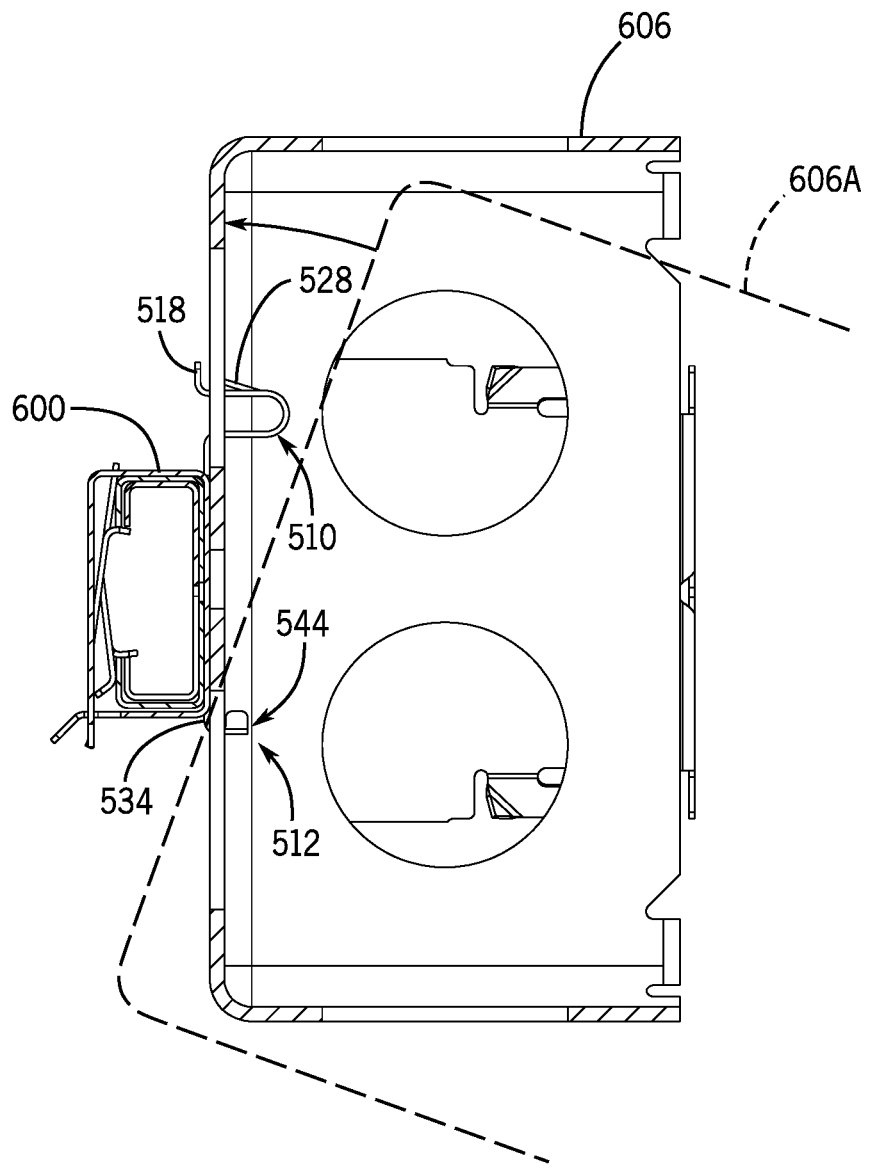
FIG. 44 is a side, cross sectional view of the attachment of FIGS. 34 and 35, engaged with an electrical box, disposed over a support structure, and configured in the closed configuration, taken along line 44-44 of FIG. 43.
Figure 45:
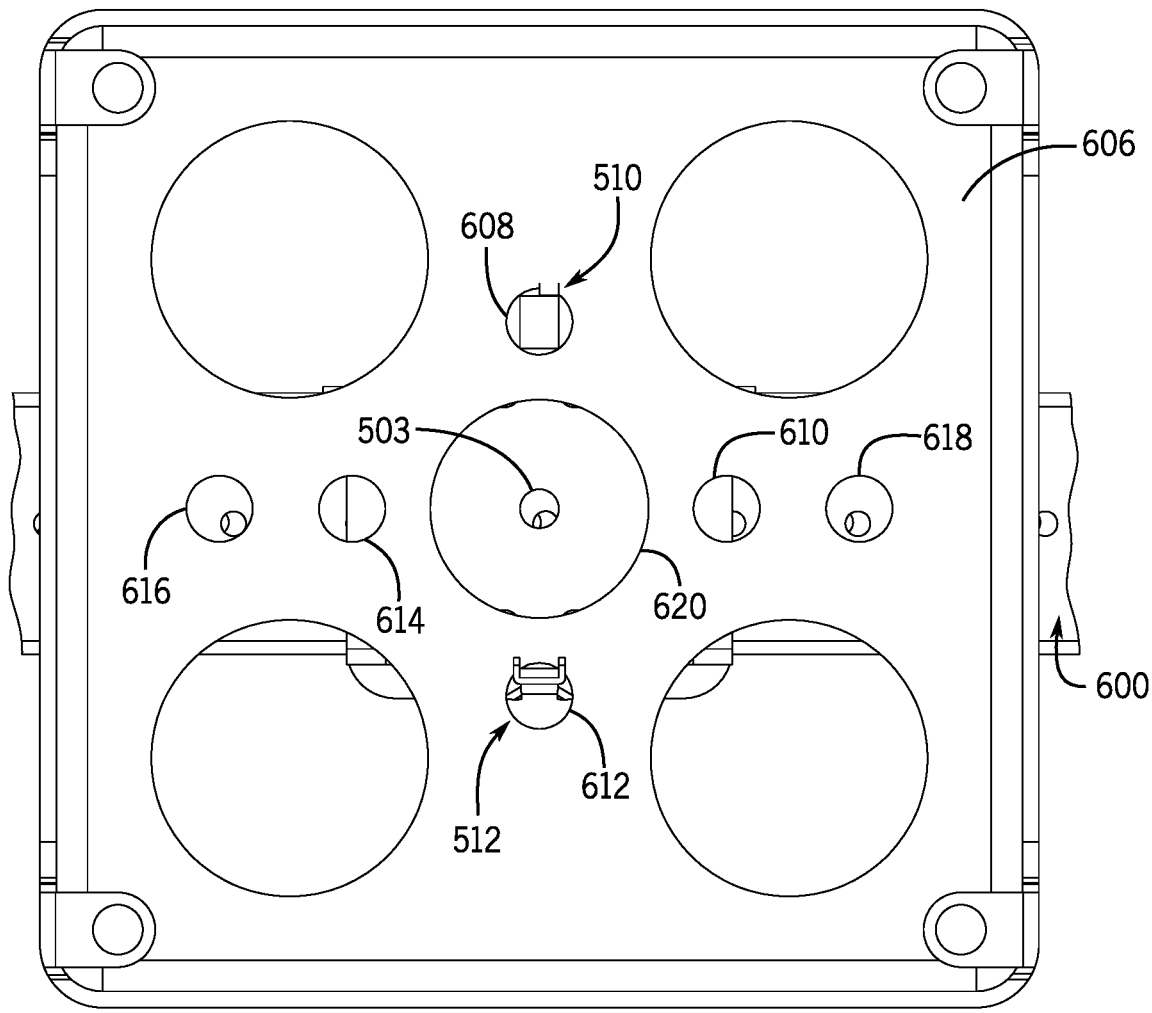
FIG. 45 is a front elevation view of the attachment of FIGS. 34 and 35, engaged with an electrical box and secured around a support structure, configured in the closed configuration.

According to an example installation method, the electrical box 606 is angled as indicated by 606A in FIG. 44, such that the mounting opening 612 receives the engagement arrangement 512 prior to the mounting opening 608 receiving the engagement arrangement 510. Specifically, the hook 544 can be inserted through the mounting opening 612 so that a rear wall of the electrical box 606 at the mounting opening 612 is seated behind the hook 544, with the prongs 540, 542 in contact with the interior surface of the rear wall. The electrical box 606 can then be tilted towards the engagement arrangement 510, such as by rotating the electrical box 606 about a fulcrum defined by the contact between the electrical box 606 and the engagement arrangement 512.

With sufficient tilting of the electrical box 606, the convex region 524 of the bent region 516 is received within the mounting opening 608 and the edges that define the mounting opening 608 can contact one or both of the first and second sections 520, 522 of the engagement arrangement 510. This contact between the mounting opening 608 and the first or second sections 520, 522 elastically compresses the U-shaped bent region 516, thereby forcing the first section 520 closer to the second section 522. The electrical box 606 can accordingly be further rotated until the mounting opening 608 clears the tab 528 and the electrical box 606 can be moved into contact with the front portion 506 of the attachment body 502. Throughout the installation, and in this final arrangement, the upwardly projecting prongs 540, 542 can help to ensure that the electrical box 606 remains appropriately seated on the attachment 500.

Further, when the mounting opening 608 clears the tab 528, the tab 528 can move elastically upwardly, independently or as part of a larger movement of the first section 520, to help retain the electrical box 606. For example, because the tab 528 is angled upwardly, the end 532 of the tab 528 (see FIG. 40) can contact an inner surface of the electrical box 606 to generally prevent withdrawal of the engagement arrangement 510 from the mounting opening 608. Additionally, in some configurations, the extension 518 can contact an outside of the rear wall of the electrical box to provide further stability.

As discussed previously, prior to the mounting opening 608 receiving the engagement arrangement 510, the vertical distance between the first section 520 and the second section 522 is defined by the distance 526. In some embodiments, when the mounting opening 608 receives and is secured to the engagement arrangement 510, the U-shaped bent region 516 loads in a spring-like manner, such that the distance 526 decreases. Accordingly, for example, the elastic response of the U-shaped bent region 516 biases the first section 520 against the upper edge of the mounting opening 608 and the second section 522 against the lower edge of the mounting opening 608. In some embodiments, this biased engagement can further help to retain the engagement arrangement 510 to the electrical box 606.

In some embodiments, it may be desired to have different combinations of engagement arrangements. For example, according to some embodiments of the present disclosure, any engagement arrangement can be added or substituted for another engagement arrangement. As a specific example, some attachments can include two engagement arrangements configured similarly to the engagement arrangement 510, located on opposite sides of an attachment body.

Thus, embodiments of the inventions can provide an improved attachment to secure an electrical box or other object to a support structure. In some embodiments, for example, an attachment according to the invention can be used without separate fasteners to slidably support an electrical box relative to a support structure and can be locked, also without the use of separate fasteners, to secure the electrical box at a particular location on the support structure.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An attachment for securing an electrical box to a support structure, the electrical box including a back side with a first mounting opening and a second mounting opening, the attachment comprising:
    an attachment body configured to be secured to the support structure; and
    one or more engagement arrangements that are integrally formed with the attachment body and include:
        a first arm having a first section and a second section that are joined by a bend; and
        a second arm having a hook;
    the one or more engagement arrangements being configured to secure the electrical box to the attachment body, without use of a separate fastener, with:
        the attachment body being configured to be disposed along the back side of the electrical box;
        the first and second sections of the first arm being configured to extend from the back side of the electrical box through and within the first mounting opening into an interior of the electrical box, the first section and the second section of the first arm each configured to be in contact with an edge of the first mounting opening;
        the hook configured to extend from the back side of the electrical box through the second mounting opening into the interior of the electrical box; and
        the bend biasing at least one of the first or second sections of the first arm to secure the first arm within the first mounting opening,
    the bend is configured to be disposed inside of the electrical box when the first and second sections of the first arm extend through the first mounting opening, and the bend includes a U-shaped bend between the first and second sections of the first arm.

2. The attachment of claim 1, wherein the hook is configured to elastically engage an inside wall of the electrical box to secure the second arm within the second mounting opening.

3. The attachment of claim 1, wherein, with the electrical box attached to the attachment, the attachment body is configured to be arranged in a locked configuration in which the attachment body secures the attachment and the electrical box against sliding along the support structure, and an unlocked configuration in which the attachment body allows the attachment and the electrical box to be slid along the support structure.

4. The attachment of claim 1, wherein the first arm further includes a first tab that is configured to engage an inside wall of the electrical box to secure the first arm within the first mounting opening.

5. The attachment of claim 4, wherein the first tab extends from the first section of the first arm away from the second section of the first arm.

6. The attachment of claim 4, wherein the first arm further includes a second tab, opposite the bend, that is configured to engage the back side of the electrical box when the first arm is secured within the first mounting opening.

7. The attachment of claim 1, wherein the attachment is configured to surround the support structure to secure the attachment to the support structure.

8. The attachment of claim 7, with the support structure including a channel with a first internal lip and a second internal lip that is opposite the channel from the first internal lip, the attachment further comprising:
    at least one flexible arm that is configured to engage the first internal lip and the second internal lip of the support structure to secure the attachment relative to the support structure.

9. An attachment for securing an electrical box to a between-stud support structure that has a front side and a back side, the electrical box including a back side with a first mounting opening and a second mounting opening, the attachment comprising:
    an attachment body configured to be secured to surround the between-stud support structure with the attachment body configured to be in contact with the between-stud support structure and the electrical box and disposed between the front side of the between-stud support structure and the back side of the electrical box; and
    a locking tab and a void configured to receive the locking tab to secure the attachment body around the between-stud support structure;
    one or more engagement arrangements that include:
        a first arm that includes a first protrusion and is configured to extend from the attachment body along the back side of the electrical box; and
        a second arm that includes a second protrusion and is configured to extend from the attachment body along the back side of the electrical box, opposite the attachment body from the first arm;
    the first and second protrusions being configured to be inserted from the back side of the electrical box through the first and second mounting openings, respectively, to secure the electrical box to the attachment body without use of a separate fastener, the first protrusion configured to be in contact with the electrical box at the first mounting opening when the attachment is secured to the electrical box, and the second protrusion configured to be in contact with the electrical box at the second mounting opening when the attachment is secured to the electrical box.

10. The attachment of claim 9, wherein the first protrusion includes a U-shaped bend that is configured to extend into an inside of the electrical box to secure the attachment to the electrical box; and wherein the second protrusion includes a hook that is configured to extend into the inside of the electrical box to secure the attachment to the electrical box.

11. The attachment of claim 9, wherein the first protrusion includes:

a first tab that is configured to engage an inside wall of the electrical box when the first protrusion is inserted through the first mounting opening; and a second tab that is configured to engage the back side of the electrical box when the first protrusion is inserted through the first mounting opening.

12. A securing system comprising:

an electrical box that has a first mounting opening and a second mounting opening; and an attachment for securing the electrical box to a support structure, the attachment comprising:

an attachment body configured to be secured to the support structure; and one or more engagement arrangements that are integrally formed with the attachment body and include a first arm having a first section and a second section that are joined by a bend, and a second arm having a hook;

the one or more engagement arrangements being configured to secure the electrical box to the attachment body, without use of a separate fastener, the attachment being installed with the electrical box with:

the attachment body disposed along a back side of the electrical box;

the first and second sections of the first arm extending from the back side of the electrical box within the first mounting opening and into an interior of the electrical box;

the hook extending from the back side of the electrical box through the second mounting opening into the interior of the electrical box; and the bend biasing at least one of the first or second sections of the first arm to secure the first arm within the first mounting opening.

13. The securing system of claim 12, wherein the first and second arms extend from opposite sides of the attachment body, and wherein the first arm has a U-shaped bend at a free end of the first arm that is configured to extend into the interior of the electrical box to secure the attachment to the electrical box.

14. An attachment for securing an electrical box to a support structure, the electrical box including a back side with a first mounting opening and a second mounting opening, the attachment comprising:

an attachment body configured to be secured to the support structure; and one or more engagement arrangements that are integrally formed with the attachment body and include:

a first arm having a first section and a second section that are joined by a bend; and a second arm having a hook that is configured to elastically engage an inside wall of the electrical box to secure the second arm within the second mounting opening;

the one or more engagement arrangements being configured to secure the electrical box to the attachment body, without use of a separate fastener, with:

the attachment body being configured to be disposed along the back side of the electrical box;

the first and second sections of the first arm being configured to extend from the back side of the electrical box through and within the first mounting opening into an interior of the electrical box, the first section and the second section of the first arm each configured to be in contact with an edge of the first mounting opening;

the hook configured to extend from the back side of the electrical box through the second mounting opening into the interior of the electrical box; and the bend biasing at least one of the first or second sections of the first arm to secure the first arm within the first mounting opening.

15. An attachment for securing an electrical box to a support structure, the electrical box including a back side with a first mounting opening and a second mounting opening, the attachment comprising:

an attachment body configured to be secured to the support structure; and one or more engagement arrangements that are integrally formed with the attachment body and include:

a first arm having a first section and a second section that are joined by a bend, the first arm including a first tab that is configured to engage an inside wall of the electrical box to secure the first arm within the first mounting opening, and a second tab, opposite the bend, that is configured to engage the back side of the electrical box when the first arm is secured within the first mounting opening; and a second arm having a hook;

the one or more engagement arrangements being configured to secure the electrical box to the attachment body, without use of a separate fastener, with:

the attachment body being configured to be disposed along the back side of the electrical box;

the first and second sections of the first arm being configured to extend from the back side of the electrical box through and within the first mounting opening into an interior of the electrical box, the first section and the second section of the first arm each configured to be in contact with an edge of the first mounting opening;

the hook configured to extend from the back side of the electrical box through the second mounting opening into the interior of the electrical box; and the bend biasing at least one of the first or second sections of the first arm to secure the first arm within the first mounting opening.

16. An attachment for securing an electrical box to a support structure, the electrical box including a back side with a first mounting opening and a second mounting opening, the attachment comprising:

an attachment body configured to be secured to the support structure;

at least one flexible arm; and one or more engagement arrangements that are integrally formed with the attachment body and include:

a first arm having a first section and a second section that are joined by a bend; and a second arm having a hook;

the one or more engagement arrangements being configured to secure the electrical box to the attachment body, without use of a separate fastener, with:
  the attachment body being configured to be disposed along the back side of the electrical box;
  the first and second sections of the first arm being configured to extend from the back side of the electrical box through and within the first mounting opening into an interior of the electrical box, the first section and the second section of the first arm each configured to be in contact with an edge of the first mounting opening;
  the hook configured to extend from the back side of the electrical box through the second mounting opening into the interior of the electrical box; and
  the bend biasing at least one of the first or second sections of the first arm to secure the first arm within the first mounting opening,
the attachment is configured to surround the support structure to secure the attachment to the support structure, the support structure including a channel with a first internal lip and a second internal lip that is opposite the channel from the first internal lip, and
the at least one flexible arm is configured to engage the first internal lip and the second internal lip of the support structure to secure the attachment relative to the support structure.

17. The attachment of claim 16, wherein the at least one flexible arm includes a first hooked end that is configured to engage the first internal lip and a second hooked end that is configured to engage the second internal lip.

18. The attachment of claim 17, wherein the at least one flexible arm includes a first flexible arm that includes the first hooked end and a second flexible arm that includes the second hooked end.

19. The attachment of claim 18, wherein the first flexible arm extends from the attachment body toward the first hooked end; and
  wherein the second flexible arm extends from the first flexible arm towards the second hooked end.

20. The attachment of claim 18, wherein the first flexible arm includes a first-arm projection that is configured to engage a back side of the support structure when the attachment is secured around the support structure.

21. The attachment of claim 20, wherein the at least one flexible arm further includes a third flexible arm spaced laterally from the first flexible arm; and
  wherein the third flexible arm includes:
    a third hooked end that is configured to engage the first internal lip of the support structure; and
    a third-arm projection that is configured to engage the back side of the support structure, laterally apart from the first-arm projection, when the attachment is secured around the support structure.

* * * * *